(12) United States Patent
Miura et al.

(10) Patent No.: US 9,623,832 B2
(45) Date of Patent: Apr. 18, 2017

(54) AIRBAG APPARATUS

(71) Applicant: TOYODA GOSEI CO., LTD., Kiyosu-shi, Aichi-ken (JP)

(72) Inventors: Wataru Miura, Kiyosu (JP); Takashi Shigemura, Kiyosu (JP); Tsuyoshi Furuno, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 107 days.

(21) Appl. No.: 14/521,506

(22) Filed: Oct. 23, 2014

(65) Prior Publication Data

US 2015/0115577 A1 Apr. 30, 2015

(30) Foreign Application Priority Data

Oct. 31, 2013 (JP) .................................. 2013-227304
Jun. 27, 2014 (JP) .................................. 2014-133012
Aug. 27, 2014 (JP) .................................. 2014-173233

(51) Int. Cl.
*B60R 21/2334* (2011.01)
*B60R 21/201* (2011.01)
*B60R 21/237* (2006.01)
*B60R 21/16* (2006.01)

(52) U.S. Cl.
CPC ........ *B60R 21/2334* (2013.01); *B60R 21/201* (2013.01); *B60R 21/237* (2013.01); *B60R 2021/161* (2013.01)

(58) Field of Classification Search
CPC .............. B60R 21/2334; B60R 21/201; B60R 2021/161; B60R 21/237
See application file for complete search history.

(56) References Cited

U.S. PATENT DOCUMENTS 5,398,959 A * 3/1995 Avila .................... B60R 21/215
  280/728.3
5,560,648 A * 10/1996 Rhule .................... B60R 21/16
  280/731

(Continued)

FOREIGN PATENT DOCUMENTS

JP 2001-287611 A 10/2001
JP 2008-273260 A 11/2008

*Primary Examiner* — Paul N Dickson
*Assistant Examiner* — Joselynn Y Sliteris
(74) *Attorney, Agent, or Firm* — Posz Law Group, PLC

(57) ABSTRACT

An airbag apparatus includes an airbag that deploys and inflates while being unfolded from an accommodating portion, when inflating gas flows into the airbag; and a regulating member that is able to regulate the deployment and inflation of an airbag. The regulating member is flexible, and includes a temporary holding portion that releasably and temporarily holds a folded portion that is a part of the airbag; an attachment portion that is attached to the accommodating portion; and a connecting piece portion that connects the attachment portion and the temporary holding portion. The temporary holding portion includes a base portion that is continuous with the connecting piece portion, and a cover portion that forms a holding concave portion for temporarily holding the folded portion, and is connected to the base portion. An opening for releasing the folded portion is provided at an inner circumference of a non-connected release edge.

11 Claims, 48 Drawing Sheets

(56) References Cited

U.S. PATENT DOCUMENTS

| | | | |
|---|---|---|---|
| 5,588,674 A * | 12/1996 | Yoshimura | B60R 21/16 280/728.1 |
| 6,371,510 B1 * | 4/2002 | Marriott | B60R 21/201 280/730.1 |
| 6,585,292 B2 * | 7/2003 | Abe | B60R 21/20 280/728.1 |
| 6,874,810 B2 * | 4/2005 | Soderquist | B60R 21/201 280/728.3 |
| 6,877,772 B2 * | 4/2005 | Fischer | B60R 21/205 280/730.1 |
| 6,883,831 B2 * | 4/2005 | Hawthorn | B60R 21/16 280/739 |
| 7,712,781 B2 * | 5/2010 | Klinkenberger | B60R 21/231 280/743.1 |
| 7,731,230 B2 * | 6/2010 | Fischer | B60R 21/205 280/728.1 |
| 7,770,925 B2 * | 8/2010 | Seymour | B60R 21/201 280/728.2 |
| 7,845,683 B2 * | 12/2010 | Sato | B60R 21/201 280/743.2 |
| 8,408,596 B2 * | 4/2013 | Matsunaga | B60R 21/201 280/732 |
| 2002/0020995 A1 | 2/2002 | Abe et al. | |
| 2008/0277907 A1 | 11/2008 | Sato et al. | |
| 2009/0091111 A1 | 4/2009 | Fischer et al. | |

* cited by examiner

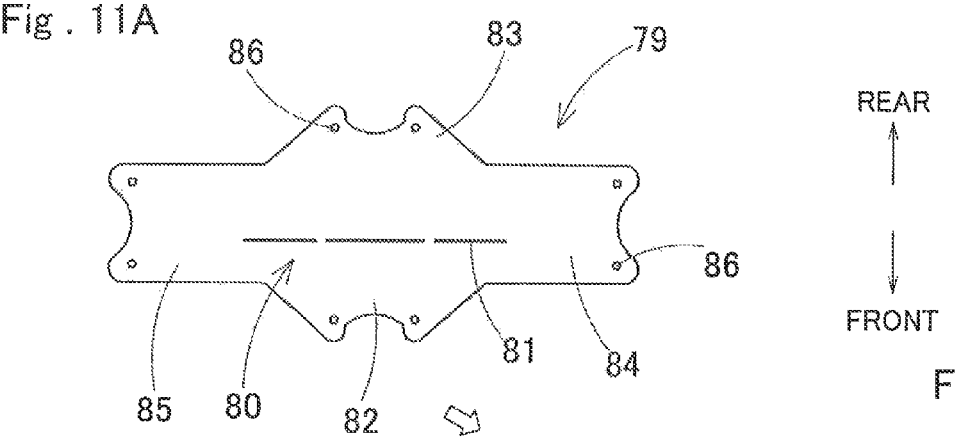
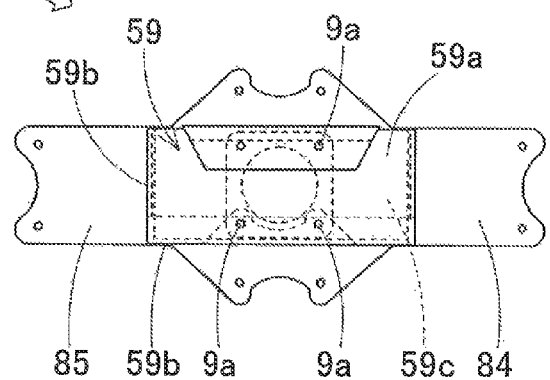
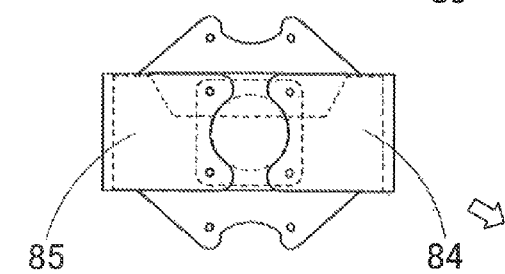
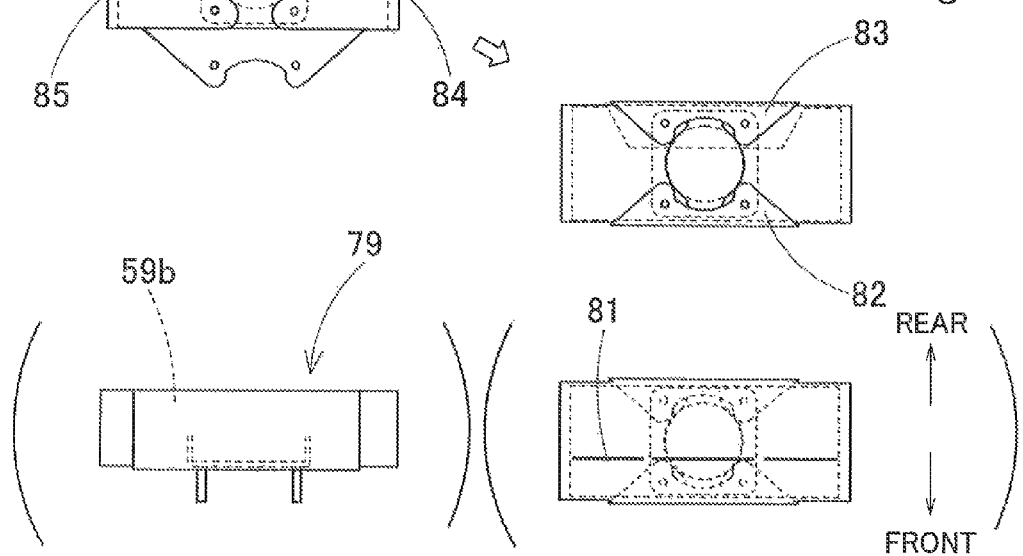

AIRBAG APPARATUS

The present application claims priority from Japanese Patent Application No. 2013-227304 of Miura et al., filed on Oct. 31, 2013, Japanese Patent Application No 2014-133012 of Miura et al., filed on Jun. 27, 2014, and Japanese Patent Application No. 2014-173233 of Miura et at, filed on Aug. 27, 2014, the disclosures of which are hereby incorporated into the present application by reference.

BACKGROUND OF THE INVENTION

Field of the Invention

The present invention relates to an airbag apparatus mounted in a vehicle, in particular to an airbag apparatus including a regulating member that regulates the deployment and inflation of a part of an airbag when the airbag deploys and inflates.

Description of Related Art

The related art discloses an airbag apparatus that regulates (suppresses) the deployment and inflation of a part of an airbag. When the airbag deploys and inflates, the deployment and inflation of a part of the airbag is suppressed further than other portion, and the other portions of the airbag deploy and inflate earlier than a part of the airbag. This type of airbag apparatus adopts a holding member (regulating member) having shape holding properties. The holding member includes two pocket-shaped portions that accommodate folded portions of the airbag. When the airbag is folded and accommodated in an accommodating portion, two folded portions of the airbag are preliminarily held in the pockets of the holding member. At an initial stage of the deployment and inflation of the airbag, the folded portions are preliminarily held in the holding member so as to be momentarily detained in the pockets of the holding member. Thereafter, the folded portions escape from the holding member, and then deploy and inflate.

The holding member has a rectangular parallelepiped box shape having shape holding properties. The holding member is also used as a wrapping member that wraps the airbag so as not to collapse the folded shape of the airbag. Both box-shaped portions of the holding member function as the pocket-shaped holding portions for the folded portions of the airbag. At the inflation of the airbag, in the holding member, the edge of a center opening of each of the holding portions is bent into a convex shape. The edges of the center openings regulate the deployment and inflation of the airbag until the folded portions of the airbag are released to escape from the holding portions.

SUMMARY OF THE INVENTION

However, in the airbag apparatus of the related art, the box-shaped holding member has shape holding properties so as to maintain the folded shape of the airbag. When the folded portion of the airbag is released, a cylindrical opening at an end of the holding portion of the holding member (regulating member) is widened. In the airbag apparatus of the related art, a circumferential wall of the holding portion is fixed to a rigid attachment portion of the airbag apparatus. For this reason, the circumferential edge of the opening of the holding portion is unlikely to be deformed, and the folded portion can be smoothly released. That is, in the airbag apparatus of the related art, there is a problem in excessively regulating (suppressing) the deployment and inflation of the airbag.

The present invention is made to solve the problem, and an object of the present invention is to provide an airbag apparatus that smoothly regulates the deployment and inflation of an airbag and releases the regulation at an initial stage of the deployment and inflation.

The airbag apparatus according to the present invention includes an airbag and a regulating member. The airbag is accommodated and held in the accommodating portion while being folded, protrudes from the accommodating portion while being unfolded, and deploys and inflates when inflating gas flows into the airbag. The regulating member is attached to the accommodating portion so as to be able to regulate the deployment and inflation of a part of the airbag, when the airbag deploys and inflates. The regulating member is flexible. The regulating member includes a temporary holding portion; an attachment portion; and a connecting piece portion. The temporary holding portion releasably and temporarily holds the folded portion that is a part of the folded airbag. The attachment portion is attached to the accommodating portion. The connecting piece portion connects the attachment portion and the temporary holding portion. The temporary holding portion includes a base portion and a cover portion. The base portion is continuous with the connecting piece portion. The cover portion forms a holding concave portion for temporarily holding the folded portion between the base portion and the cover portion, and is connected to the base portion. In the temporary holding portion, an opening for releasing the folded portion from the holding concave portion is provided at an inner circumference of a non-connected release edge of outer circumferential edges of the cover portion, the non-connected release edge not being connected to the base portion. The regulating member is accommodated in the accommodating portion together with the folded airbag.

In the airbag apparatus according to the present invention, when the inflating gas flows into the airbag, an initial deployment and inflation portion of the airbag deploys and inflates in a state where the folded portion of the airbag is temporarily held in the temporary holding portion of the regulating member. The initial deployment and inflation portion is not accommodated and held inside the temporary holding portion in the airbag, and is disposed upstream of the folded portion in a flow direction of the inflating gas. In the regulating member, in a state where the attachment portion is attached to the accommodating portion, the connecting piece portion between the attachment portion and the temporary holding portion is bent, and the temporary holding portion rotates so as to correspond to the movement of the folded portion. The folded portion of the airbag is pulled as the initial deployment and inflation portion deploys and inflates further. The folded portion also inflates. For this reason, the folded portion is released to escape from the temporary holding portion (the holding concave portion) via the release opening of the holding concave portion, which is widened when the non-connected release edge is bent. The folded portion deploys and inflates while being unfolded, and thus the entirety of the airbag is completely inflated.

When the folded portion of the airbag is released to escape from the temporary holding portion, the connecting piece portion is bent, and the temporary holding portion (the release opening) turns in order for the folded portion to easily escape from the holding concave portion. The non-connected release edge at the circumferential edge of the release opening of the temporary holding portion (holding concave portion) is also bent. For this reason, the folded portion smoothly escapes from the temporary holding portion, and is released. As a result, the regulation of the deployment and inflation of the airbag is smoothly released.

Until the folded portion is released from the temporary holding portion, the deployment and inflation of the entirety of the airbag is regulated. In other words, until the folded portion is released from the temporary holding portion, the deployment and inflation of the initial deployment and inflation portion of the airbag is regulated, and the initial deployment and inflation portion is prevented from protruding from the accommodating portion. Thereafter, the folded portion is smoothly released, and thus it is possible to complete the deployment and inflation of the entirety of the airbag including the initial deployment and inflation portion. That is, in the airbag apparatus of the present invention, it is possible to secure a desired inflating shape at the initial stage of the deployment and inflation of the airbag.

Accordingly, in the airbag apparatus of the present invention, it is possible to secure a desired inflating shape at the initial stage of the deployment and inflation of the airbag by smoothly regulating the deployment and inflation of the airbag, and releasing the regulation at the initial stage of the deployment and inflation.

In the configuration of the airbag apparatus according to the present invention, the regulating member is not bonded to an outer circumferential wall of the airbag, and the regulating member does not break when a predetermined tension is applied. In the configuration in which the regulating member breaks, it is possible to regulate the deployment and inflation of the airbag until the regulating member breaks. However, in the configuration in which the regulating member breaks, it is necessary to take bond strength between the outer circumferential wall of the airbag and the regulating member into consideration. In contrast, in the configuration of the present invention, the regulating member does not break. For this reason, in the present invention, it is not necessary to take bond strength between the outer circumferential wall of the airbag and the regulating member into consideration. That is, in the present invention, it is possible to properly and conveniently regulate the deployment and inflation of a predetermined portion of the airbag by simply accommodating the predetermined folded portion of the airbag inside the holding concave portion of the temporary holding portion.

In the airbag apparatus according to the present invention, the regulating member may be made of a piece of flexible regulating member formation sheet material. The sheet material is formed when an attachment formation portion, a connecting piece formation portion, a base formation portion, and a cover formation portion are continuous with each other. The attachment formation portion forms the attachment portion, the connecting piece formation portion forms the connecting piece portion, the base formation portion forms the base portion, and the cover formation portion forms the cover portion. The temporary holding portion is formed by folding the flatly deployed regulating member formation sheet material in order for the cover formation portion to be stacked on the base formation portion, and stitching together outer circumferential edges.

In this configuration, it is possible to form the temporary holding portion provided with the holding concave portion only by folding the regulating member formation sheet material in order for the cover formation portion to be stacked on the base formation portion, and stitching together predetermined portions. For this reason, in this configuration, it is possible to conveniently form the regulating member, using a piece of the regulating member formation sheet material.

In the airbag apparatus according to the present invention, the cover portion may be made of a flexible sheet material that is formed separate from a member of the base portion. In a case of using the sheet material, when at least edges extending from opposite ends of the non-connected release edge of the outer circumferential edge are stitched to the member of the base portion, the cover portion can be formed.

In this configuration, the cover portion is formed separate from the base portion. For this reason, when preparing the cover portion and the base portion by cutting thereof from a predetermined sheet material, the sheet material is cut in small pieces compared to a case of a piece of sheet material from which the cover portion and the base portion are cut in a continuous shape. As a result, such a configuration allows a favorable yield rate of the sheet material.

In this configuration, in a case of separately providing the cover portion, the member of the base portion may be a wrapping member which wraps the completely folded airbag so as to prevent the folded airbag from collapsing.

In this case, portions of the regulating member excluding the cover portion may be made of the wrapping member. For this reason, in such a configuration, it is possible to commonly use the regulating member and the wrapping member, and thus, it is possible to reduce the number of components in the airbag apparatus and to reduce the quantity of materials used in the regulating member.

In this configuration, the cover portion may cause an edge of the outer circumferential edge facing the non-connected release edge to be a non-connected edge which is not connected to the base portion.

In this case, only the edges extending from the end of the non-connected release edge may be stitched when stitching the cover portion. For this reason, stitching of the regulating member may be simplified. Even though the edge of the cover portion facing the non-connected release edge is not stitched to the base portion, the folded portion of the airbag may smoothly escape from the release opening which is the non-connected release edge in the cover portion. For this reason, despite of such a configuration, a releasing performance of the folded portion to be released from the temporary holding portion is not degraded.

In the airbag apparatus according to the present invention, a completely folded body of the airbag may be completely folded in such a manner that the folded portion is disposed close to a ceiling surface of the completely folded body, and a bottom surface is held by the accommodating portion. In the regulating member, the attachment portion is disposed on the bottom surface of the completely folded body, and the connecting piece portion is disposed on a side surface of the completely folded body. In the regulating member, the temporary holding portion is disposed on the ceiling surface of the completely folded body while the base portion is disposed on an external surface of the completely folded body so as to face outward, and the cover portion is disposed toward the bottom surface of the completely folded body. The regulating member is accommodated in the accommodating portion together with the airbag.

In this configuration, when the airbag is folded and accommodated, the connecting piece portion is bent in such a manner that the temporary holding portion is parallel with the bottom surface of the completely folded body. For this reason, when the folded portion escapes from the release opening of the temporary holding portion during the inflation of the airbag, the connecting piece portion is bent, and the temporary holding portion turns so as to separate from the bottom surface of the accommodating portion. When the folded portion is released to escape from the release opening of the temporary holding portion, the release opening is widened while being bent in such a manner that the edge apart from the base portion separates from the bottom surface of the accommodating portion. It is possible to smoothly regulate the deployment and inflation of the airbag for a time period when the temporary holding portion turns, and the release opening is widened. After the regulation of the deployment and inflation of the airbag is completed, the connecting piece portion is bent, and the non-connected release edge is bent, and thus the release opening is considerably widened. As a result, it is possible to smoothly release the folded portion, and smoothly release the regulation of the deployment and inflation.

In this configuration, the regulating member may include the suppressing arm portions which suppress the deployment and inflation of the folded portion. The suppressing arm portions extend from opposite edges interposing the connecting piece portion therebetween in the temporary holding portion so as to be connected to the accommodating portion and suppress the deployment and inflation of the folded portion at an initial stage of the inflation of the airbag.

In this case, turning of the release opening (temporary holding portion) is suppressed by the suppressing arm portion, thereby regulating the deployment and inflation of the airbag. In this case, regulating of the deployment and inflation is favorably enhanced without hindering bending of the portion of the non-connected release edge facing the base portion, that is, without hindering a smooth release of the folded portion.

In this case, each of the suppressing arm portions may include a plurality of connection places connected to the accommodating portion. The plurality of connection places are disposed substantially along a direction orthogonal to a facing direction of the suppressing arm portions. In this case, the suppressing arm portions are connected to the accommodating portion at the plurality of places in a direction along the turning surface of the release opening (temporary holding portion). For this reason, turning of the release opening (temporary holding portion), specifically, turning in the vicinity of the opposite edges of the temporary holding portion is further suppressed by the suppressing arm portion. As a result, in this case, the deployment and inflation of the airbag can be further suppressed without hindering a smooth release of the folded portion.

In a case where the completely folded body of the airbag is formed to be folded while disposing an initial deployment and inflation portion of the airbag from below the folded portion accommodated in the temporary holding portion to a side surface separated from the connecting piece portion in the side surfaces of the completely folded body, the regulating member may include the following suppressing arm portion. The initial deployment and inflation portion is a portion at a further upstream side of the inflating gas than the folded portion.

In this case, the suppressing arm portions respectively extend toward a distal end of the temporary holding portion from the vicinity of opposite edges interposing the connecting piece portion therebetween in the temporary holding portion so as to cover the side surface separated from the connecting piece portion in the side surfaces of the completely folded body, extend toward the bottom surface of the completely folded body so as to be connected to the accommodating portion. The suppressing arm portions are detachable so as to separate from the covered side surface of the completely folded body in order to be able to suppress the deployment and inflation of the initial deployment and inflation portion when the initial deployment and inflation portion of the airbag inflates.

In this case, the suppressing arm portions respectively extend toward the distal end of the temporary holding portion so as to cover the side surface separated from the connecting piece portion in the side surfaces of the completely folded body, in other words, the suppressing arm portions cover the side surface from above the initial deployment and inflation portion of the airbag and are connected to the accommodating portion. For this reason, at an initial stage of inflation of the airbag, the deployment and inflation of the initial deployment and inflation portion of the airbag is suppressed until two suppressing arm portions separate from each other so as to be freed from the side surfaces of the completely folded body. Naturally, the suppressing arm portions extend to the distal end of the temporary holding portion from both the edges of the temporary holding portion, thereby being bent so as to cover the side surface of the initial deployment and inflation portion. The suppressing arm portions are also bent so as to extend to the bottom surface of the completely folded body, thereby being connected to the accommodating portion. That is, two suppressing arm portions are respectively provided with at least two bending portions, and have long length extending from the ceiling surface of the completely folded body to the bottom surface via the side surface. For this reason, although deployment of the initial deployment and inflation portion is suppressed, the suppressing arm portions do not hinder inflation of the initial deployment and inflation portion when freed from the completely folded body. Moreover, the suppressing arm portions do not hinder the operation itself of the regulating member, such as bending the connecting piece portion and turning the temporary holding portion.

In this configuration, the suppressing arm portions can be provided to cover an outer surface of the base portion of the temporary holding portion, and to be connected to the accommodating portion. Otherwise, such suppressing arm portion described above can be provided so as to extend from the cover portion of the temporary holding portion and to be connected to the accommodating portion.

In a case where the completely folded body of the airbag is formed to be folded while disposing the initial deployment and inflation portion of the airbag from below the folded portion accommodated in the temporary holding portion to a side surface separated from the connecting piece portion in the side surfaces of the completely folded body, the regulating member may include the following suppressing portion. The initial deployment and inflation portion is a portion at a further upstream side of the inflating gas than the folded portion.

In this case, the deployment suppressing portion includes the base portion and the connection arm portion. The base portion extends from the non-connected release edge of the cover portion in the temporary holding portion. The base portion is provided to be bent between the upper surface of the initial deployment and inflation portion below the folded portion and the cover portion from the non-connected release edge. The connection arm portions respectively extend from opposite sides of the base portion to the bottom surface of the completely folded body so as to be connected to the accommodating portion. The deployment suppressing portion is detachable from the covered initial deployment and inflation portion at the inflation of the initial deployment and inflation portion of the airbag in order to suppress the deployment and inflation of the folded portion at the initial inflation of the airbag.

In this configuration, the deployment suppressing portions is in a state where both the connection arm portions are connected to the accommodating portion on the bottom surface of the completely folded body. The base portion is in a state of pressing the upper surface of the initial deployment and inflation portion immediately below the folded portion. For this reason, at an initial stage of inflation of the airbag, the deployment suppressing portion can suppress the deployment and inflation of the initial deployment and inflation portion until the initial deployment and inflation portion is detached from the deployment suppressing portion. Moreover, in a state where the deployment and inflation portion is detached from the initial deployment and inflation portion, the base portion of the deployment suppressing portion is turned inside out to the non-connected release edge of the temporary holding portion, thereby suppressing bendability of the non-connected release edge. The folded portion is regulated not to escape from the temporary holding portion for a period until the release opening of the temporary holding portion is significantly open. That is, the deployment suppressing portion can suppress the deployment and inflation of the initial deployment and inflation portion at the initial inflation of the airbag, and can suppress the folded portion from being released from the temporary holding portion. As a result, in this case, regulation of the deployment and inflation at the initial inflation is more favorably enhanced.

The deployment suppressing portion extends from the cover portion of the temporary holding portion and is not directly connected to the base portion and the connected piece portion. For this reason, the temporary holding portion itself can be turned by bending the connected piece portion so as to be separated away from the bottom surface of the accommodating portion in order to easily release the folded portion. As a result, the deployment suppressing portion does not exceedingly hinder a release of the folded portion.

In the airbag apparatus according to the present invention, the airbag apparatus may be mounted on an inner side of an upper surface of an instrument panel in front of a front passenger seat of a vehicle and below a windshield. The holding concave portion of the temporary holding portion of the regulating member may accommodate a rear portion, which is a part of the folded airbag, as the folded portion.

In this configuration, when the front passenger seat airbag deploys and inflates, the temporary holding portion of the regulating member accommodates and holds the folded portion that is the rear portion of the completely folded body, and delays the deployment and inflation of the folded portion. As the deployment and inflation of the rear portion is delayed, the deployment and inflation of the front portion of the completely folded body is prevented. At the initial stage of the deployment and inflation of the front passenger seat airbag, the front portion of the completely folded body is the portion that protrudes from the accommodating portion toward the windshield thereabove. For this reason, in this configuration, the deployment of the front portion of the completely folded body is prevented, and thus it is possible to prevent the airbag from strongly interfering with the windshield.

BRIEF DESCRIPTION OF THE DRAWINGS

FIGS. 11A to 11D are views sequentially illustrating steps of wrapping a completely folded body of the airbag of the embodiment, using a wrapping member.

DETAILED DESCRIPTION OF THE INVENTION

Preferred embodiments of the present invention are described below with reference to accompanying drawings. However, the invention is not regulated to the embodiments disclosed herein. All modifications within the appended claims and equivalents relative thereto are intended to be encompassed in the scope of the claims.

Figure 1:
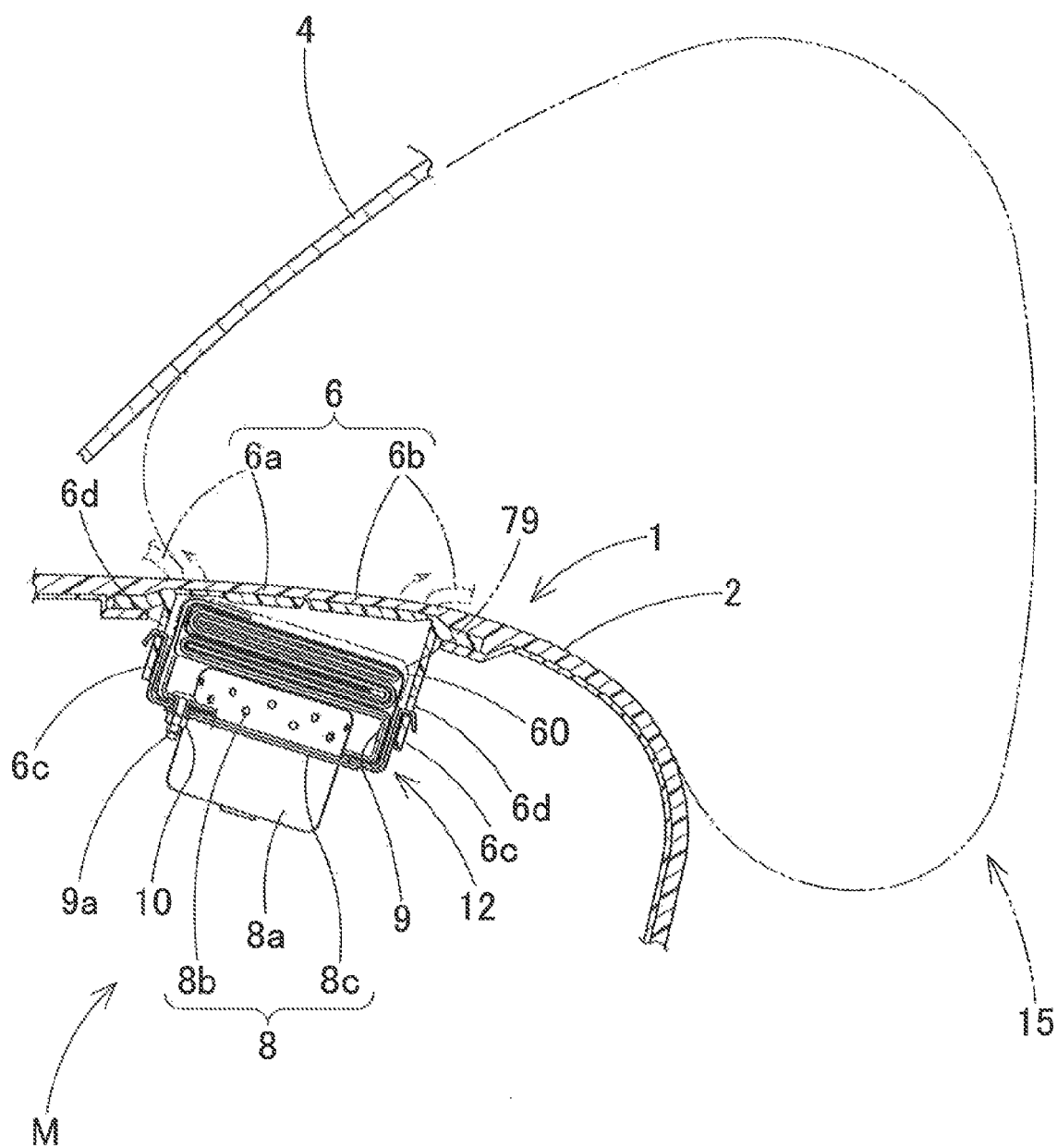
FIG. 1 is a schematic vertical cross-sectional view illustrating a state in which a front passenger seat airbag apparatus according to a first embodiment of the present invention is mounted in a vehicle.

In an embodiment, a front passenger seat airbag apparatus M that is disposed in front of a front passenger seat will be described as an example of an airbag apparatus. As illustrated in FIG. 1, the front passenger seat airbag apparatus M (hereinafter, referred to as an "airbag apparatus") of the embodiment is a top mounted airbag apparatus, and is mounted inside an instrument panel 1 below a windshield 4 so as to be positioned below an upper surface 2 of the instrument panel 1.

As illustrated in FIGS. 1 and 12, the airbag apparatus M includes a folded airbag 15; an inflator 8; a case 12; a retainer 9; and an airbag cover 6. The inflator 8 supplies inflating gas to the airbag 15. The case 12 is an accommodating portion that accommodates and holds the airbag 15 and the inflator 8. The retainer 9 attaches the airbag 15 and the inflator 8 to the case 12. The airbag cover 6 covers the top of the folded airbag 15. In addition, the airbag apparatus M includes a regulating member 60 and a wrapping member 79. The regulating member 60 regulates the deployment and inflation of the airbag 15. The wrapping member 79 wraps around a completely folded body 53 that is formed when the airbag 15 is folded.

The airbag cover 6 is formed integrally with the instrument panel 1 made of synthetic resin. The airbag cover 6 includes two door portions 6a and 6b that are pushed by the airbag 15 and are respectively opened forward and rearward when the airbag 15 deploys and inflates. Connection wall portions 6c connected to the case 12 are formed in the surrounding area of the door portions 6a and 6b of the airbag cover 6. A locking hole 6d for locking a locking claw 12c of the case 12 is formed in the connection wall portion 6c.

The inflator 8 includes a substantially columnar main body portion 8a and a flange portion 8c. The main body portion 8a has a plurality of gas discharge ports 8b. The flange portion 8c is a portion for attaching the inflator 8 to the case 12.

The case 12 as an accommodating portion made of sheet metal has a substantially rectangular parallelepiped shape having a rectangular parallelepiped opening at an upper end thereof, and includes a bottom wall portion 12a and a circumferential wall portion 12b. The bottom wall portion 12a has a substantially rectangular parallelepiped sheet shape, and is a portion which the inflator 8 penetrates from below and to which the inflator 8 is attached. The circumferential wall portion 12b extends upward from an outer circumferential edge of the bottom wall portion 12a. The circumferential wall portion 12b is locked into the connection wall portion 6c of the airbag cover 6. That is, the locking claw 12c is formed at an upper end of the circumferential wall portion 12b, is inserted into the locking hole 6d of the connection wall portion 6c, and is locked into the connection wall portion 6c.

In the embodiment, the airbag 15 and the inflator 8 are attached to the bottom wall portion 12a of the case 12, using bolts 9*a* of the retainer 9 as attaching means. The retainer 9 is disposed inside the airbag 15. Each of the bolts 9*a* protrudes out of the airbag 15 via an attachment seat 18 (to be described later) of the airbag 15, and penetrates the regulating member 60; the wrapping member 79; the bottom wall portion 12*a*; and the flange portion 8*c* of the inflator 8. Each of the bolts 9*a* is tightened into a nut 10. For this reason, the airbag 15 and the inflator 8 are attached to the bottom wall portion 12*a* of the case 12. The bottom wall portion 12*a* of the case 12 is provided with a bracket (not illustrated) that is connected to a body of a vehicle.

Figure 2:
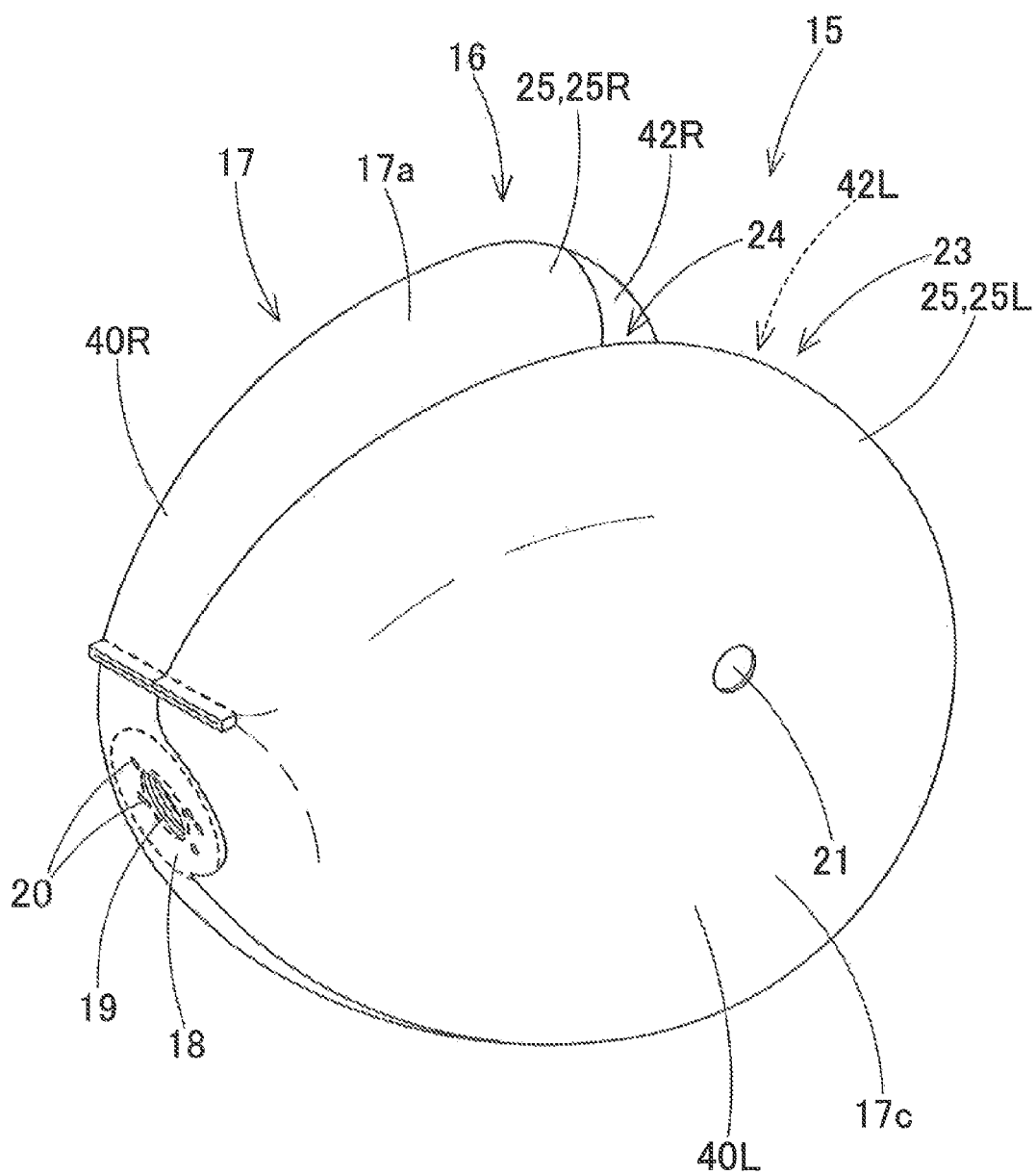
FIG. 2 is a perspective view of an inflated airbag unit used in the front passenger seat airbag apparatus of the embodiment, when seen from the front.
Figure 3:
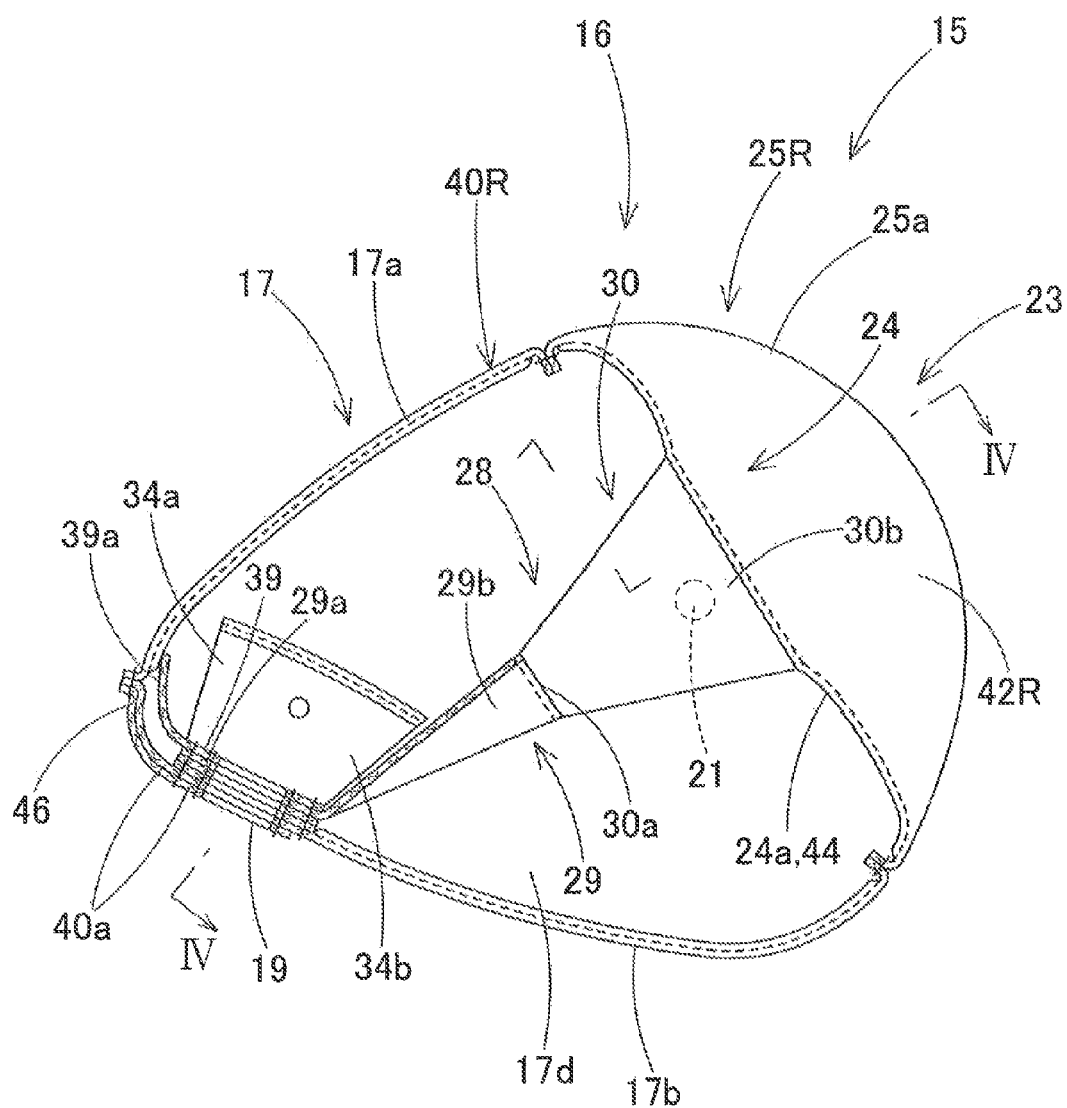
FIG. 3 is a vertical cross-sectional view of the airbag in FIG. 2, taken along a longitudinal direction.
Figure 4:
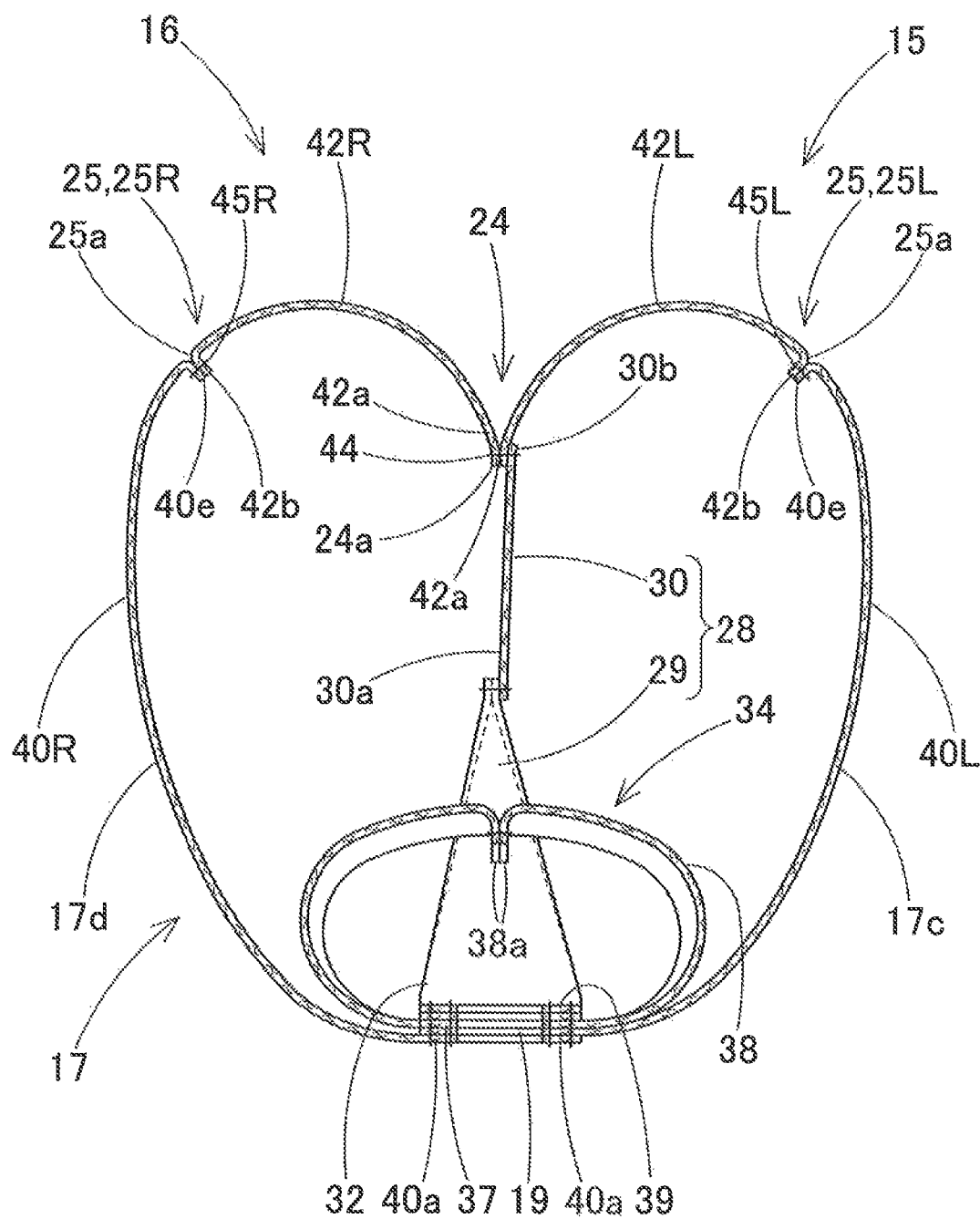
FIG. 4 is a schematic horizontal cross-sectional view of the airbag in FIG. 2, taken along line IV-IV in FIG. 3 in the longitudinal direction.

In the embodiment, as illustrated in FIGS. 2 to 4, the airbag 15 includes a bag main body 16 that inflates when the inflating gas flows thereinto; a tether 28; and a redirecting flow cloth 34. The tether 28 is disposed inside the bag main body 16, and regulates the completely inflated shape of the bag main body 16. The redirecting flow cloth 34 controls the flow direction of the inflating gas inside the bag main body 16.

As illustrated by the two-dot chain line in FIG. 1, the completely inflated bag main body 16 has a substantially bag-like shape, and blocks a space between the upper surface 2 of the instrument panel 1 and the windshield 4 above the instrument panel 1. Specifically, as illustrated in FIGS. 2 to 4, when the bag main body 16 is completely inflated, the bag main body 16 has a substantially quadrangular pyramidal shape in which an apex portion of the bag main body 16 is provided at a front end, and includes an occupant wall portion 23 and a circumferential wall portion 17. The occupant wall portion 23 is disposed in a rear portion of the bag main body 16, and the rear portion faces an occupant when the bag main body 16 is completely inflated. When the bag main body 16 is completely inflated, the circumferential wall portion 17 extends forward from a circumferential edge of the occupant wall portion 23, and has a tapered shape that converges toward the front end.

The circumferential wall portion 17 is mainly disposed so as to block the space between the upper surface 2 of the instrument panel 1 and the windshield 4 above the instrument panel 1 when the airbag 15 is completely inflated. The circumferential wall portion 17 includes an upper wall portion 17*a*; a lower wall portion 17*b*; a left wall portion 17*c*; and a right wall portion 17*d*. The upper wall portion 17*a* and the lower wall portion 17*b* are respectively disposed on the top and bottom of the circumferential wall portion 17, and are disposed along a substantially lateral direction. The right wall portion 17*d* and the left wall portion 17*c* are respectively disposed on the right and left of the circumferential wall portion 17, and are disposed along a substantially longitudinal direction. A gas inflow port 19 which is open in a substantially circular shape is formed in the vicinity of the front end of the completely inflated bag main body 16, and substantially at a center of the lower wall portion 17*b* in the lateral direction. The gas inflow port 19 is an opening through which the inflating gas flows into the bag main body 16. The attachment seat 18 is formed at a circumferential edge of the gas inflow port 19, and is attached to the bottom wall portion 12*a* of the case 12. A plurality of (four in the embodiment) attachment holes 20 is in the attachment seat 18, and the bolt 9*a* of the retainer 9 passes through each of the attachment holes 20. Vent holes 21 are respectively formed in the right wall portion 17*d* and the left wall portion 17*c* of the circumferential wall portion 17. The extra inflating gas flowing into the bag main body 16 is discharged via the vent hole 21.

When the bag main body 16 is completely inflated, the occupant wall portion 23 is provided in a rear end of the bag main body 16 along a substantially vertical direction, the rear end facing the occupant. The occupant wall portion 23 includes a concave portion 24 which is provided substantially at a center of the completely inflated bag main body 16 in the lateral direction, and which is concave forward. Protruding portions 25 (25R, 25L) are respectively provided on right and left sides of the concave portion 24 of the occupant wall portion 23, and protrude rearward relative to the concave portion 24. That is, in the embodiment, when the bag main body 16 is completely inflated, the center concave portion 24, and the respective protruding portions 25R and 25L on the right and left sides of the concave portion 24 are continuously provided in the occupant wall portion 23 of the bag main body 16 along the vertical direction (refer to FIGS. 3 and 4). Specifically, in the embodiment, the protruding portions 25R and 25L and the concave portion 24 are concave to the maximum amount in the vicinity of the center of the occupant wall portion 23 in the vertical direction. The convexity of the occupant wall portion 23 converges toward a lower end of the occupant wall portion 23, and the concavity of the circumferential wall portion 17 converges toward a front end in the region of the upper wall portion 17*a* of the circumferential wall portion 17. In the bag main body 16 of the embodiment, a bottom portion (a front end 24*a*) of the convexity of the concave portion 24 is formed by an inner stitched portion 44 that is obtained by stitching together respective inner circumferential edges 42*a*, 42*a* of an inner right panel 42R and an inner left panel 42L which will be described later. A protruding apex portion 25*a* of the protruding portion 25R is formed by an outer stitched portion 45R that is obtained by stitching a rear edge 40*e* of an outer right panel 40R (to be described later) to an outer circumferential edge 42*b* of the inner panel 42R, and the protruding apex portion 25*a* of the protruding portion 25L is formed by an outer stitched portion 45L that is obtained by stitching the rear edge 40*e* of a outer left panel 40L (to be described later) to the outer circumferential edge 42*b* of the inner panel 42L (refer to FIGS. 3 and 4).

When the bag main body 16 is completely inflated, the tether 28 is disposed inside the bag main body 16 so as to prevent the bottom portion (the front end 24*a*) of the concave portion 24 from protruding rearward. In the embodiment, as illustrated in FIGS. 3 and 4, the tether 28 includes a front portion 29 that is connected to the circumferential wall 17, and a rear portion 30 that is connected to the occupant wall portion 23.

Figure 5:
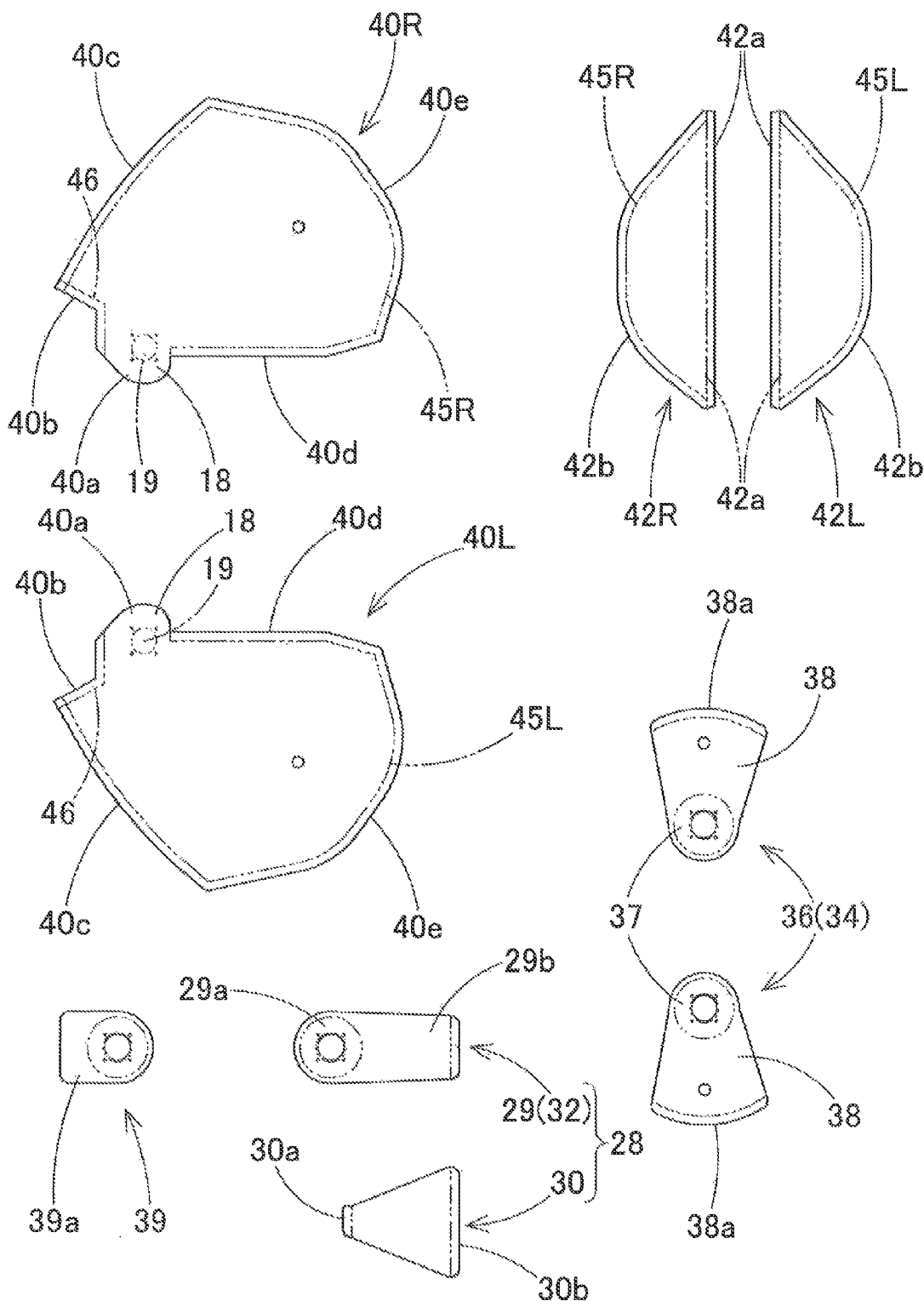
FIG. 5 is a plan view illustrating base cloths that form the airbag of the embodiment.

The front portion 29 is formed by folding a part of a front portion material 32 illustrated in FIG. 5, and is symmetrical in the lateral direction with the gas inflow port 19 being the center of the symmetry. As illustrated in FIGS. 3 and 4, when the bag main body 16 is completely inflated, the front portion 29 has a three-dimensional shape close to a substantially triangular pyramidal exterior shape. That is, a front end 29*a* of the front portion 29 extends along the substantially lateral direction, and a rear end 29*b* thereof extends along the substantially vertical direction. Specifically, the region of the front end 29*a* of the front portion 29 is connected to the lower wall portion 17*b* of the circumferential wall portion 17 in the region of the attachment seat 18. The front portion 29 has a shape close to a substantially triangular pyramidal shape by drawing folding lines from a portion of the front portion 29 connected to the attachment seat 18 to a portion thereof extending rearward. The rear end 29*b* of the front portion 29 is stitched to a front end 30*a* of the rear portion 30.

The rear portion 30 has a substantially trapezoidal exterior shape. As illustrated in FIG. 3, a wide rear end 30*b* of the rear portion 30 is stitched to the bottom portion (the front end 24a) of the concave portion 24 substantially at a center of the occupant wall portion 23 in the vertical direction, and the narrow front end 30a is stitched to the rear end 29b of the front portion 29.

As illustrated in FIGS. 3 and 4, the redirecting flow cloth 34 is provided so as to cover the top of the gas inflow port 19. The redirecting flow cloth 34 has a substantially cylindrical shape having open opposite ends in the longitudinal direction in such a manner that the inflating gas flowing via the gas inflow port 19 can flow forward and rearward. For this reason, the inflating gas flowing via the gas inflow port 19 flows into the bag main body 16 along the longitudinal direction via a front opening 34a and a rear opening 34b of the redirecting flow cloth 34. In the embodiment, the redirecting flow cloth 34 is made of a pair of redirecting flow cloth materials 36, 36 illustrated in FIG. 5. The redirecting flow cloth materials 36 are symmetrical with each other in the lateral direction, and each of the redirecting flow cloth materials 36 includes a connection portion 37 that is stitched to the circumferential edge of the gas inflow port 19, and a main body portion 38 that extends outward from the connection portion 37 in the lateral direction. Each of the redirecting flow cloth material 36 is attached to the bag main body 16 by stitching the connection portion 37 to the attachment seat 18 of the circumferential edge of the gas inflow port 19. The redirecting flow cloth 34 is formed by stitching together distal ends 38a that are respectively separate from the connection portions 37 of the main body portions 38.

The bag main body 16 has a bag-like shape that is obtained by bonding together the respective circumferential edges of base cloths of a predetermined shape. As illustrated in FIG. 5, the bag main body 16 is made of four pieces of base cloths that include the outer right panel 40R and the outer left panel 40L which are respectively disposed outward of the inner right panel 42R and the inner left panel 42L in the lateral direction when the bag main body 16 is completely inflated; and the inner right panel 42R and the inner left panel 42L which are respectively disposed inward of the outer right panel 40R and the outer left panel 40L in the lateral direction when the bag main body 16 is completely inflated.

The outer right panel 40R is symmetrical with the outer left panel 40L in the lateral direction. When the bag main body 16 is completely inflated, the outer right panel 40R and the outer left panel 40L form the main region of the circumferential wall portion 17; and the main regions of the occupant wall portion 23 that are positioned outward of the respective protruding apex portions 25a of the protruding portions 25R and 25L of the occupant wall portion 23 in the lateral direction. The outer right panel 40R and the outer left panel 40L are disposed in such a manner that the above-mentioned regions are laterally divided by a dividing plane which passes through the center of the gas inflow port 19 along the longitudinal direction, except for portions that form the attachment seat 18. As illustrated in FIG. 5, each of the outer right panel 40R and the outer left panel 40L includes a protruding portion 40a that forms the attachment seat 18.

The inner right panel 42R and the inner left panel 42L form an inner region between the respective protruding apex portions 25a of the protruding portions 25R and 25L of the occupant wall portion 23. The inner right panel 42R and the inner left panel 42L are disposed in such a manner that the inner region between the protruding apex portions 25a is laterally divided into two regions at the position of the bottom portion (the front end 24a) of the concave portion 24.

A reinforcing cloth 39 of a substantially circular shape is provided in the bag main body 16 so as to reinforce the circumferential edge of the gas inflow port 19. The reinforcing cloth 39 includes an extending portion 39a that extends forward of the gas inflow port 19. As illustrated in FIG. 3, when the airbag 15 is completely inflated, the extending portion 39a covers an inner circumference of a front stitched portion 46 (to be described later), and prevents the inflating gas flowing via the gas inflow port 19 from coming into direct contact with the front stitched portion 46.

In the embodiment, each of the outer right panel 40R, the outer left panel 40L, the inner right panel 42R, the inner left panel 42L, the reinforcing cloth 39, the redirecting flow cloth material 36, the front portion material 32 (the front portion 29), and the rear portion 30 is a flexible woven fabric, and is a woven fabric made of polyester yarn, polyimide yarn, or the like. In the embodiment, the woven fabric is a non-coated cloth to which a coating agent such as silicon is not applied.

The manufacturing of the airbag 15 will be described. The inner stitched portion 44 is formed by stacking the flatly deployed inner right panel 42R and the flatly deployed inner left panel 42L on each other in such a manner that the respective circumferential edges thereof are aligned with each other, then stacking the rear portion 30 of the tether 28 thereon, and then stitching the inner circumferential edges 42a, 42a to the rear end 30b using stitching yarn. The flatly deployed outer right panel 40R and the flatly deployed outer left panel 40L are stacked on each other in such a manner that the respective circumferential edges thereof are aligned with each other, and lower edges 40d, 40d of the outer right panel 40R and the outer left panel 40L are stitched together using stitching yarn. The outer right panel 40R and the outer left panel 40L are opened in a state where the protruding portions 40a, 40a are stacked on each other. Thereafter, the redirection flow cloth materials 36, 36, the front portion material 32 of the tether 28, and the reinforcing cloth 39 are stacked on the protruding portions 40a, 40a in sequence, a portion to form the attachment seat 18 is stitched using stitching yarn, and the gas inflow port 19 and the attachment holes 20 are formed by a punching process. Subsequently, the outer right panel 40R and the outer left panel 40L are stacked on each other in such a manner that the respective circumferential edges thereof are aligned with each other, and upper edges 40c, 40c of the outer right panel 40R and the outer left panel 40L are stitched together using stitching yarn. Thereafter, the outer right panel 40R and the outer left panel 40L are opened in order for the rear edges 40e, 40e to separate from each other, the inner right panel 42R and the inner left panel 42L are stacked on the outer right panel 40R and the outer left panel 40L while being widened in order for outer circumferential edges 42b, 42b of the inner right panel 42R and the inner left panel 42L to separate from each other, and the outer stitched portion 45L is formed by stitching the rear edge 40e of the outer left panel 40L to the outer circumferential edge 42b of the inner left panel 42L, using stitching yarn. Similarly, the outer stitched portion 45R is formed by stitching the rear edge 40e of the outer right panel 40R to the outer circumferential edge 42b of the inner right panel 42R, using stitching yarn. Subsequently, the tether 28 is formed by folding the front portion 29 of the tether 28 in half, and stitching the folded rear end 29b to the front end 30a of the rear portion 30. The bag main body 16 is turned inside out in such a manner that a seam allowance of an edge portion of the bag main body 16 is not exposed to the outside, using an opening at non-stitched front edges 40*b* of the outer right panel 40R and the outer left panel 40L. The front stitched portion 46 is formed by folding the front edge 40*b* of each of the outer right panel 40R and the outer left panel 40L in half, stacking the front edges 40*b* on each other, and stitching the front edges 40*b* using stitching yarn. Subsequently, the redirecting flow cloth 34 is formed by pulling the respective main body portions 38 of the redirecting flow cloth materials 36 via the gas inflow port 19, and stitching together the distal ends 38*a*, using stitching yarn. It is possible to completely manufacture the airbag 15 by putting the redirecting flow cloth 34 back into the bag main body 16 via the gas inflow port 19.

Subsequently, steps of folding the airbag 15 will be described. First, the retainer 9 is disposed inside the airbag 15 in such a manner that the bolt 9*a* protrudes via each of the attachment holes 20. The airbag 15 is folded via a preliminary folding step, and then a lateral size reduction folding step and a longitudinal size reduction folding step. The lateral size reduction folding step is a step of reducing a lateral width, and the longitudinal size reduction step is a step of reducing a longitudinal width.

Figure 8A:
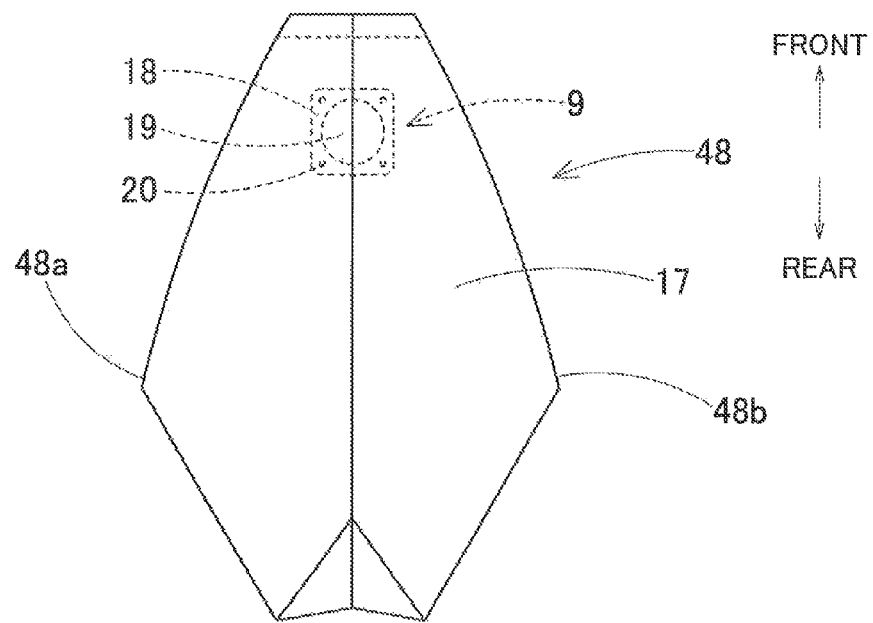
FIGS. 8A and 8B are views sequentially illustrating steps of folding the airbag of the embodiment.
Figure 8B:
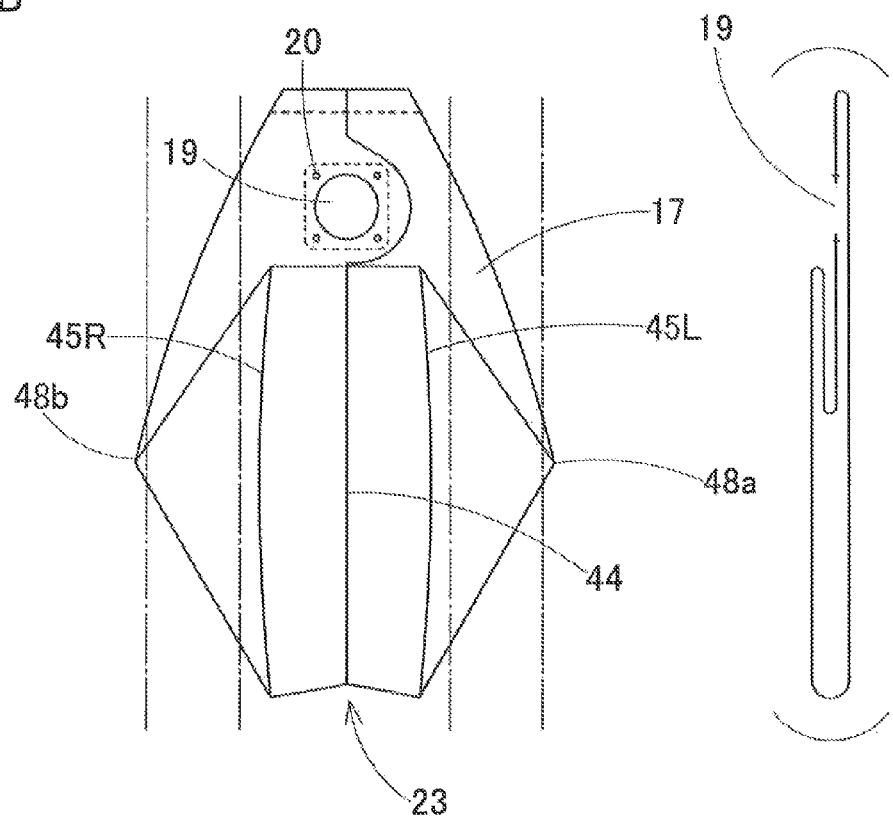

As illustrated in FIGS. 8A and 8B, first, in the preliminary folding step, a preliminary folded airbag (deployed folded body) 48 which is flatly deployed is formed. In the procedure of forming the preliminary folded airbag 48, first, the region of the occupant wall portion 23 is flatly deployed in such a manner that the outer stitched portions 45R and 45L are respectively disposed on right and left sides with the inner stitched portion 44 being centered between the outer stitched portions 45R and 45L. It is possible to form the preliminary folded airbag 48 by positioning the flatly deployed occupant wall portion 23 rearward of the gas inflow port 19, drawing folding lines in the region of the circumferential wall portion 17, and folding the circumferential wall portion 17 along the folding lines.

Figure 9A:
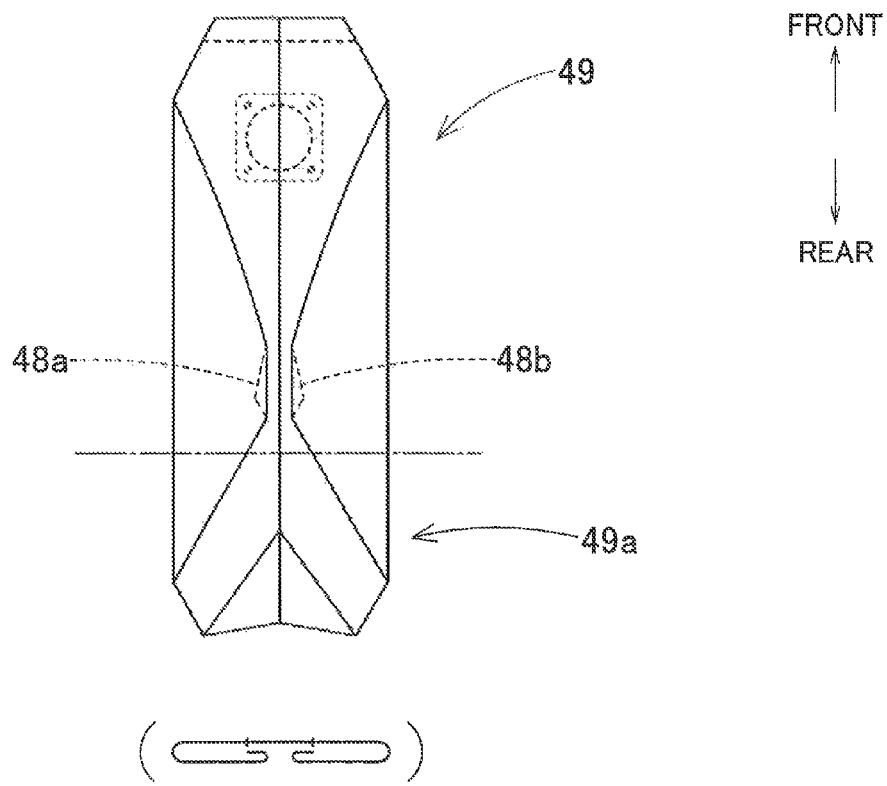
FIGS. 9A and 9B are views sequentially illustrating steps of folding the airbag of the embodiment, and illustrate the steps subsequent to the step in FIG. 8B.

The lateral size reduction folding step is a step of forming a lateral size reduced and folded airbag (lateral size reduced and folded body) 49 (refer to FIG. 9A) by reducing the lateral dimension of the preliminary folded airbag 48. That is, the lateral size reduced and folded airbag (lateral size reduced and folded body) 49 is formed by roll-folding a right edge portion 48*b* and a left edge portion 48*a* toward the occupant wall portion 23 in such a manner that the right edge portion 48*b* and the left edge portion 48*a* illustrated in FIG. 8B approach the gas inflow port 19 (refer to FIG. 9A).

The longitudinal size reduction folding step is a step of forming the completely folded body 53 (refer to FIG. 10B) by reducing the longitudinal dimension of the lateral size reduced and folded airbag 49. That is, first, a longitudinal size reduced and folded airbag (longitudinal size reduced and folded body) 50 is formed by folding a rear portion 49*a* positioned rearward of the gas inflow port 19 in the lateral size reduced and folded airbag 49 in such a manner that the rear portion 49*a* approaches the gas inflow port 19 (refer to FIG. 9B).

Figure 9B:
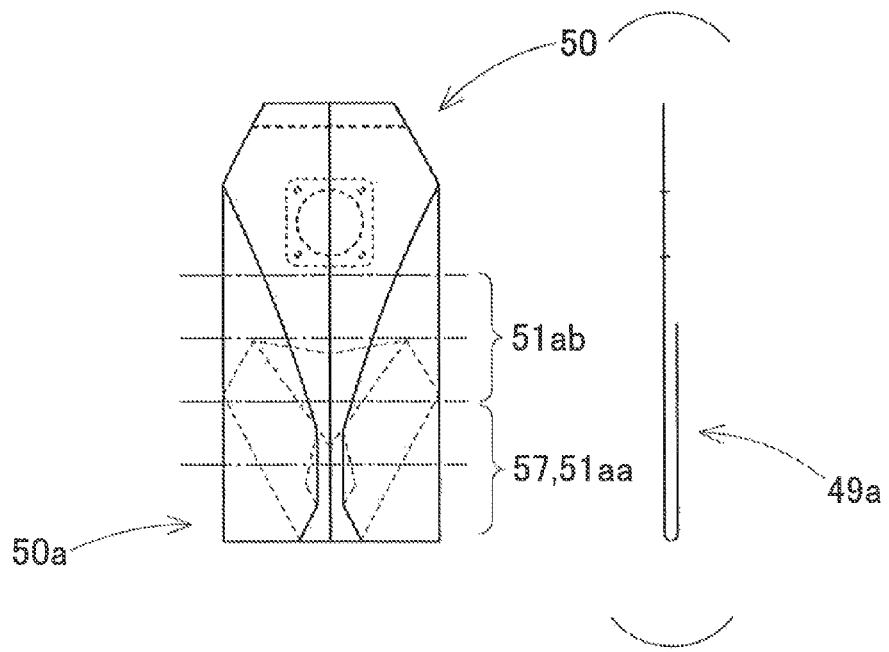
Figure 10A:
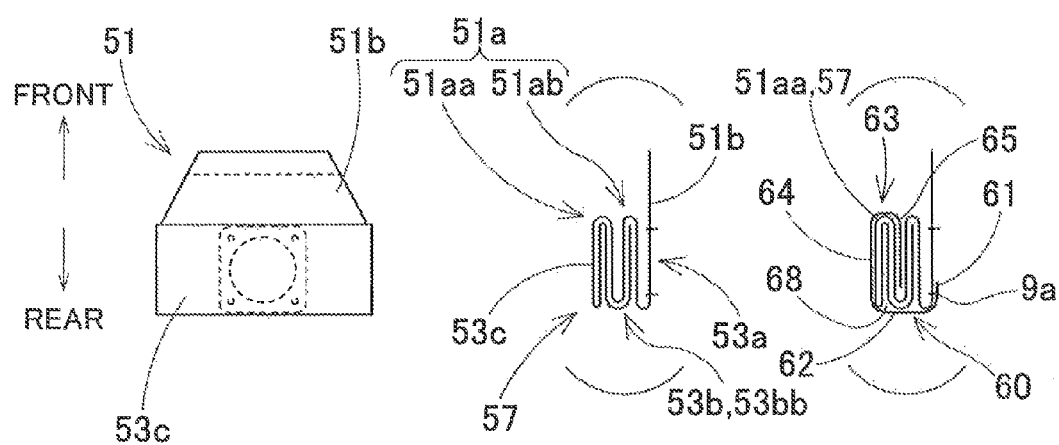
FIGS. 10A and 10B are views sequentially illustrating steps of folding the airbag of the embodiment, illustrate the steps subsequent to the step in FIG. 9B, and illustrate a state in which the regulating member is assembled to the airbag.

In addition, a longitudinal size reduced and folded airbag (longitudinal size reduced and folded body) 51 is formed by folding a rear portion 50*a* into a bellows shape, the rear portion 50*a* being positioned rearward of the gas inflow port 19 in the longitudinal size reduced and folded airbag 50, and mounting the rear portion 50*a* on the gas inflow port 19 so as to reduce the longitudinal dimension (refer to FIGS. 9B and 10A).

Figure 10B:
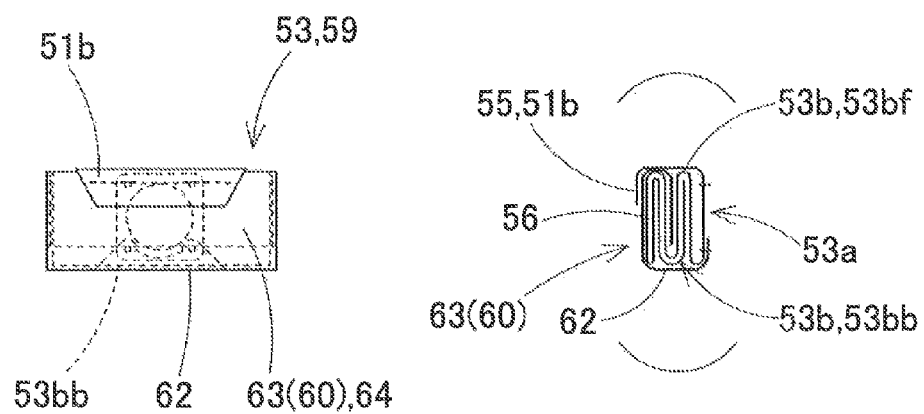

Thereafter, the folding of the airbag 15 is completed by bending a front portion 51*b* (refer to FIG. 10A) positioned forward of the gas inflow port 19 in the longitudinal size reduced and folded airbag 51 in such a manner that the front portion 51*b* covers the top of the longitudinal size reduced and folded airbag 51 from a front side of a bellows-like folded portion 51*a*. That is, as illustrated in FIG. 10B, it is possible to form the completely folded body 53 of a substantially rectangular parallelepiped shape that is wide in the lateral direction.

Figure 6:
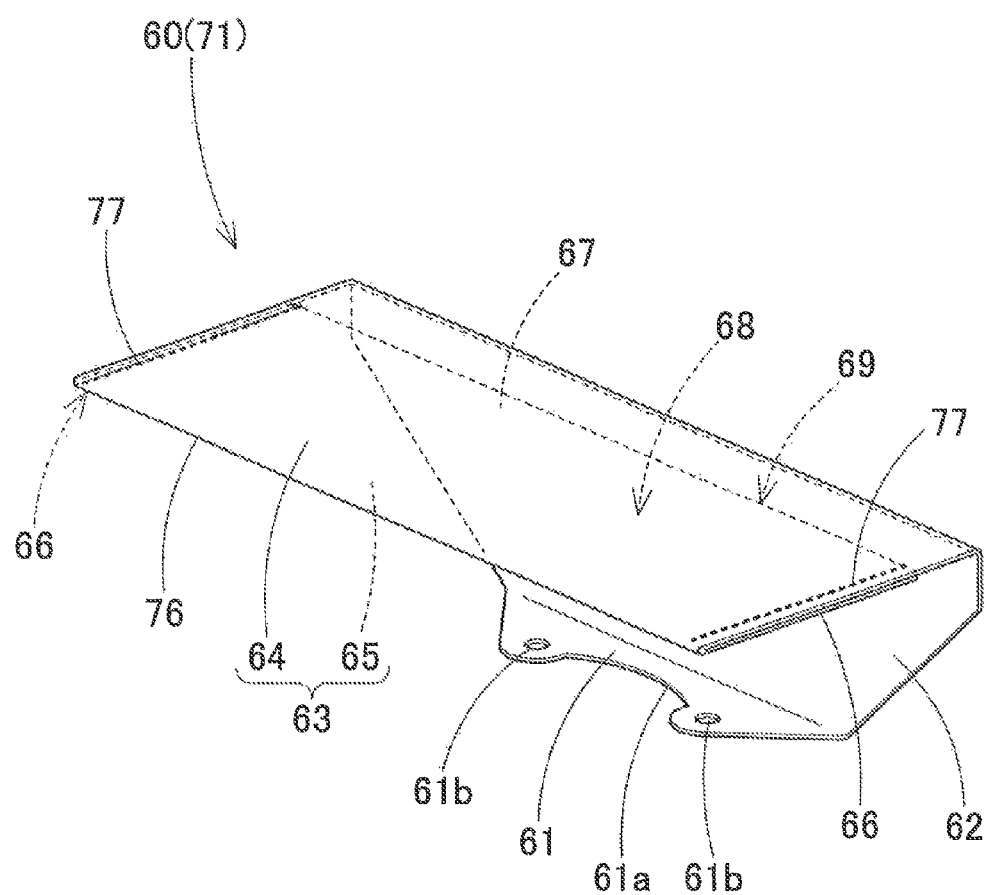
FIG. 6 is a perspective view illustrating a regulating member used in the embodiment.

As illustrated in FIGS. 1, 6, and 12, the regulating member 60 is made of a flexible sheet material, and more specifically, in the embodiment, the regulating member 60 is formed by a woven fabric made of polyester yarn, polyamide yarn, or the like similar to each panel of the airbag 15. The regulating member 60 is made of a piece of regulating member formation sheet material 71 illustrated in FIG. 7. The regulating member 60 regulates (suppresses) the deployment and inflation of the airbag 15 in such a manner that the airbag 15 has a predetermined inflating shape at an initial stage of the deployment and inflation of the airbag 15.

The regulating member 60 includes a temporary holding portion 63; an attachment portion 61; and a connecting piece portion 62. The temporary holding portion 63 releasably and temporarily holds a folded portion 57 that is a part of the folded airbag 15 (the completely folded body 53). The attachment portion 61 is attached to the bottom wall portion 12*a* of the case 12 as an accommodating portion. The connecting piece portion 62 is a bendable portion that connects the attachment portion 61 and the temporary holding portion 63.

The attachment portion 61 includes a concave portion 61*a* that is concave into a semicircular shape so as to correspond the shape of the gas inflow port 19. The attachment portion 61 includes two attachment holes 61*b* on opposite sides of the concave portion 61*a*, and the bolt 9*a* of the retainer 9 is inserted into each of the attachment holes 61*b*. When each of the bolts 9*a* are tightened into the nut 10, the attachment portion 61 is tightened, attached and fixed to the bottom wall portion 12*a* of the case 12 while being tightened together with the airbag 15 and the inflator 8.

The connecting piece portion 62 has a trapezoidal shape, the width of which is widened from the attachment portion 61, and is provided between the temporary holding portion 63 and the attachment portion 61.

The temporary holding portion 63 includes a base portion 64 and a cover portion 65. The base portion 64 has a rectangular shape and is continuous with the connecting piece portion 62. The cover portion 65 has a rectangular shape, the longitudinal length of which is short than that of the base portion 64, and the lateral width of which is equal to that of the base portion 64. The cover portion 65 is provided so as to face the base portion 64. A holding concave portion 68 is formed between the cover portion 65 and the base portion 64 so as to accommodate the folded portion 57 of the airbag 15 with the folded portion 57 being temporarily held. The holding concave portion 68 has a bag-like shape which accommodates the folded portion 57. An opening 69 of the holding concave portion 68 is disposed at a position in the base portion 64 which is continuous with the connecting piece portion 62, and the folded portion 57 accommodated in the holding concave portion 68 is released via the opening 69. That is, the opening 69 of the temporary holding portion 63 is provided at an inner circumference of a non-connected release edge 67. The non-connected release edge 67 is a portion of outer circumferential edges of the cover portion 65, and is not connected to the base portion 64.

Figure 7A:
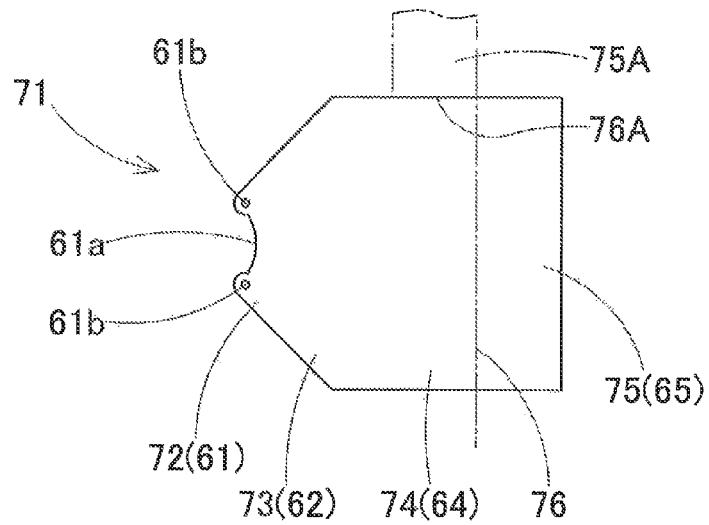
FIGS. 7A to 7C are views sequentially illustrating steps of manufacturing the regulating member of the embodiment.
Figure 7B:
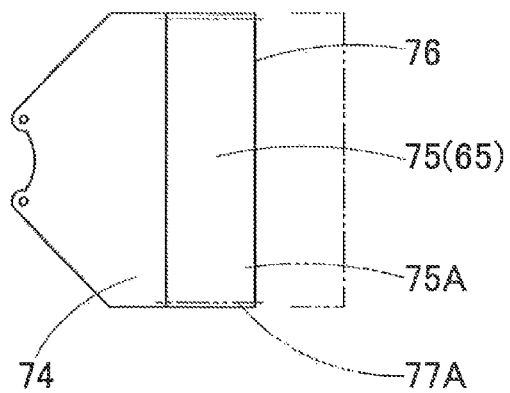
Figure 7C:
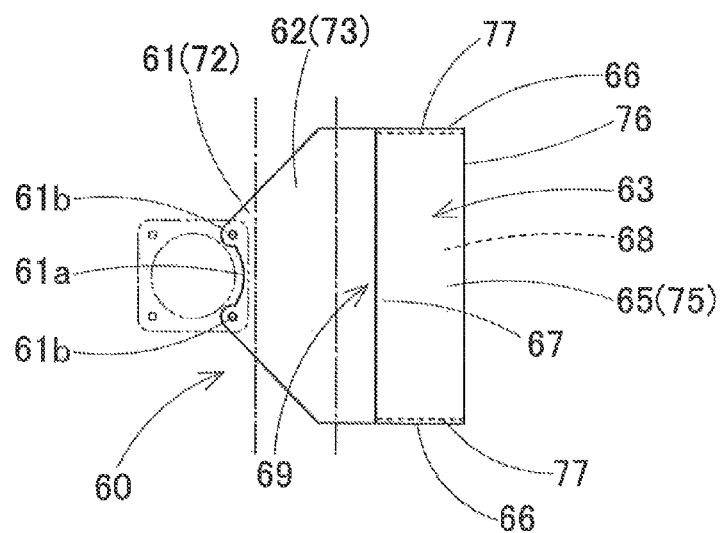

In the embodiment, the regulating member formation sheet material 71 illustrated in FIG. 7 is used to manufacture the regulating member 60. The regulating member formation sheet material 71 has a configuration in which an attachment formation portion 72, a connecting piece formation portion 73, a base formation portion 74, and a cover formation portion 75 are continuous with each other in series. The attachment formation portion 71 is a portion for forming the attachment portion 61, the connecting piece formation portion 73 is a portion for forming the connecting piece portion 62, the base formation portion 74 is a portion for forming the base portion 64, and the cover formation portion 75 is a portion for forming the cover portion 65. It is possible to form the regulating member 60 by flatly deploying the regulating member formation sheet material 71, drawing a folding line 76 at a boundary between the base formation portion 74 and the cover formation portion 75, folding the regulating member formation sheet material 71 in order for the cover formation portion 75 to be stacked on the base formation portion 74 as illustrated in FIGS. 7A and 7B, and stitching the outer circumferential edges to the base formation portion 74 as illustrated in FIG. 7C. Stitched portions 77 are opposite edges that extend from opposite ends of the non-connected release edge 67 of the cover portion 65, and when the opposite edges are stitched to the base portion 64, the opposite edges become connected edges 66, 66. It is possible to complete the formation of the regulating member 60 by forming the connected edges 66, 66.

As illustrated in FIGS. 10A and 10B, in the embodiment, the regulating member 60 is assembled to the completely folded body 53. That is, the attachment portion 61 is disposed on a bottom surface 53a of the completely folded body 53. The connecting piece portion 62 is disposed on a side surface 53b of the completely folded body 53. The temporary holding portion 53 is disposed so as to be mounted on a ceiling surface 53c of the completely folded body 53. Specifically, in the temporary holding portion 63, the folded portion 57 is accommodated inside the holding concave portion 68, the base portion 64 is disposed on an external surface of the completely folded body 53 so as to face outward and upward, and the cover portion 65 is disposed toward the bottom surface 53a of the completely folded body 53. The temporary holding portion 63 is disposed on the ceiling surface 53c of the completely folded body 53.

In the embodiment, as illustrated in FIG. 9A to 10B, the regulating member 60 is assembled to the airbag 15 during the steps of folding the airbag 15. That is, when the longitudinal size reduced and folded airbag 51 is formed from the longitudinal size reduced and folded airbag 50, each of the bolts 9a of the retainer 9 is inserted into the attachment hole 61b, the attachment portion 61 is disposed on the bottom surface 53a of the airbag 15, the folded portion 57 is accommodated in the temporary holding portion 63, and the regulating member 60 is assembled to the airbag 15. The folded portion 57 is an upper portion 51 as of the bellows-like folded portion 51a.

When the airbag 15 is folded, and the regulating member 60 is assembled to the airbag, as illustrated in FIGS. 10A and 10B, the connecting piece portion 62 is disposed so as to be exposed on a rear surface 53bb of the side surface 53b of the completely folded body 53. When the airbag 15 is completely folded, the front portion 51b is provided so as to cover the ceiling surface 53c from a front surface 53bf of the side surface 53b of the completely folded body 53, and cover a front end (distal end) of the temporary holding portion 63.

In other words, in the embodiment, the folded portion 57 is formed by a part of a rear portion 56 of the folded airbag 15 (the completely folded body 53), the rear portion 56 being positioned rearward of the front portion 51b of a front portion 55 of the folded airbag 15, and the temporary holding portion 63 of the regulating member 60 accommodates the folded portion 57, that is, a part of the rear portion 56 in the holding concave portion 68.

The wrapping member 79 wraps the completely folded body 53, that is, an airbag body 59 (refer to FIG. 10B) which is configured when the regulating member 60 is assembled to the airbag 15 and the folding of the airbag 15 is completed, so as to prevent the collapse of the folded airbag 15 (refer to FIGS. 1 and 12). The wrapping member 79 is made of a flexible sheet material, and is made of a non-woven fabric formed by synthetic fibers such as polyester or the like.

As illustrated in FIG. 11A, the wrapping member 79 includes a ceiling portion 80 and attachment piece portions 82, 83, 84, and 85. The ceiling portion 80 has a rectangular shape, and is disposed on a ceiling surface 59c of the airbag body 59. The attachment piece portions 82, 83, 84, and 85 extend from the ceiling portion 80 in the longitudinal and lateral directions. A plurality of slits 81 is intermittently provided in the ceiling portion 80 in the lateral direction. When the airbag 15 inflates, the ceiling portion 80 breaks due to the slits 81. Locking holes 86 are formed in each of the attachment piece portions 82, 83, 84, and 85. Each of the bolts 9a of the retainer 9 protrudes from a bottom surface 59a of the airbag body 59, and is inserted into the locking hole 86, and each of the attachment piece portions 82, 83, 84, and 85 is locked onto the bolt 9a.

As illustrated in FIGS. 11A and 11B, the ceiling surface 53c of the airbag body 59 is mounted on the ceiling portion 80 of the flatly deployed wrapping member 79. Subsequently, as illustrated in FIGS. 11C and 11D, the wrapping member 79 wraps the airbag body 59 by inserting each of the bolts 9a into the locking hole 86, bring the attachment piece portions 82, 83, 84, and 85 into side surfaces 59b of the airbag body 59 in sequence, and locking each of the attachment piece portions 82, 83, 84, and 85 onto the bolt 9a.

The case 12 accommodates the airbag body 59 wrapped by the wrapping member 79 in such a manner that the bolts 9a protrude from the bottom wall portion 12a of the case 12. Subsequently, it is possible to attach the airbag body 59 to the case 12 together with the inflator 8 by inserting the bolts 9a protruding from the bottom wall portion 12a into the flange portion 8c of the inflator 8, and tightening the bolts 9a protruding from the flange portion 8c of the inflator 8 into the nuts 10. It is possible to mount the airbag apparatus M in the vehicle by locking the circumferential wall portion 12b of the case 12 with respect to the connection wall portion 6c of the airbag cover 6 of the instrument panel 1 mounted in the vehicle via the insertion of the locking claw 12c into the locking hole 6d, and then fixing a predetermined bracket (not illustrated) of the case 12 to the body of the vehicle.

When the vehicle equipped with the airbag apparatus M undergoes a front collision, the inflating gas is discharged via the gas discharge ports 8b of the inflator 8, the inflating gas flows into the airbag 15 and inflates the airbag 15, the ceiling portion 80 of the wrapping member 79 breaks, and as illustrated in the two-dot chain line in FIG. 1, the door portions 6a and 6b of the airbag cover 6 are pushed and opened. Subsequently, the airbag 15 protrudes upward from the case 12 via an opening that is formed when the door portions 6a and 6b of the airbag cover 6 are pushed and opened, and deploys and inflates while protruding toward the back of the vehicle. The airbag 15 is completely inflated so as to block the space between the upper surface 2 of the instrument panel 1 and the windshield 4 above the instrument panel 1.

Figure 12A:
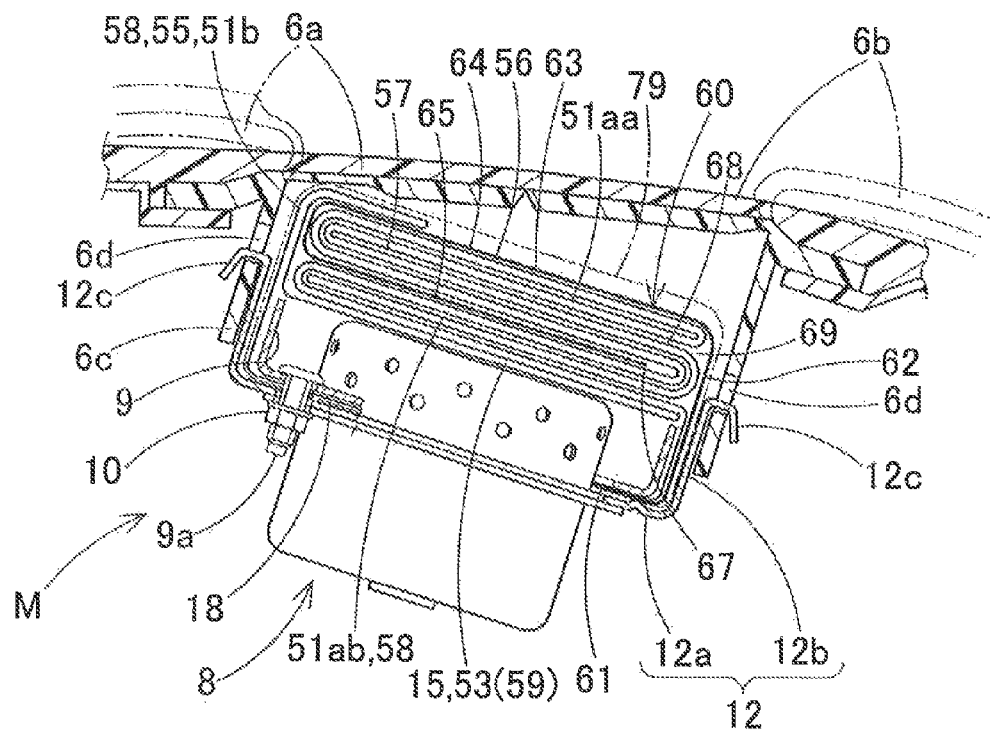
FIGS. 12A and 12B are views sequentially illustrating inflation states of the airbag of the front passenger seat airbag apparatus of the embodiment.
Figure 12B:
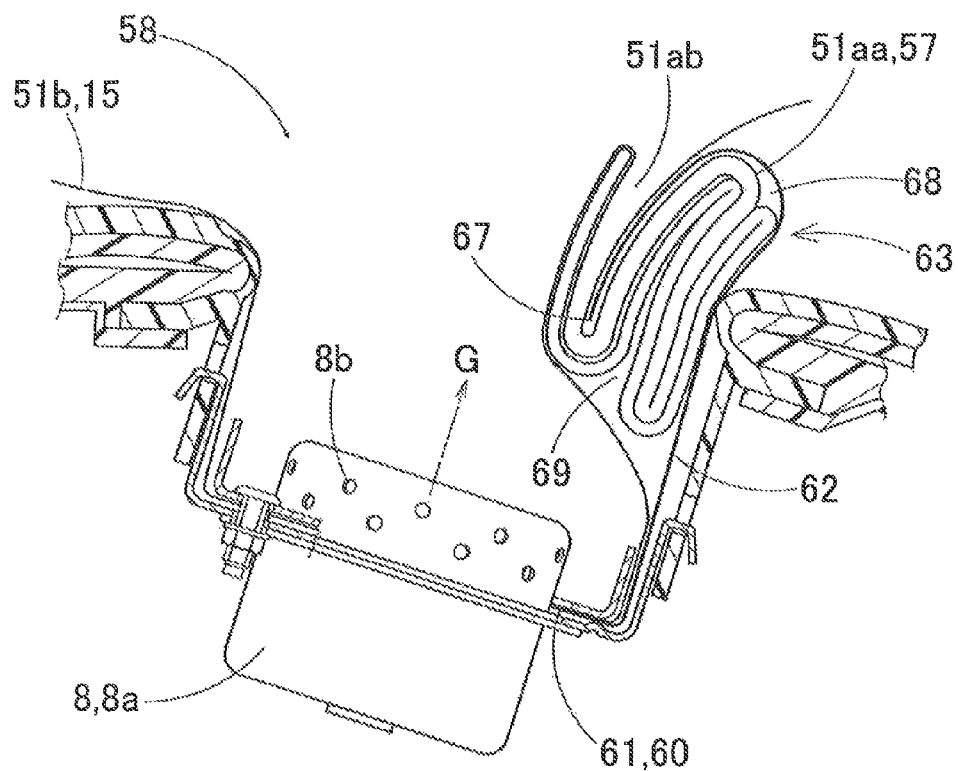

In the airbag apparatus M of the embodiment, as illustrated in FIGS. 12A and 12B, when inflating gas G flows into the airbag 15, an initial deployment and inflation portion 58 of the airbag 15 deploys and inflates in a state where the folded portion 57, that is, a part of the airbag 15 is temporarily held in the temporary holding portion 63 of the regulating member 60. The initial deployment and inflation portion 58 is not accommodated and held inside the temporary holding portion 63 in the airbag 15, and is disposed upstream of the folded portion 57 in a flow direction of the inflating gas G. In the embodiment, specifically, the initial deployment and inflation portion 58 is formed by the front portion 51b of the airbag 15, and a lower portion 51ab of the bellows-like folded portion 51a.

Figure 13A:
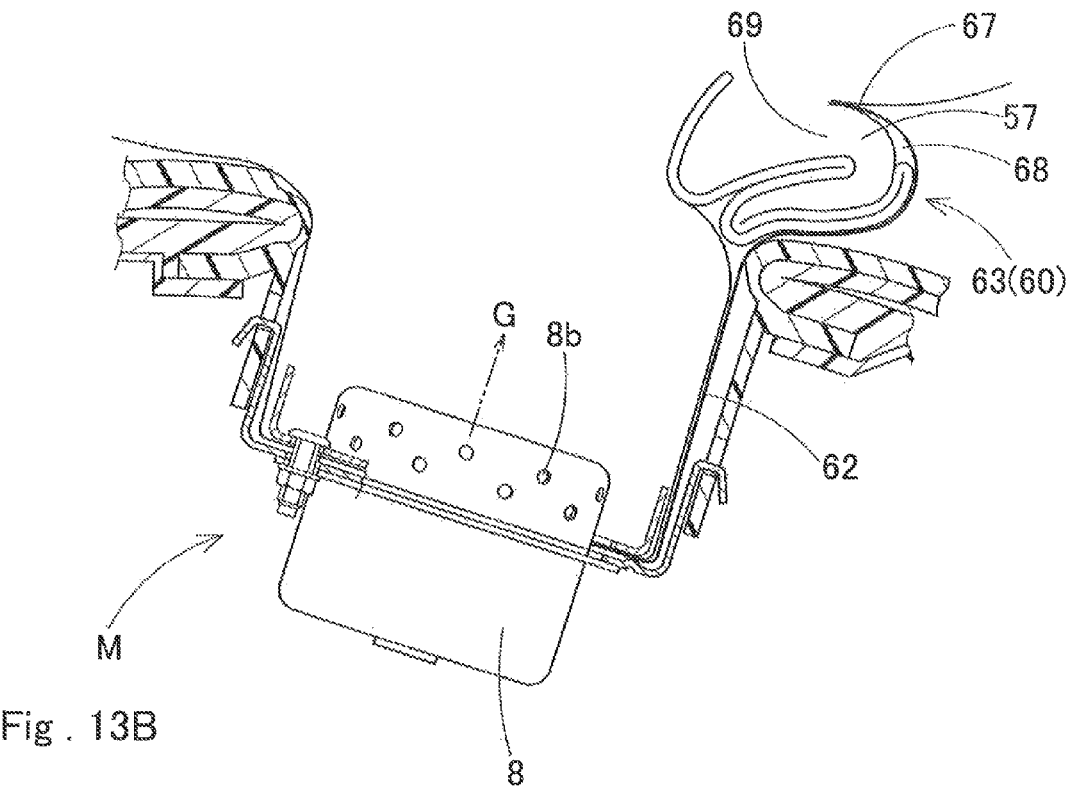
FIGS. 13A and 13B are views sequentially illustrating inflation states of the airbag of the front passenger seat airbag apparatus of the embodiment, and illustrate inflation states subsequent to the inflation state in FIG. 12B.
Figure 13B:
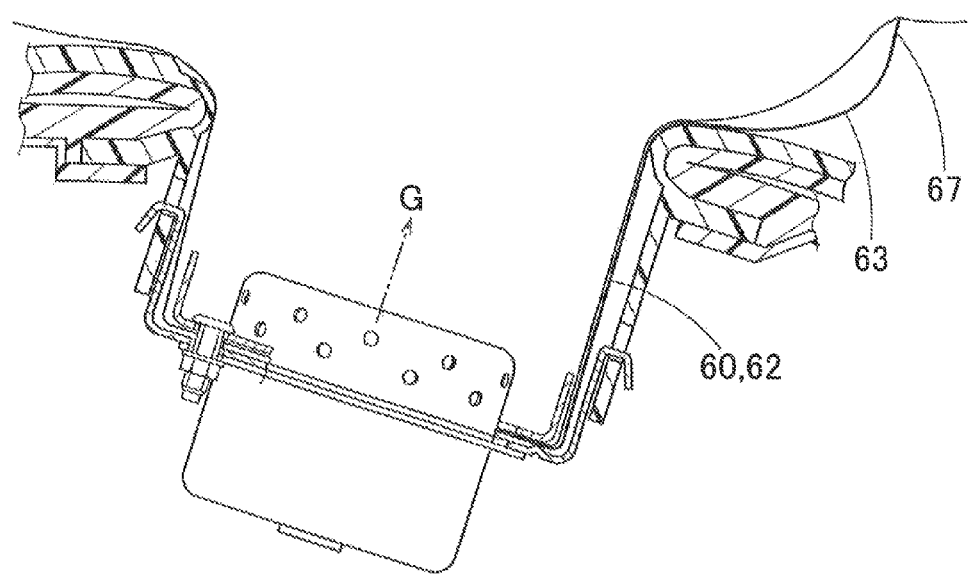
Figure 14:
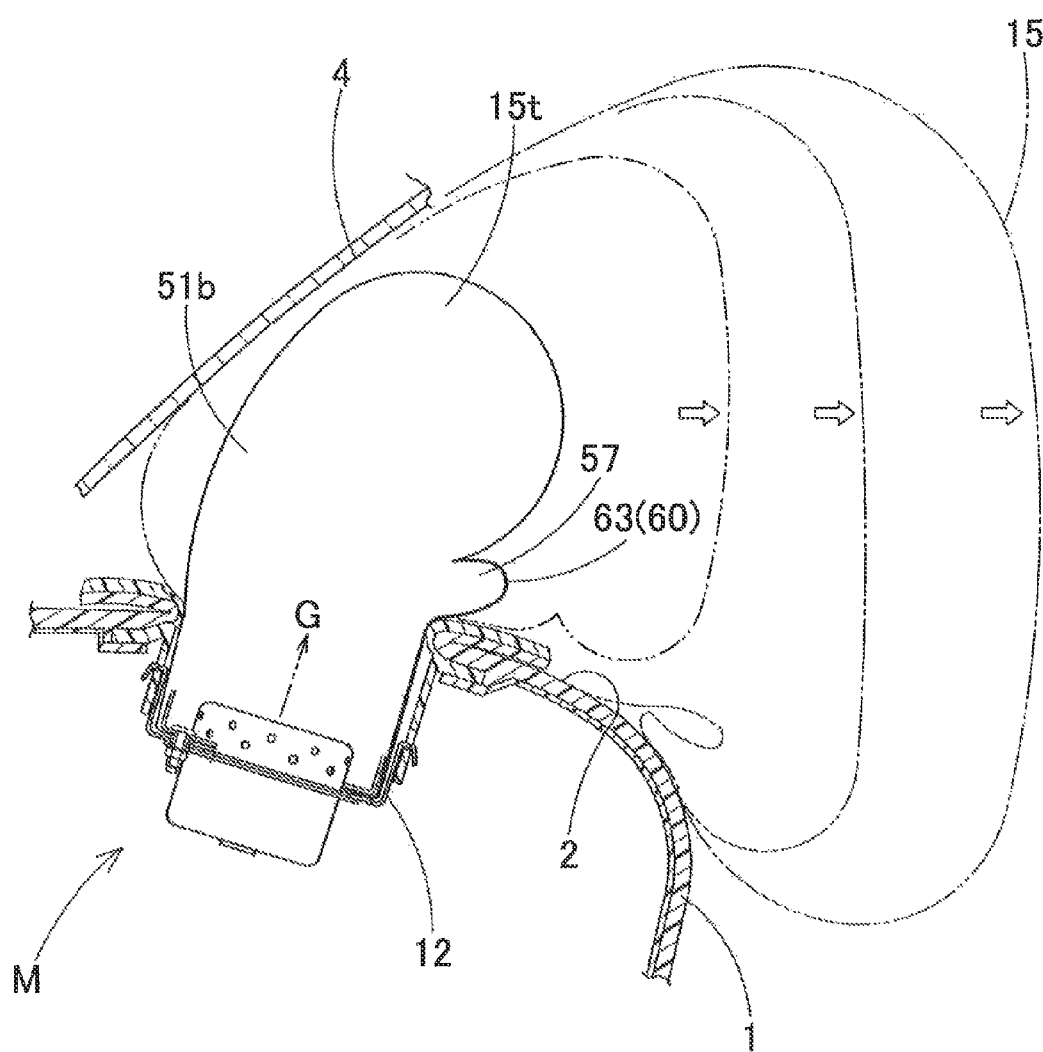
FIG. 14 is a schematic view illustrating an inflation state of the airbag of the front passenger seat airbag apparatus of the embodiment.

The attachment portion 61 of the regulating member 60 is attached to the bottom wall portion 12a of the case 12 as an accommodating portion. However, in the regulating member 60, the connecting piece portion 62 between the attachment portion 61 and the temporary holding portion 63 is bent, and the temporary holding portion 63 can rotate so as to correspond to the movement of the folded portion 57. The folded portion 57 of the airbag 15 is pulled as the initial deployment and inflation portion 58 of the airbag 15 deploys and inflates further, and the folded portion 57 also inflates. For this reason, as illustrated in FIGS. 12B, 13A and 13B, the folded portion 57 is released to escape from the temporary holding portion 63 (the holding concave portion 68) via the release opening 69 of the holding concave portion 68, which is widened when the non-connected release edge 67 is bent. As illustrated in FIG. 14, the folded portion 57 deploys and inflates while being unfolded, and thus the entirety of the airbag 15 is completely inflated.

When the folded portion 57 of the airbag 15 is released to escape from the temporary holding portion 63, the connecting piece portion 62 is bent, and the release opening 69 of the temporary holding portion 63 turns in order for the folded portion 57 to easily escape from the holding concave portion 68. The non-connected release edge 67 at the circumferential edge of the opening 69 is also bent. For this reason, the folded portion 57 accommodated and temporarily held in the temporary holding portion 63 smoothly escapes therefrom, and is released, and thus the regulation of the deployment and inflation of the airbag 15 is smoothly released.

Until the folded portion 57 is released from the temporary holding portion 63, the deployment and inflation of the entirety of the airbag 15 is regulated. In other words, the deployment and inflation of the initial deployment and inflation portion 58 of the airbag 15 is regulated, and it is possible to prevent the initial deployment and inflation portion 58 of the airbag 15 from protruding from the case 12. Thereafter, the folded portion 57 is smoothly released, and thus it is possible to complete the deployment and inflation of the entirety of the airbag 15 including the initial deployment and inflation portion 58. That is, in the airbag apparatus M of the embodiment, it is possible to secure a desired inflating shape at the initial stage of the deployment and inflation of the airbag 15.

Accordingly, in the airbag apparatus M of the embodiment, it is possible to secure a desired inflating shape at the initial stage of the deployment and inflation of the airbag 15 by smoothly regulating the deployment and inflation of the airbag 15, and releasing the regulation at the initial stage of the deployment and inflation.

In the embodiment, the regulating member is not configured as follows. That is, the regulating member is not bonded to an outer circumferential wall of the airbag 15, and the regulating member does not break when a predetermined tension is applied. In other words, in the embodiment, the deployment and inflation of the airbag is not regulated until the regulating member breaks. For this reason, in the embodiment, it is not necessary to take bond strength between the outer circumferential wall of the airbag and the regulating member into consideration. That is, in the embodiment, it is possible to properly and conveniently regulate the deployment and inflation of a predetermined portion (an initial protruding portion 15t, refer to FIG. 14) of the airbag 15 by simply accommodating the predetermined folded portion 57 of the airbag 15 inside the holding concave portion 68 of the temporary holding portion 63.

In the airbag apparatus M of the embodiment, as illustrated in FIG. 7, the regulating member 60 is made of a piece of the flexible regulating member formation sheet material 71 in which the attachment formation portion 72 for forming the attachment portion 61, the connecting piece formation portion 73 for forming the connecting piece portion 62, the base formation portion 74 for forming the base portion 64, and the cover formation portion 75 for forming the cover portion 65 are continuous with each other. The temporary holding portion 63 is formed by folding the flatly deployed regulating member formation sheet material 71 in order for the cover formation portion 75 to be stacked on the base formation portion 74, and stitching the respective connected edges 66, 66 of outer circumferential edges.

That is, in the embodiment, it is possible to form the temporary holding portion 63 provided with the holding concave portion 68 only by folding the regulating member formation sheet material 71 in order for the cover formation portion 75 to be stacked on the base formation portion 74, and stitching together the predetermined connected edges 66, 66. For this reason, in the embodiment, it is possible to conveniently form the regulating member 60, using a piece of the regulating member formation sheet material 71.

In the airbag apparatus M of the embodiment, the folded portion 57 is disposed close to the ceiling surface 53c of the completely folded body 53 of the airbag 15, and the bottom surface 53a is held by the case 12 as an accommodating portion. The attachment portion 61 of the regulating member 60 is disposed on the bottom surface 53a of the completely folded body 53, and the connecting piece portion 62 is disposed on the side surface 53b of the completely folded body 53. The regulating member 60 is accommodated in the case 12 together with the airbag 15 while the base portion 64 is disposed on the external surface of the completely folded body 53 so as to face outward, the cover portion 65 is disposed toward the bottom surface 53a of the completely folded body 53, and the temporary holding portion 63 is disposed on the ceiling surface 53c of the completely folded body 53.

When the airbag 15 is folded and accommodated in this way, the connecting piece portion 62 is bent in such a manner that the temporary holding portion 63 is parallel with the bottom surface 53a of the completely folded body 53. For this reason, when the folded portion 57 escapes from the release opening 69 of the temporary holding portion 63 during the inflation of the airbag 15, as illustrated in FIGS. 12A, 12B, and 13A, the connecting piece portion 62 is bent, and the temporary holding portion 63 turns so as to separate from the bottom surface (bottom wall portion) 12a of the case 12, and while being bent, the release opening 69 is widened in such a manner that the edge 67 apart from the base portion 64 separates from the bottom wall portion 12a of the case 12. That is, in the embodiment, it is necessary to turn the connecting piece portion 62 and bend the edge 67 of the opening 69 so as to release the folded portion 57. It is possible to smoothly regulate the deployment and inflation of the airbag 15 for a time period when the connecting piece portion 62 turns, and the edge 67 is bent. After the regulation of the deployment and inflation of the airbag 15 is completed, the connecting piece portion 62 is bent, the non-connected release edge 67 is bent, and thus it is possible to considerably widen the release opening 69. For this reason, it is possible to smoothly release the folded portion 57 via the release opening 69, and smoothly release the regulation of the deployment and inflation.

The airbag apparatus of the embodiment is the front passenger seat airbag apparatus M, and is mounted on an inner side of the upper surface 2 of the instrument panel 1 in front of the front passenger seat of the vehicle and below the windshield 4. The temporary holding portion 63 of the regulating member 60 accommodates the rear portion 56 as the folded portion 57 inside the holding concave portion 68, the rear portion 56 being a part of the folded airbag 15.

For this reason, in the embodiment, when the airbag 15 deploys and inflates, the temporary holding portion 63 of the regulating member 60 accommodates and holds the folded portion 57 that is the rear portion 56 of the completely folded body 53, and delays the deployment and inflation of the folded portion 57. As the deployment and inflation of the rear portion 56 is delayed, the deployment and inflation (protruding height) of the front portion 55 of the completely folded body 53 is suppressed. In the front passenger seat airbag 15, the front portion 55 of the completely folded body 53 is the portion 15t that protrudes from the case 12 toward the windshield 4 thereabove, at the initial stage of the deployment and inflation of airbag 15. For this reason, in the embodiment, the deployment of the initial protruding portion 15t is prevented, and thus it is possible to prevent the airbag 15 from strongly interfering with the windshield 4.

Figure 15:
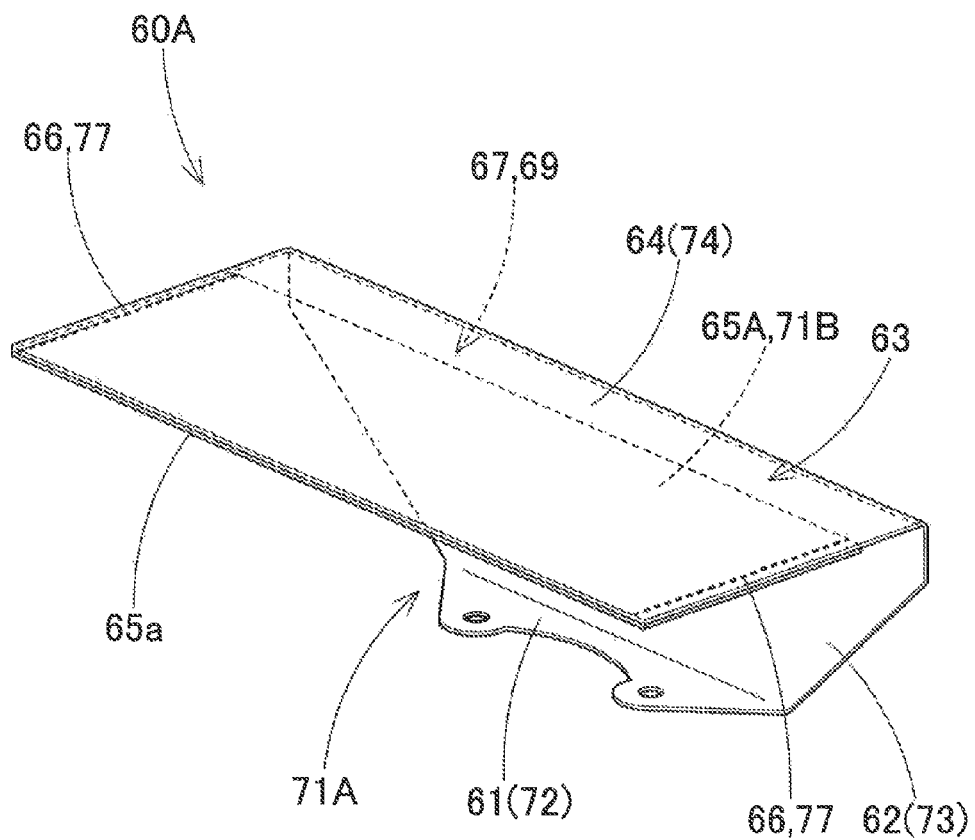
FIG. 15 is a perspective view illustrating a regulating member of a modification example of the embodiment.
Figure 16A:
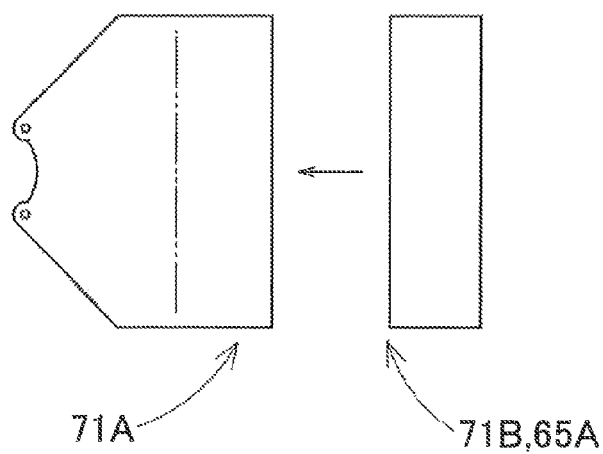
FIGS. 16A to 16C are views sequentially illustrating steps of manufacturing the regulating member illustrated in FIG. 15.
Figure 16B:
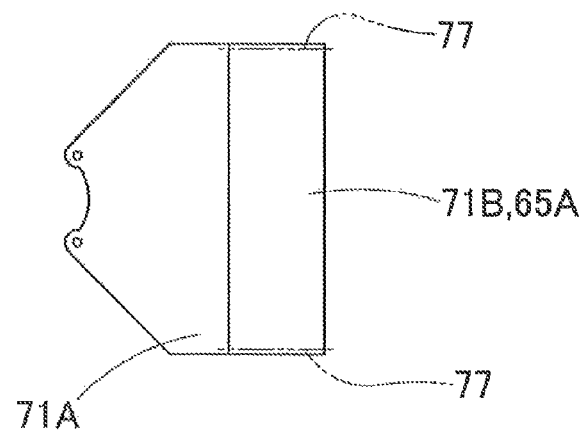
Figure 16C:
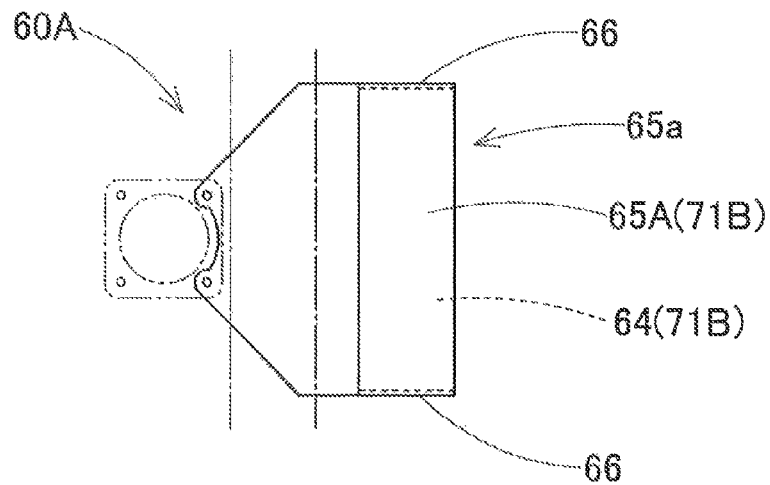
Figure 17:
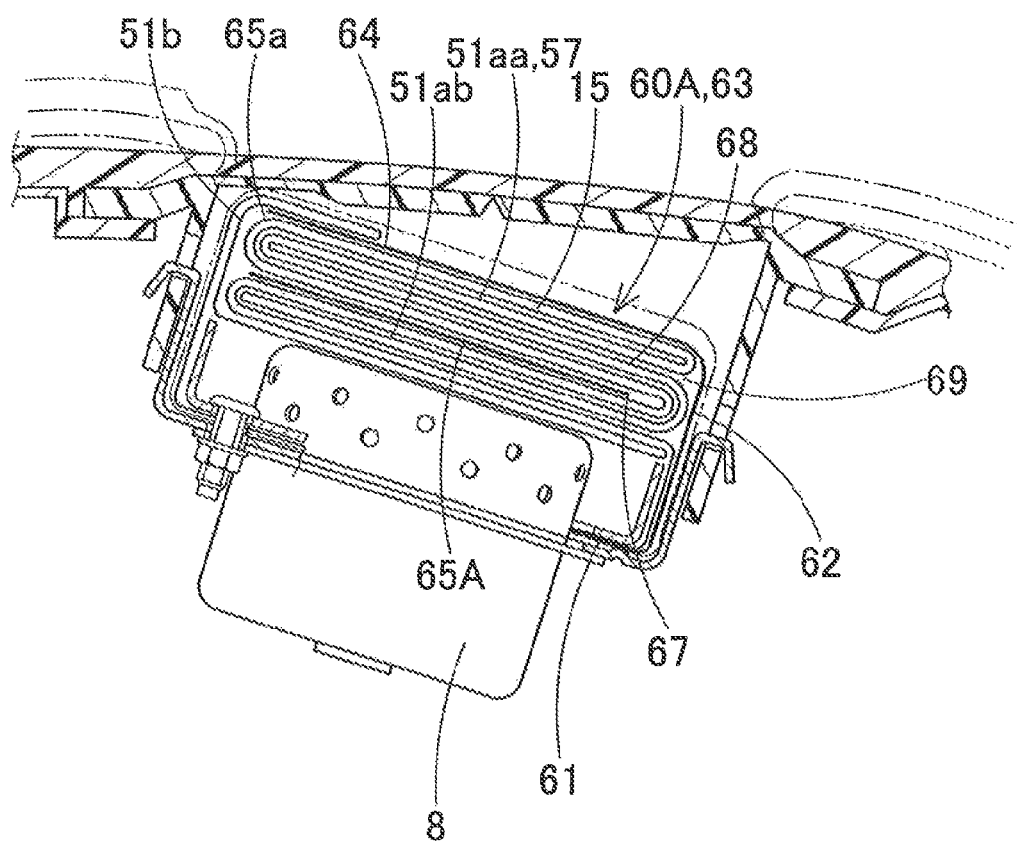
FIG. 17 is a schematic vertical cross-sectional view of a front passenger seat airbag apparatus illustrating a state in which the regulating member illustrated in FIG. 15 is used.

In the embodiment, descriptions are given regarding a case where the regulating member 60 is made of a piece of the regulating member formation sheet material 71. However, as with a regulating member 60A illustrated in FIGS. 15 to 17, a cover portion 65A may be formed separate from the base portion 64. That is, the cover portion 65A is made of a sheet material 71B that is separately formed from a sheet material 71A of the base portion 64. The sheet material 71B is flexible. The outer circumferential edge of a cover portion 65A made of the sheet material 71B includes the edges 66, 66 extending from the opposite ends of the non-connected release edge 67. As illustrated in FIGS. 16A, 16B, and 16C, the regulating member 60A can be formed by stitching the edges 66, 66 of the cover portion 65A made of the sheet material 71B to the sheet material 71A of the base portion 64.

In such a configuration, the cover portion 65A is formed separate from the sheet material 71A of the base portion 64. That is, in such a configuration, the sheet material 71B of the cover portion 65A and the sheet material 71A of the base port ion 64 may be prepared by cutting a predetermined sheet material. For this reason, in such a configuration, the sheet material cut into small pieces allows a favorable yield rate compared to a case where the cover portion 65 and the base portion 64 are cut from a piece of the sheet material 71 in a continuous shape.

Figure 18A:
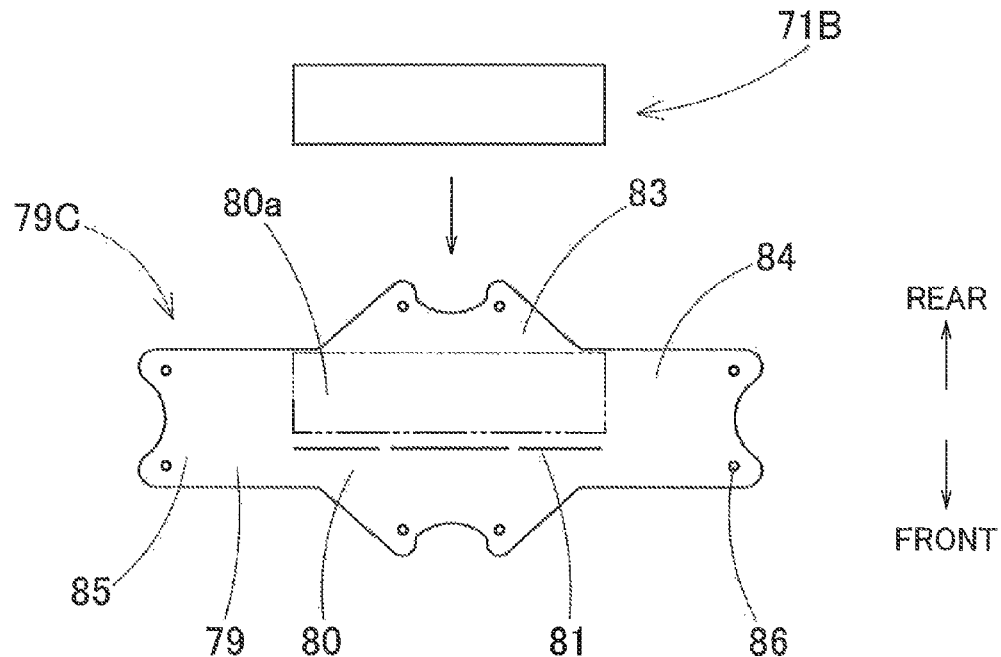
FIGS. 18A and 18B are views sequentially illustrating steps of manufacturing a regulating member of a modification example of the embodiment.
Figure 18B:
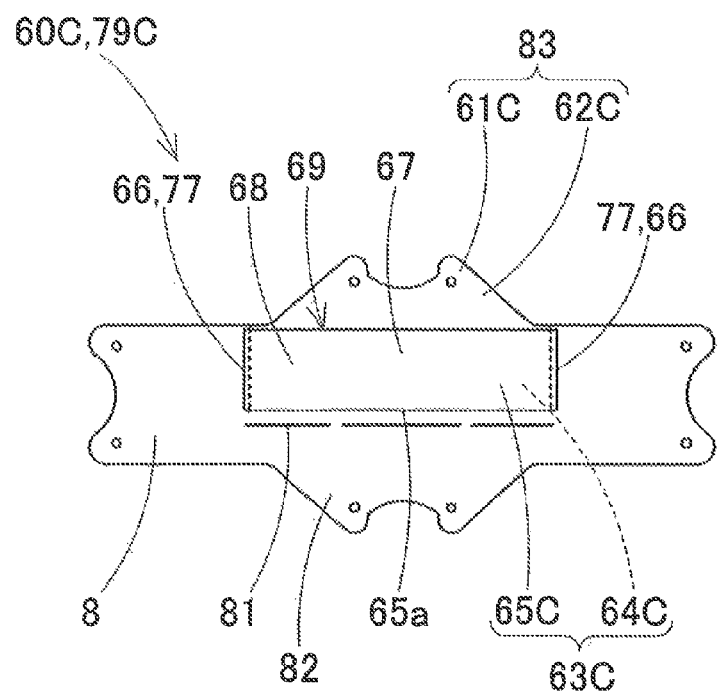

As illustrated in FIGS. 18A and 18B, when the cover portion is separately provided, the member of a base portion 64C may be made of a wrapping member 79C. The wrapping member 79C wraps a completely folded airbag so as to prevent the collapse of the folded airbag.

In such a configuration, portions of the regulating member 60C excluding a cover portion 65C can be made of the wrapping member 79C so that the regulating member 60C and the wrapping member 79C can be commonly used. For this reason, in such a configuration, it is possible to reduce the number of components in the airbag apparatus and to reduce the quantity of materials used in the regulating member 60C.

In the regulating member 60C, the edges 66, 66 extending from the opposite ends of the non-connected release edge 67 are stitched to the wrapping member 79C. A rear portion 80a of the ceiling portion 80 of the wrapping member 79C is the base portion 64C. An attachment piece portion 83 extending from the rear portion 80a forms a connecting piece portion 62C and an attachment portion 61C.

In the regulating member 60 of the embodiment described above, the cover portion 65 is connected to the base portion 64 interposing the folding line 76 therebetween. However, as with the regulating members 60A and 60C illustrated in FIGS. 15 to 17 or in FIG. 18B, an edge of each of the cover portions 65A and 65C facing the non-connected release edge 67 of the outer circumferential edge may be a non-connected edge 65a which is not connected to each of the base portions 64 and 64C.

In such a configuration, only both the edges 66, 66 extending from the opposite ends of the non-connected release edge 67 may be stitched when stitching the cover portions 65A and 65C. For this reason, stitching can be simplified in such a configuration. Even though the edge 65a of each of the cover portions 65A and 65C facing the non-connected release edge 67 is not stitched to each of the base portions 64 and 64C, the folded portion 57 of the airbag 15 can smoothly escape from the release opening 69 which is the non-connected release edge 67 in each of the cover portions 65A and 65C. For this reason, despite such a configuration, a releasing performance of the folded portion 57 to be released from the temporary holding portions 63 and 63C is not degraded.

As illustrated by the two-dot chain line in FIG. 7A, when providing the non-connected edge 65a, a cover formation portion 75A may protrude from an edge of the base formation portion 74 in the lateral direction. A folding line 76A is provided at a boundary between the cover formation portion 75A and the base formation portion 74, and an edge of the cover formation portion 75A separated from the folding line 76A is stitched to the base formation portion 74. In such a configuration, there is only one stitched portion 77A extending from an end portion of the non-connected release edge 67, and thus stitching can be further simplified.

Figure 19:
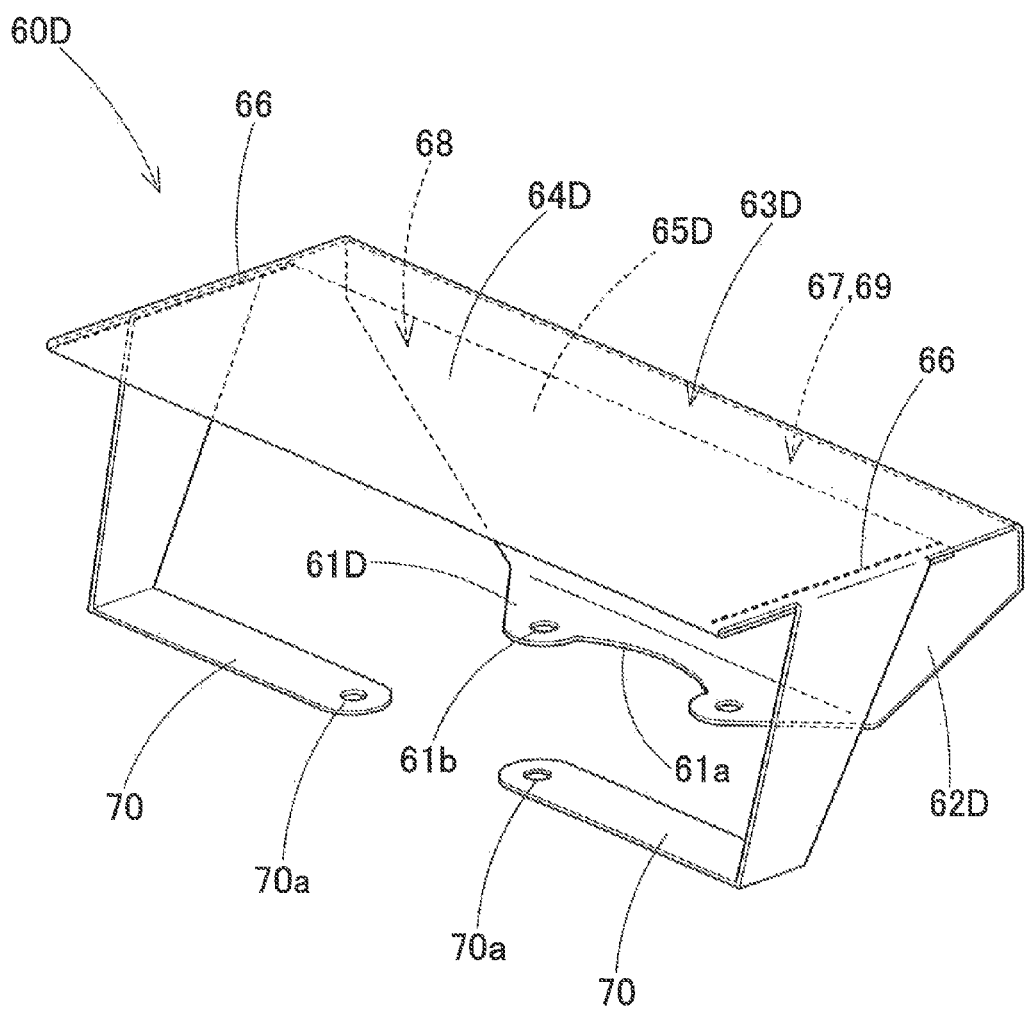
FIG. 19 is a perspective view illustrating a regulating member of a modification example of the embodiment.
Figure 20:
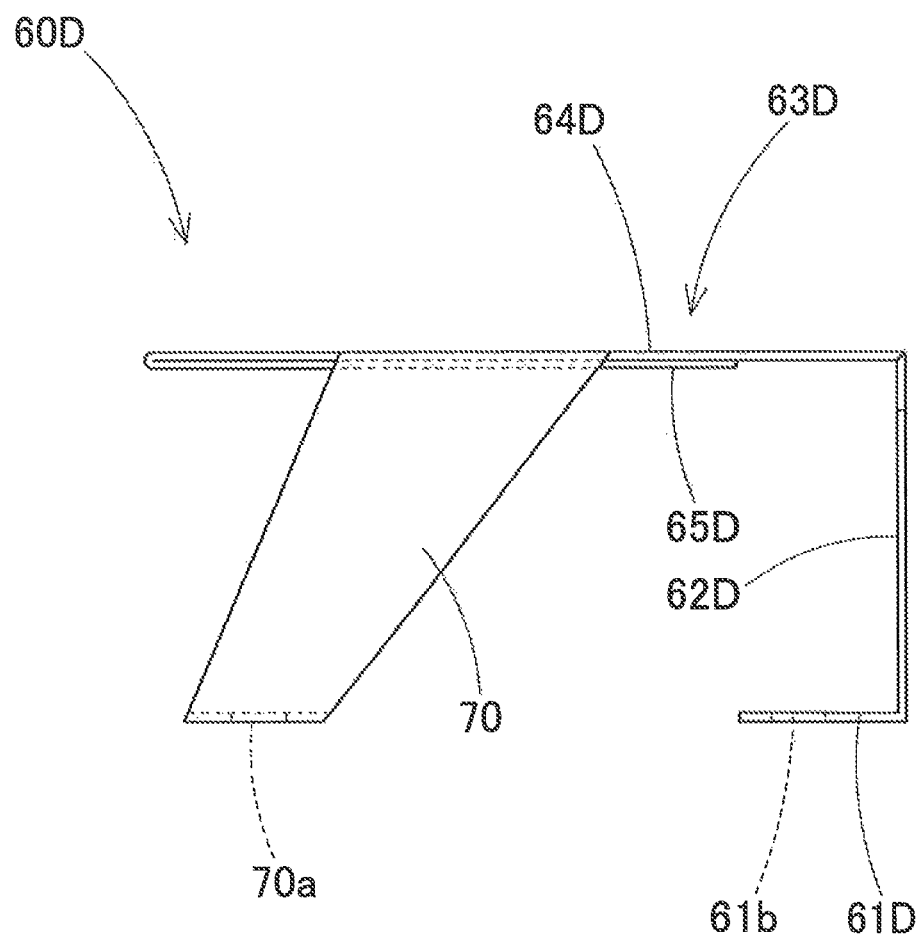
FIG. 20 is a side view of the regulating member illustrated in FIG. 19.

As illustrated in FIGS. 19 to 21, a regulating member 60D may include suppressing arm portions 70, 70. The suppressing arm portions 70, 70 extend from opposite edges interposing a connecting piece portion 62D of a temporary holding portion 63D therebetween and are connected to the case 12 as an accommodating portion. The suppressing arm portions 70, 70 suppress the deployment and inflation of the folded portion 57 in the airbag 15 at the initial stage of the deployment. The suppressing arm portions 70 are accommodated inside the case 12 so as to extend forward. An attachment hole 70a to be locked by the bolt 9a of the retainer 9 is formed at a distal end of each suppressing arm portion 70. The bolts 9a inserted into the attachment holes 70a are in front of the bolts 9a inserted into the attachment holes 61b of an attachment portion 61D in the regulating member 60D.

Figure 21A:
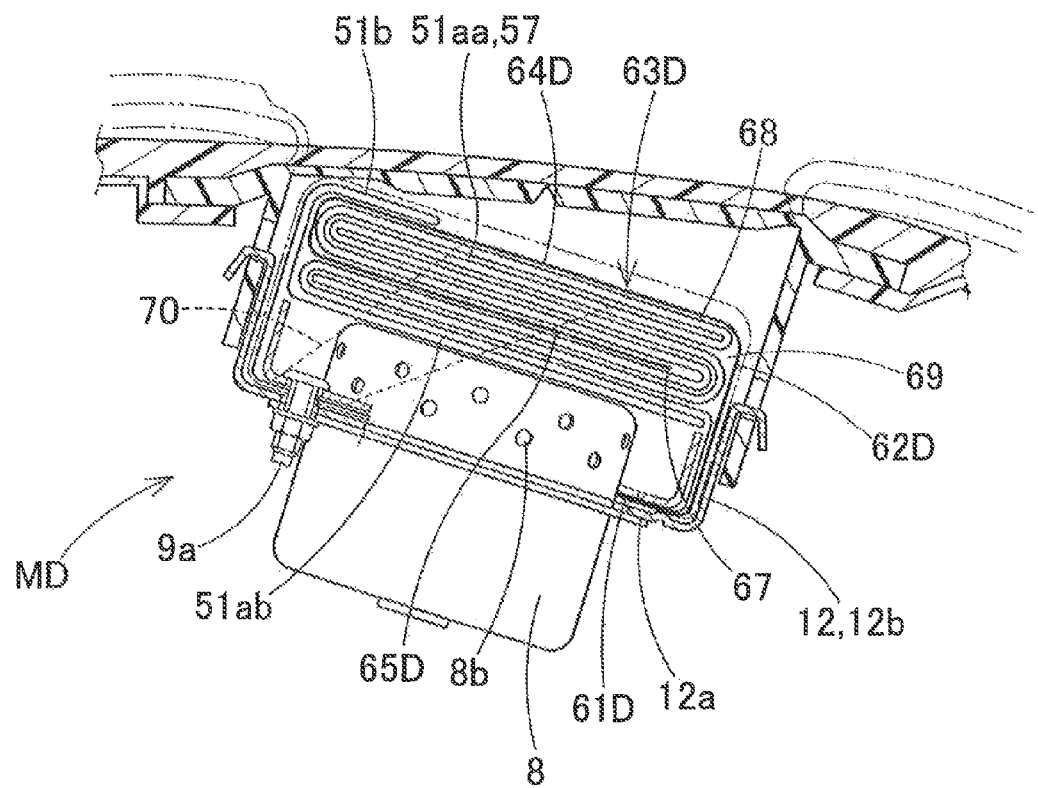
FIGS. 21A and 21B are views sequentially describing inflation states of the airbag during the operation of a front passenger seat airbag apparatus that is provided with the regulating member illustrated in FIG. 19.
Figure 21B:
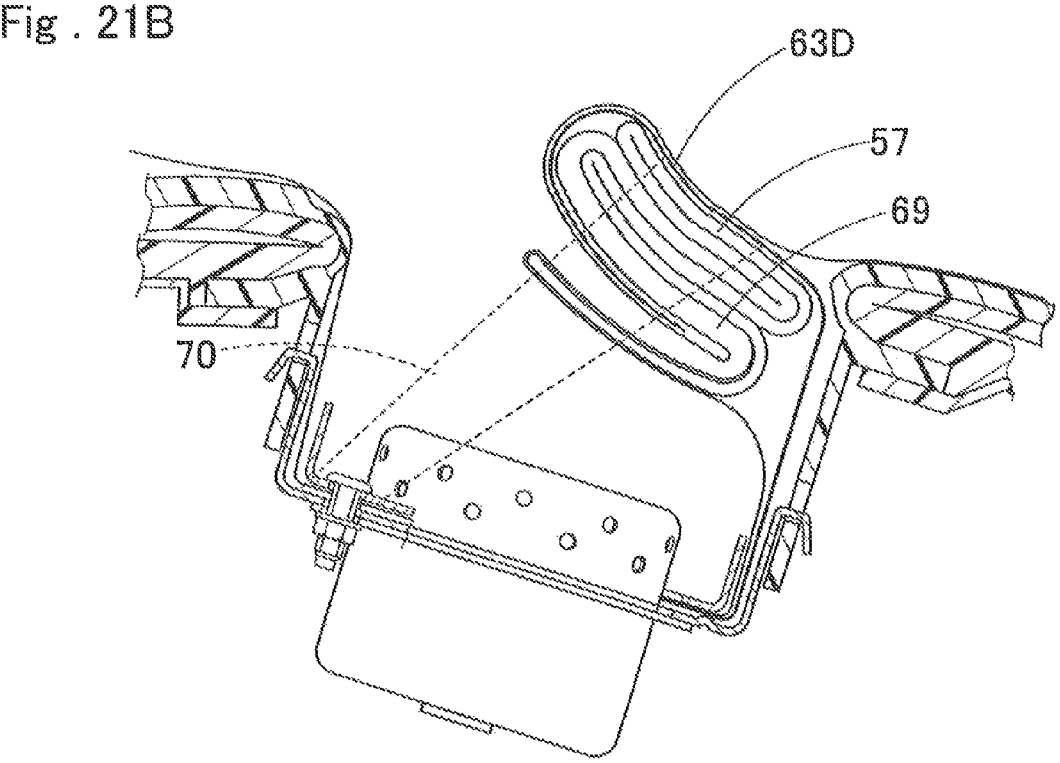
Figure 22A:
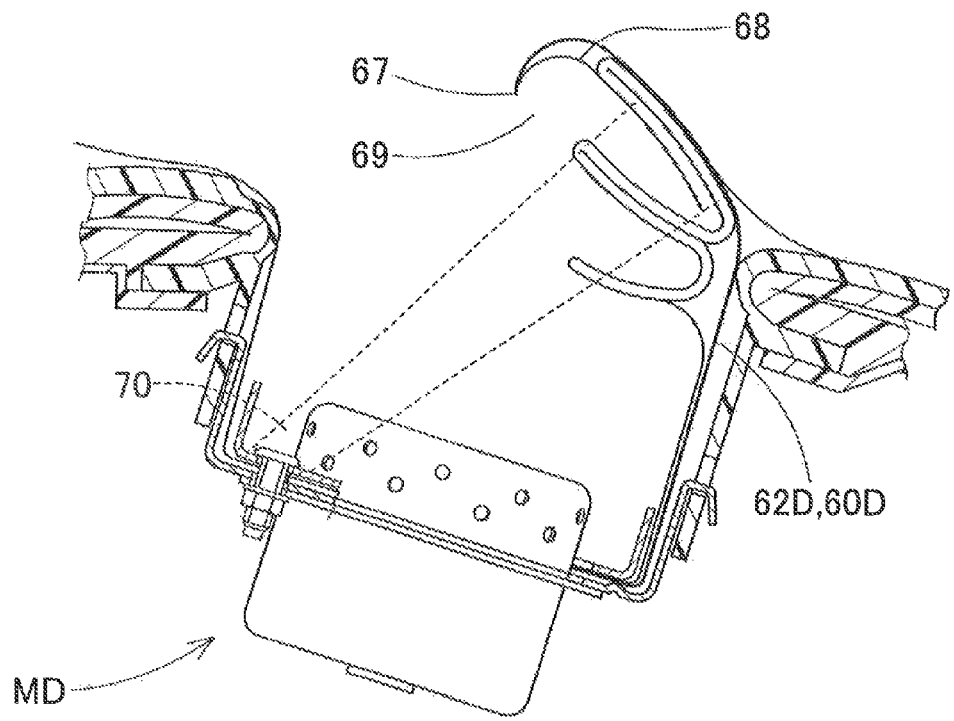
FIGS. 22A and 22B are views sequentially illustrating inflation states of the airbag subsequent to the inflation state in FIG. 21B.
Figure 22B:
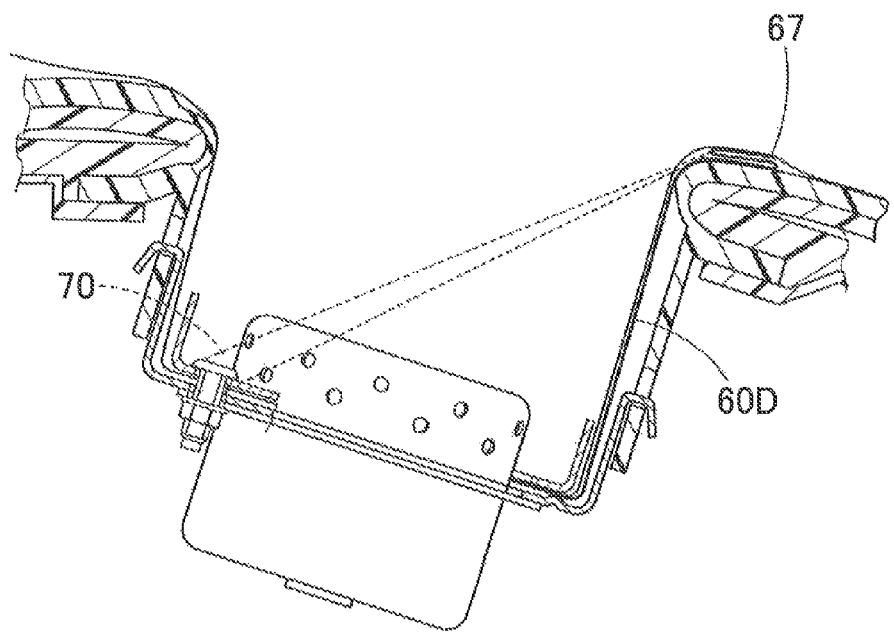
Figure 23:
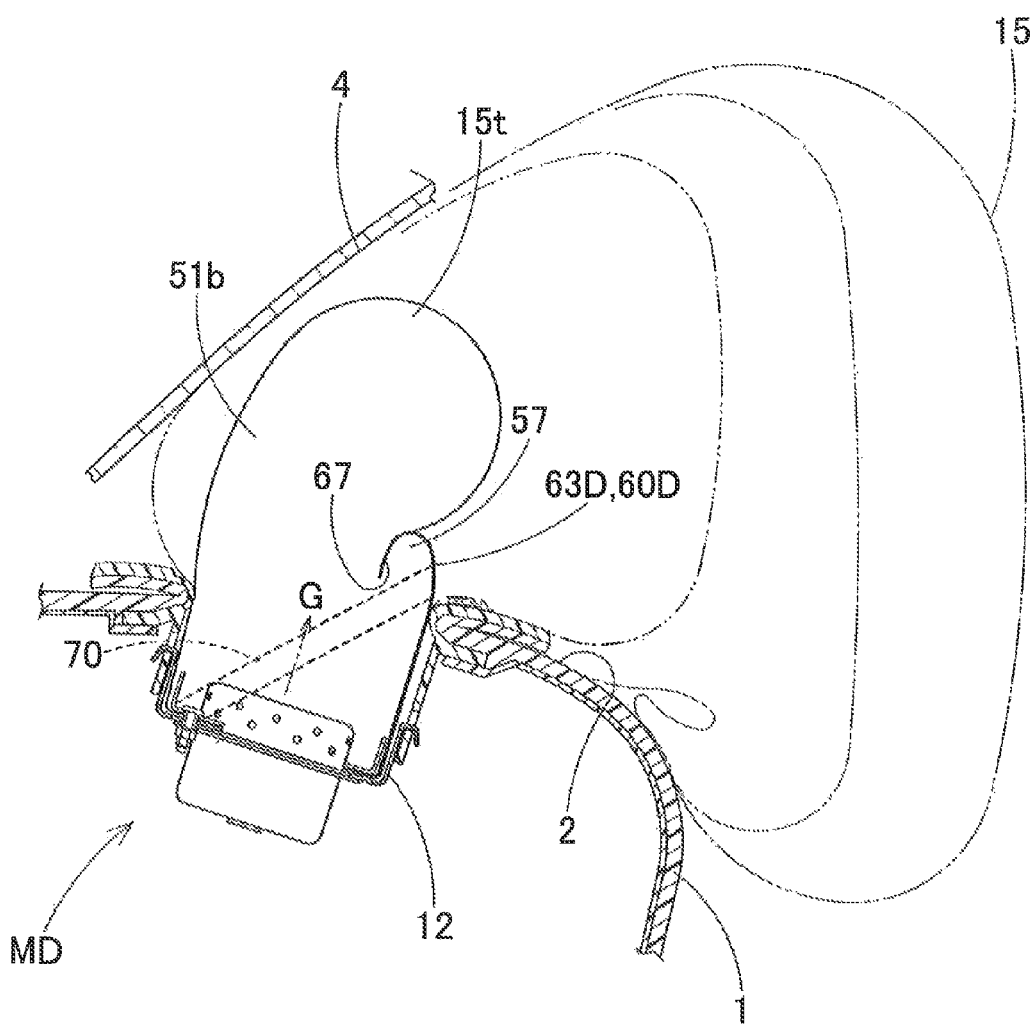
FIG. 23 is a schematic view illustrating an inflation state of the airbag of the front passenger seat airbag apparatus illustrated in FIG. 21A.

As illustrated in FIGS. 21A, 21B, and 22A, in an airbag apparatus MD using the regulating member 60D, at the inflation of the airbag 15, turning of the release opening 69 is suppressed by the suppressing arm portion 70. For this reason, the deployment and inflation of the airbag 15 is regulated. Naturally, as illustrated in FIGS. 22A, 22B, and 23, the non-connected release edge 67 facing a base portion 64D can be significantly bent in the vicinity of the center in the lateral direction separated from the suppressing arm portions 70, 70 so as to be turned inside out without hindering the bendability thereof. For this reason, the release opening 69 can be practically and significantly widened in the regulating member 60D so that the folded portion 57 can be smoothly released.

Accordingly, in the airbag apparatus MD using such a regulating member 60D, regulating of the deployment and inflation is favorably enhanced without hindering a release of the folded portion 57 which is temporarily held by the temporary holding portion 63D.

Figure 24:
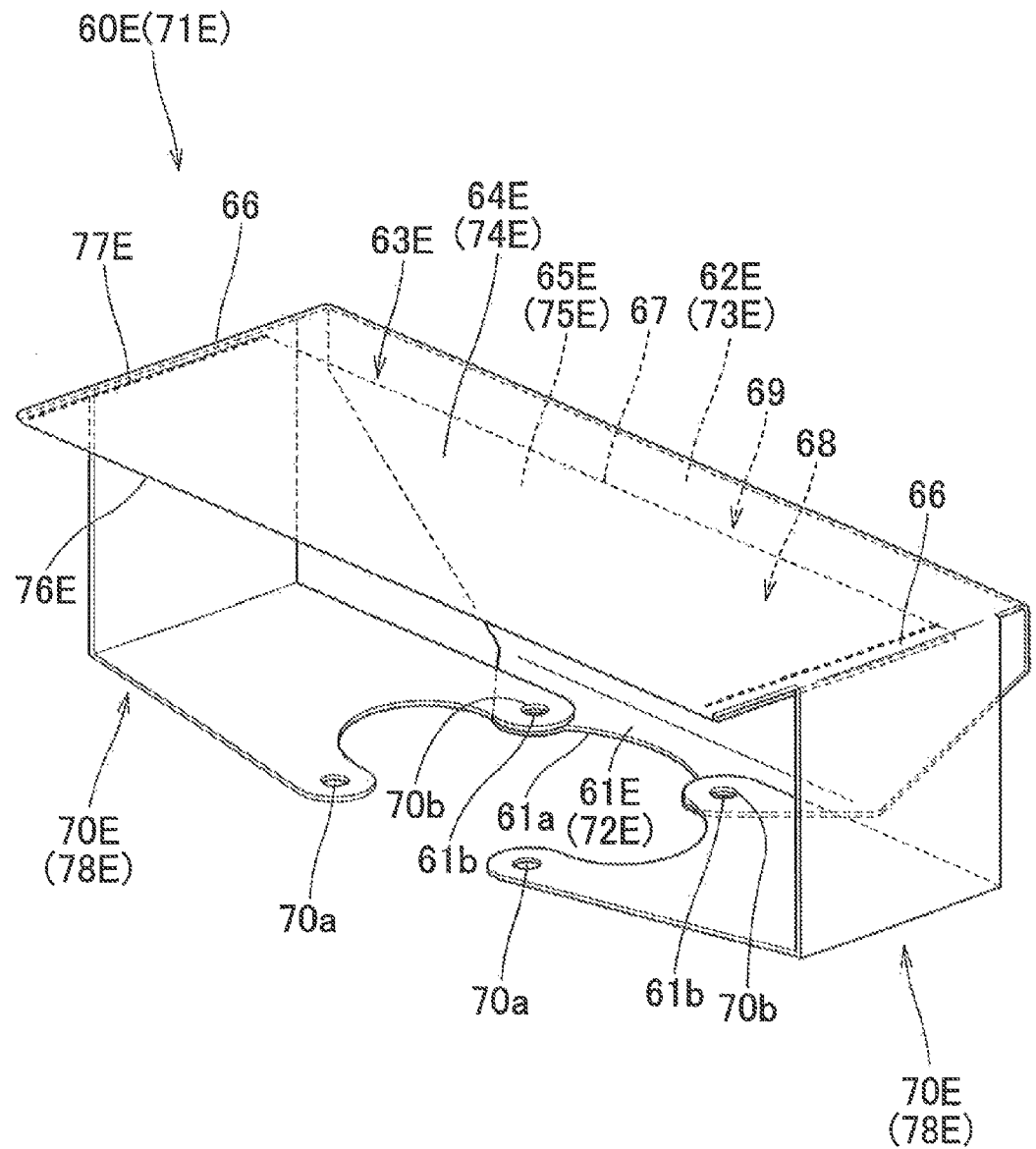
FIG. 24 is a perspective view illustrating a regulating member of a modification example of the embodiment.

As illustrated in FIG. 24, when a regulating member 60E includes two suppressing arm portions 70E, the suppressing arm portions 70E may respectively include a plurality of the attachment holes (connection portions or connection holes) 70a. That is, each of the suppressing arm portions 70E is provided with the attachment holes (connection portions or connection holes) 70a and 70b as attachment places to be attached to the case 12 as an accommodating portion at multiple places in a direction orthogonal to a direction in which the suppressing arm portions 70E face each other, along the longitudinal direction in the illustrated example (two places in the illustrated example). In other words, the attachment holes 70a and 70b are formed in each of the suppressing arm portions 70E on the right and left sides along the longitudinal direction so as to be locked by the bolts 9a which are provided two each laterally and longitudinally in the retainer 9. The attachment hole 70b is a portion to be locked by the rear bolt 9a in the retainer 9, and similarly to the attachment hole 70a of the suppressing arm portion 70 illustrated in FIG. 19, the attachment hole 70a is a portion to be locked by the front bolt 9a in the retainer 9.

Figure 25A:
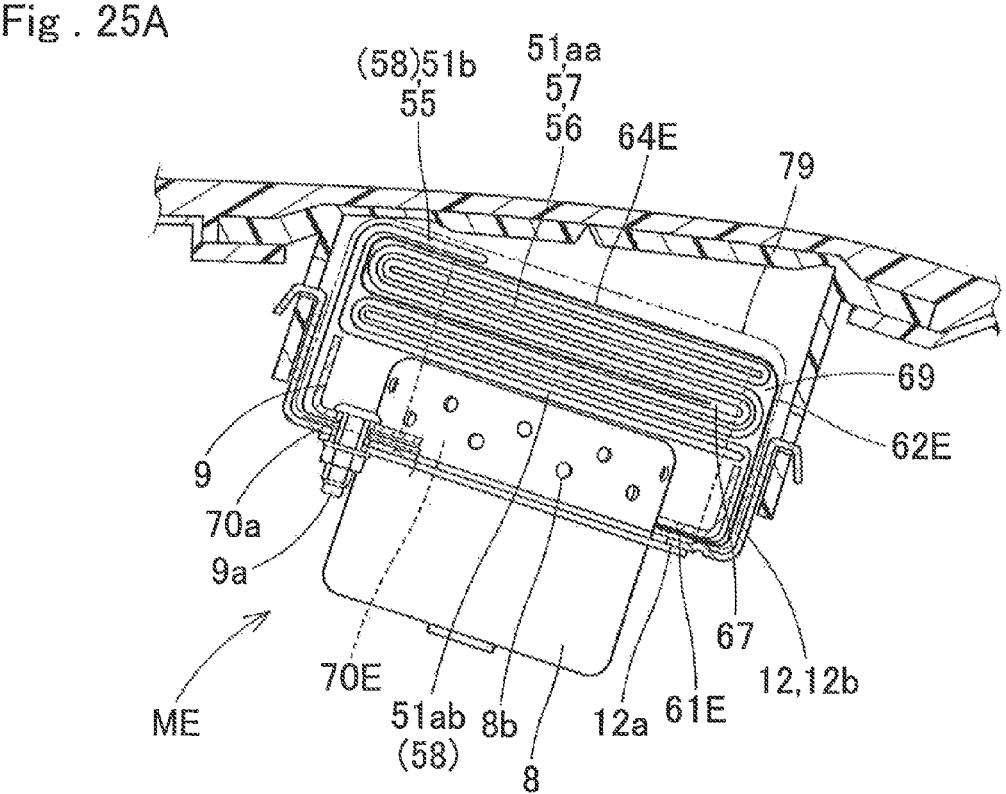
FIGS. 25A and 25B are views sequentially describing inflation states of the airbag during the operation of a front passenger seat airbag apparatus that is provided with the regulating member illustrated in FIG. 24.
Figure 25B:
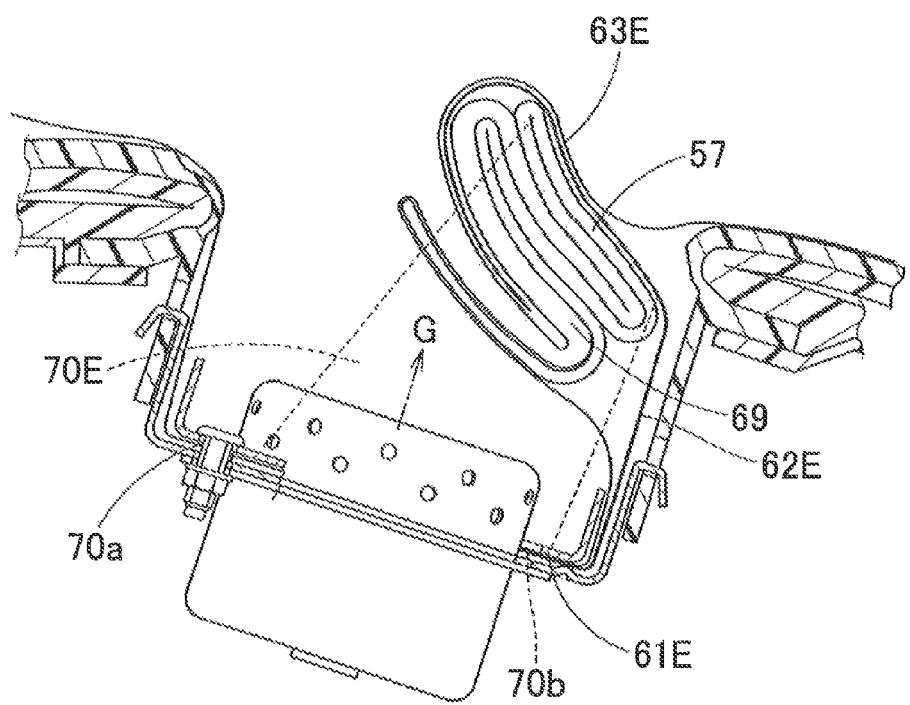
Figure 26A:
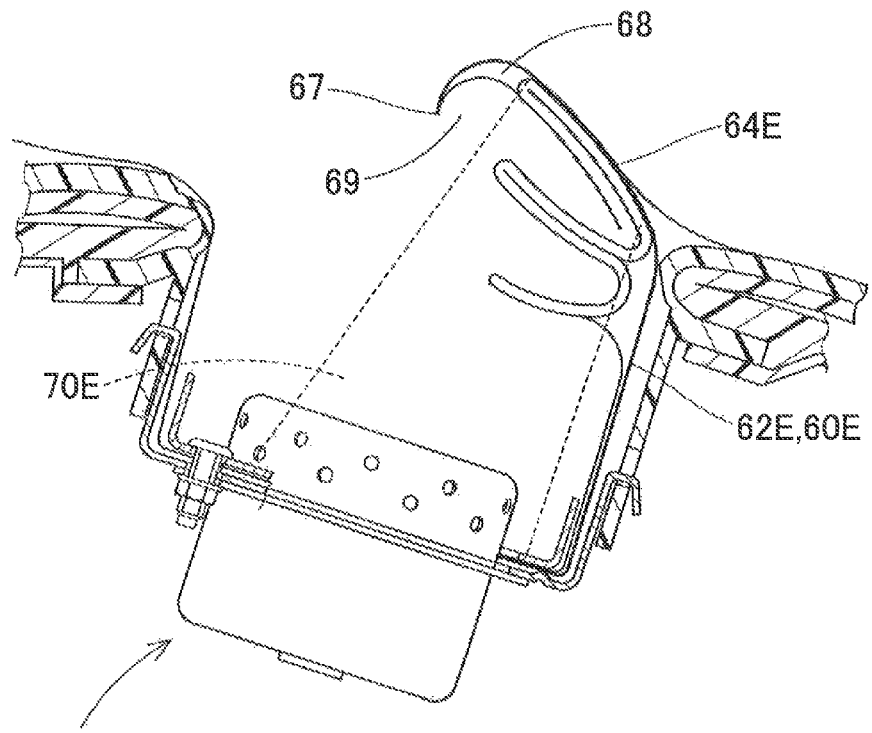
FIGS. 26A and 26B are views sequentially illustrating inflation states of the airbag subsequent to the inflation state in FIG. 25B.
Figure 26B:
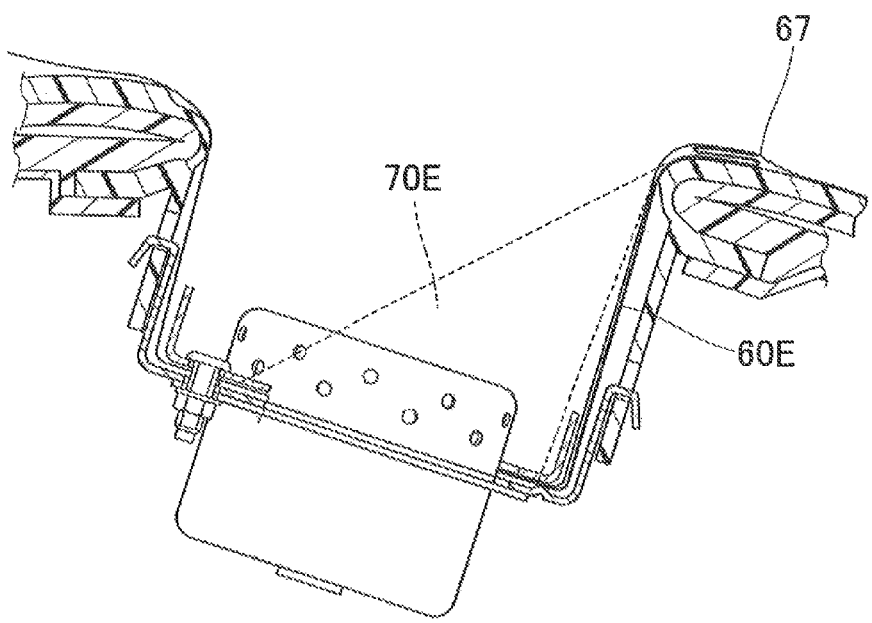
Figure 27:
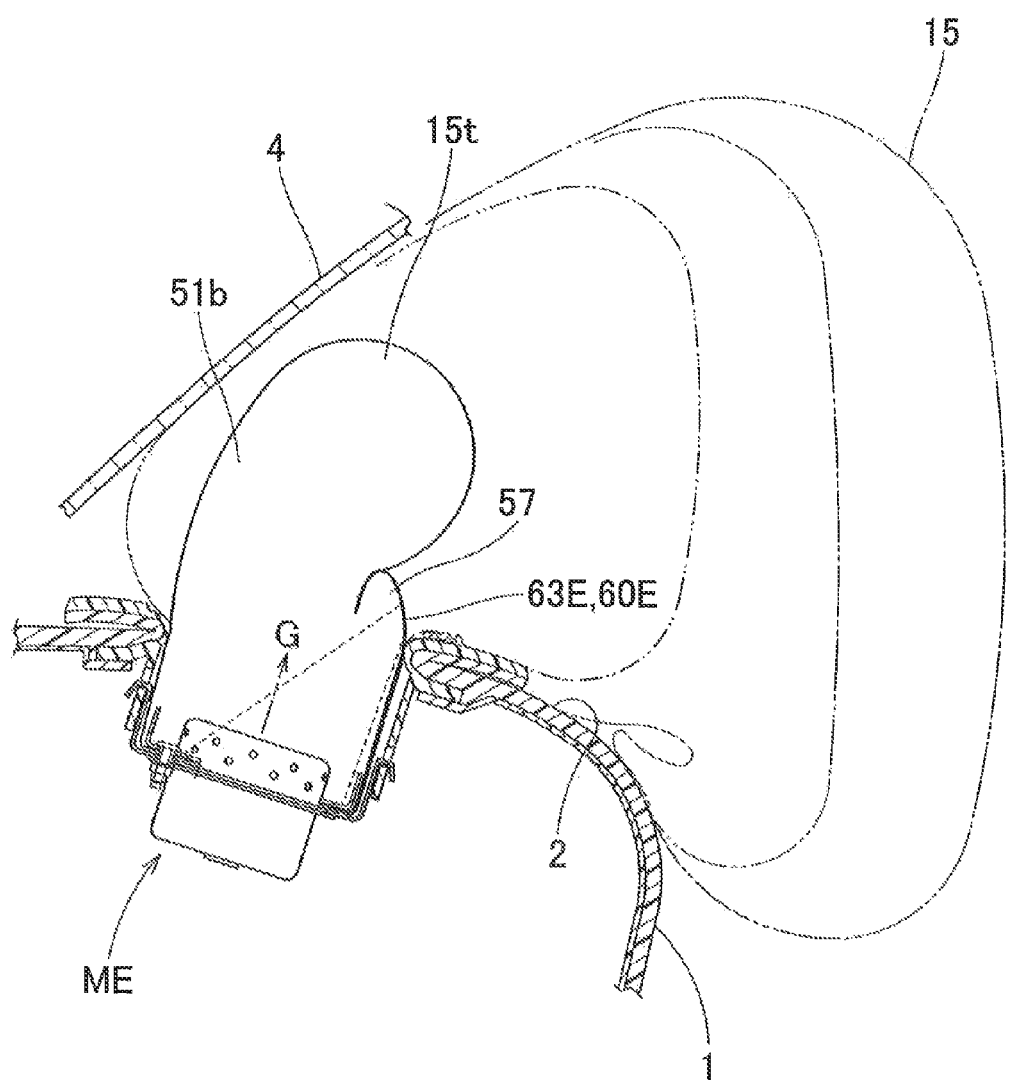
FIG. 27 is a schematic view illustrating an inflation state of the airbag of the front passenger seat airbag apparatus illustrated in FIG. 25A.

In an airbag apparatus ME using the regulating member 60E, the suppressing arm portion 70E is attached and fixed to the case 12 not only at the front attachment hole 70a but also at the portion of the rear attachment hole 70b which is commonly used as the attachment hole 61b of an attachment portion 61E. For this reason, as illustrated in FIGS. 25A, 25B, and 26A, turning of the release opening 69 is further suppressed at the inflation of the airbag 15 in the airbag apparatus ME. This is because the suppressing arm portions 70E, 70E are fixed to the case 12 by the plurality of attachment holes 70a and 70b along a turning surface of rearward turning in the vicinity of the opposite edges (connected edges) 66 of the temporary holding portion 63, that is, along the longitudinal direction. For this reason, the rearward turning in the vicinity of the opposite edges (connected edges) 66 of the temporary holding portion 63 is suppressed by the suppressing arm portions 70E, 70E so as to be pulled. As a result, the deployment and inflation of the airbag 15 can be further regulated. Naturally, as illustrated in FIGS. 26A, 26B, and 27, the non-connected release edge 67 facing a base portion 64E can be significantly bent in the vicinity of the center in the lateral direction separated from the suppressing arm portions 70E, 70E so as to be turned inside out without hindering the bendability thereof. For this reason, in the airbag apparatus ME as well, the release opening 69 can be practically and significantly widened so that the folded portion 57 can be smoothly released.

Accordingly, in the airbag apparatus ME using such a regulating member 60E, regulating of the deployment and inflation is favorably enhanced without hindering a release of the folded portion 57 which is temporarily held by a temporary holding portion 63E.

As illustrated in FIG. 24, similarly to the regulating member 60D, the regulating member 60E is made of a piece of regulating member formation sheet material 71E made of a flexible woven fabric such as polyester. An attachment formation portion 72E, a connecting piece formation portion 73E, a base formation portion 74E, and a cover formation portion 75E are continuously formed in the sheet material 71E. The attachment formation portion 72E is a portion for forming the attachment portion 61E. The connecting piece formation portion 73E is a portion for forming a connecting piece portion 62E. The base formation portion 74E is a portion for forming the base portion 64E. The cover formation portion 75E is a portion for forming a cover portion 65E. A suppressing arm formation portion 78E for forming the suppressing arm portion 70E is provided so as to laterally extend from the base formation portion 74E. The temporary holding portion 63E is formed to have a folding line 76E so as to fold and stack the base formation portion 74E and the cover formation portion 75E of the flatly deployed regulating member formation sheet material 71E, and to have a stitched portion 77E obtained by stitching the connected edges 66, 66 of the outer circumferential edge.

The airbag apparatus may use a regulating member 60F having suppressing arm portions 70F, 70F illustrated in FIGS. 28 to 31. The regulating member 60F includes the suppressing arm portions 70F, 70F which respectively extend from the vicinity of the opposite edges (connected edges) 66 interposing a connecting piece portion 62F of a temporary holding portion 63F therebetween to a distal end 63a of a temporary holding portion 63F. The suppressing arm portions 70F, 70F are provided to be symmetrical with each other in the lateral direction and respectively have the attachment holes (connection portions or connection holes) 70a at the distal end so as to be connected to the case 12 as an accommodating portion. Each of the suppressing arm portions 70F, 70F covers the surface (front surface) 53bf separated from the connecting piece portion 62F on the surface 53b of the completely folded body 53 over the distal end 63a of the temporary holding portion 63F (refer to FIG. 32) while approaching each other. Each of the suppressing arm portions 70F, 70F extends to the bottom surface 53a of the completely folded body 53 so as to connect its distal end to the case 12. When the initial deployment and inflation portion 58 of the airbag 15 inflates, the suppressing arm portions 70F, 70F can be freed from a state covering the front surface 53bf of the completely folded body 53 so as to be separated from each other.

The suppressing arm portions 70F, 70F in the illustrated example are provided so as to cover an outer surface of the base portion 64F of the temporary holding portion 63F and to respectively cause the attachment holes 70a to be locked by the front bolts 9a on the right and left in the retainer 9.

Figure 32A:
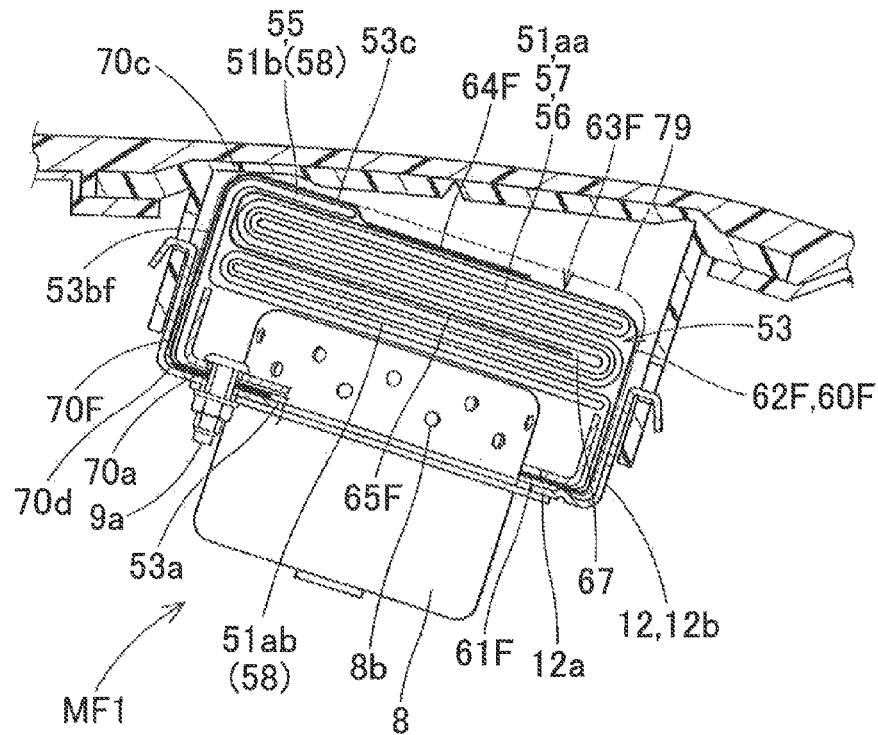
FIGS. 32A and 32B are views sequentially describing inflation states of the airbag during the operation of a front passenger seat airbag apparatus that is provided with the regulating member illustrated in FIG. 28.
Figure 32B:
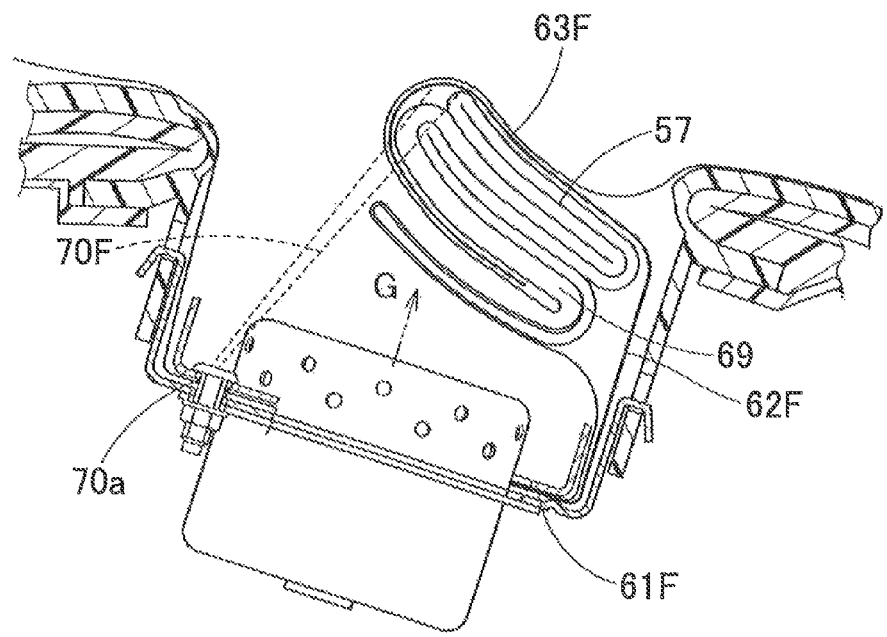

The completely folded body 53 covered by the regulating member 60F is folded as illustrated in FIGS. 8 to 10. For this reason, as illustrated in FIG. 32A, the completely folded body 53 is folded while disposing the initial deployment and inflation portion 58 from below the folded portion 57 accommodated in the temporary holding portion 63F to the front surface 53bf of the completely folded body 53. The initial deployment and inflation portion 58 is a portion at a further upstream side of the inflating gas G than the folded portion 57. In the illustrated example, the front portion 51b of the initial deployment and inflation portion 58 is disposed on the upper surface of the temporary holding portion 63F. The suppressing arm portions 70F, 70F are disposed on the upper surface of the front portion 51b and are provided so as to cover the front surface 53bf of the completely folded body 53.

Figure 33A:
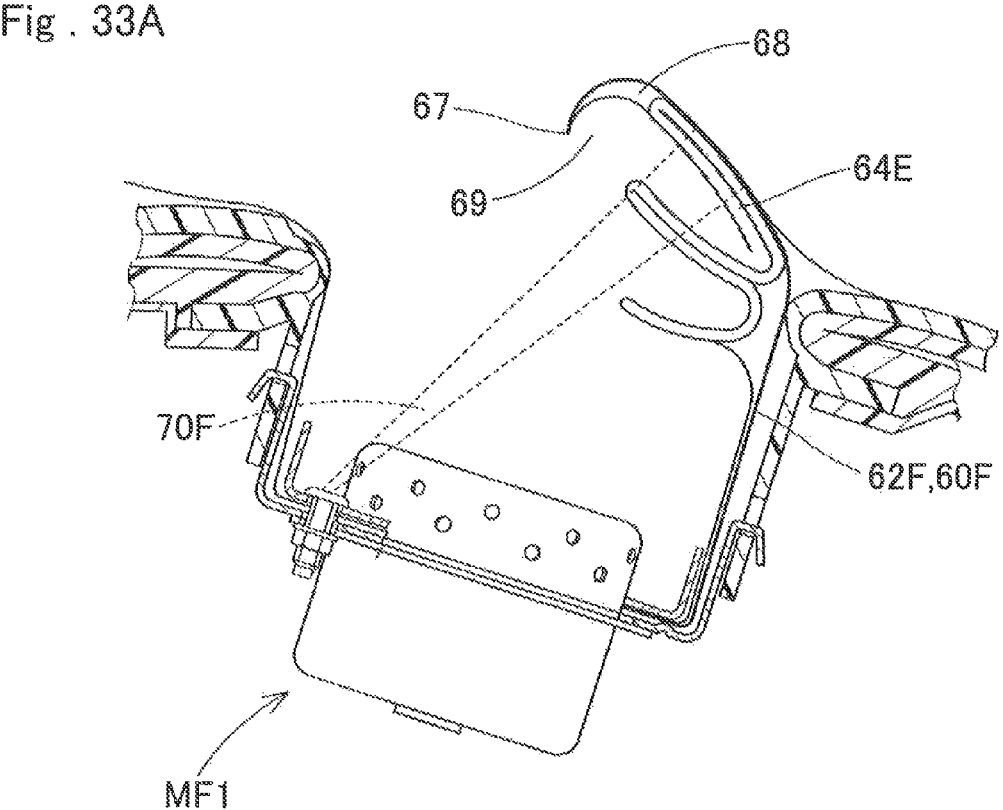
FIGS. 33A and 33B are views sequentially illustrating inflation states of the airbag subsequent to the inflation state in FIG. 32B.
Figure 33B:
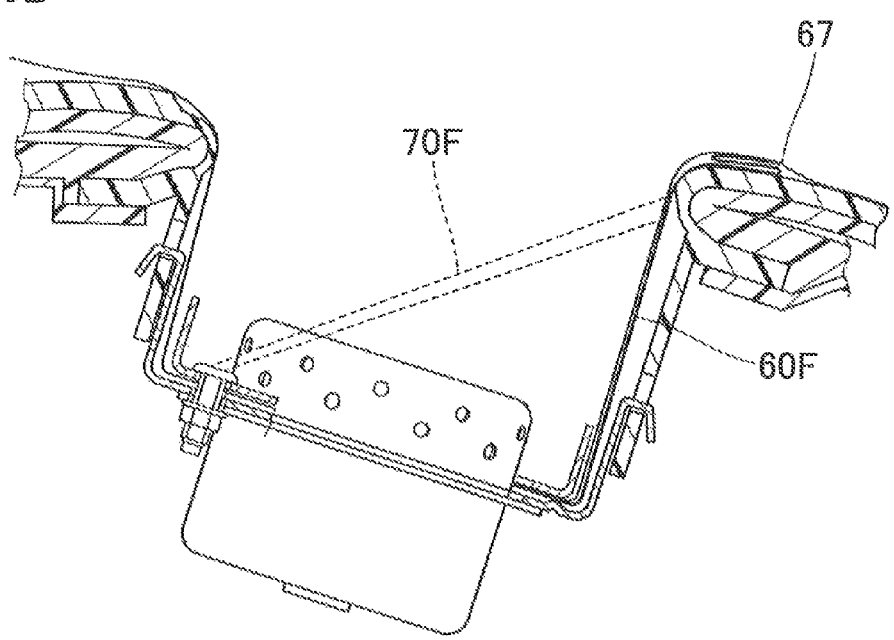
Figure 34:
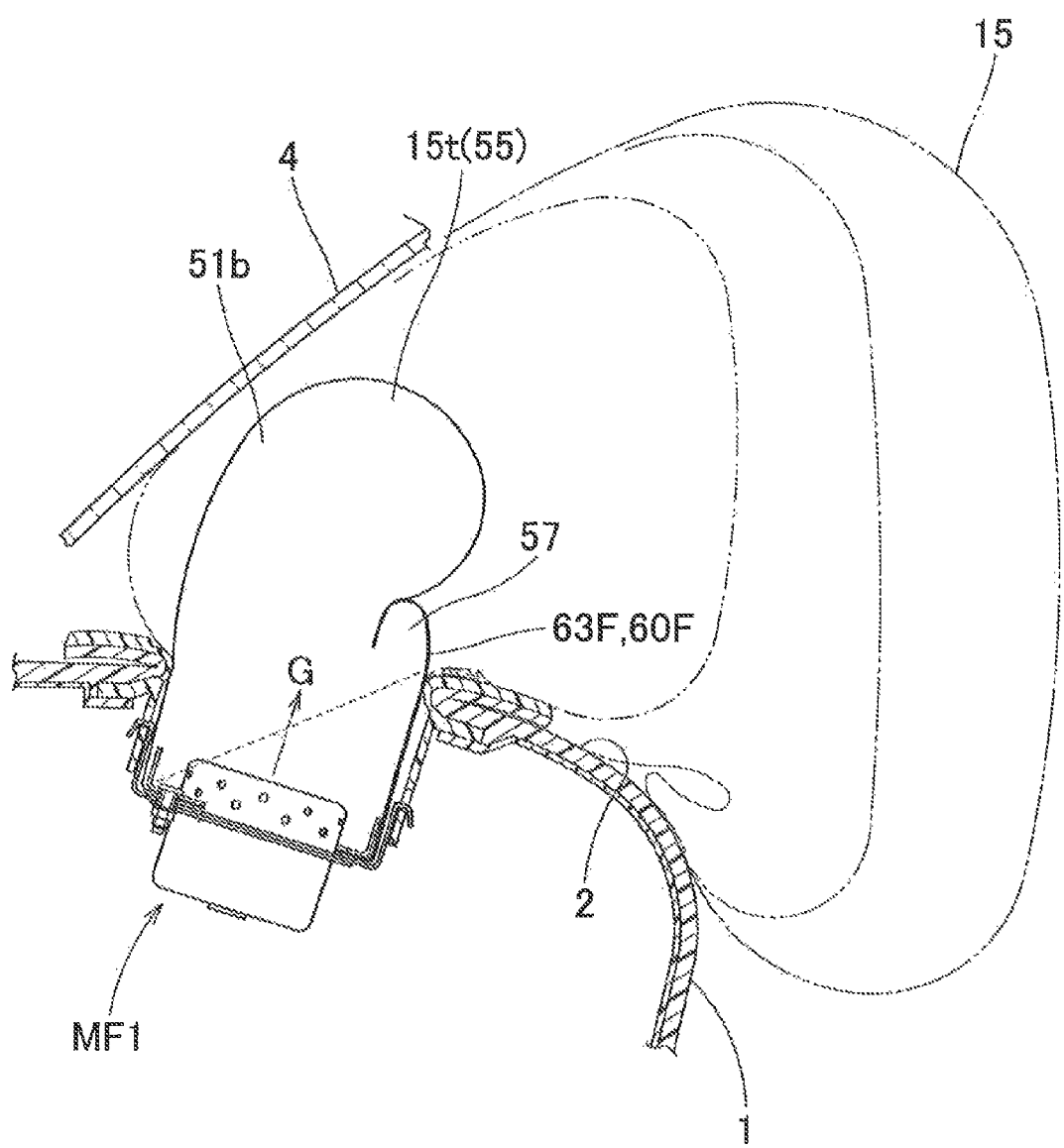
FIG. 34 is a schematic view illustrating an inflation state of the airbag of the front passenger seat airbag apparatus illustrated in FIG. 32A.

In an airbag apparatus MF1 using the regulating member 60F, the suppressing arm portions 70F, 70F respectively extend from the vicinity of the opposite edges (connected edges) 66 of the temporary holding portion 63F disposed on the ceiling surface 53c of the completely folded body 53. Each suppressing arm portion 70F extends to the distal end 63a of the temporary holding portion 63F so as to cover the front surface 53bf of the completely folded body 53. In other words, each suppressing arm portion 70F covers the front surface 53bf from above the initial deployment and inflation portion 58 of the airbag 15 and is connected to the bottom wall portion 12a of the case 12 by utilizing the bolt 9a. For this reason, as illustrated by the two-dot chain line in FIGS. 32A, 32B, 33A, and 30, at the initial stage of inflation of the airbag 15, two suppressing arm portions 70F suppress the deployment and inflation of the initial deployment and inflation portion 58 of the airbag 15 until the two suppressing arm portions 70F are separated from each other so as to be freed from the front surface 53bf of the completely folded body 53. Naturally, the suppressing arm portions 70F, 70F extend from the opposite edges (connected edges) 66 of the temporary holding portion 63F to the distal end 63a of the temporary holding portion 63F and are bent so as to cover the front surface 53bf of the initial deployment and inflation portion 58. Moreover, the suppressing arm portions 70F, 70F are bent so as to extend to the bottom surface 53a of the completely folded body 53, thereby being connected to the case 12. That is, the suppressing arm portion 70F has at least two bent portions 70c, 70d and has a long length extending from the ceiling surface 53c of the completely folded body 53 to the bottom surface 53a via the surface (the front surface) 53bf. For this reason, as illustrated in FIGS. 33A, 33B, and 34, although deployment of the initial deployment and inflation portion 58 is suppressed, the suppressing arm portions 70F, 70F do not hinder inflation of the initial deployment and inflation portion 58 and do not hinder the operation itself of the regulating member 60F as well, when freed from the completely folded body 53. In the operation of the regulating member 60F, the connecting piece portion 62F is bent and the temporary holding portion 63F is turned.

In the airbag 15 of the front passenger seat airbag apparatus MF1 in the illustrated example, the front portion 55 including the front portion 51b of the completely folded body 53 is the portion 15t protruding from the case 12 toward the windshield 4 thereabove at the initial stage of inflation of the airbag 15. For this reason, in the airbag 15 of the front passenger seat airbag apparatus MF1, deployment (protruding height) of the initial protruding portion 15t is suppressed, and thus, it is possible to suppress strong interference with the windshield 4.

Figure 35:
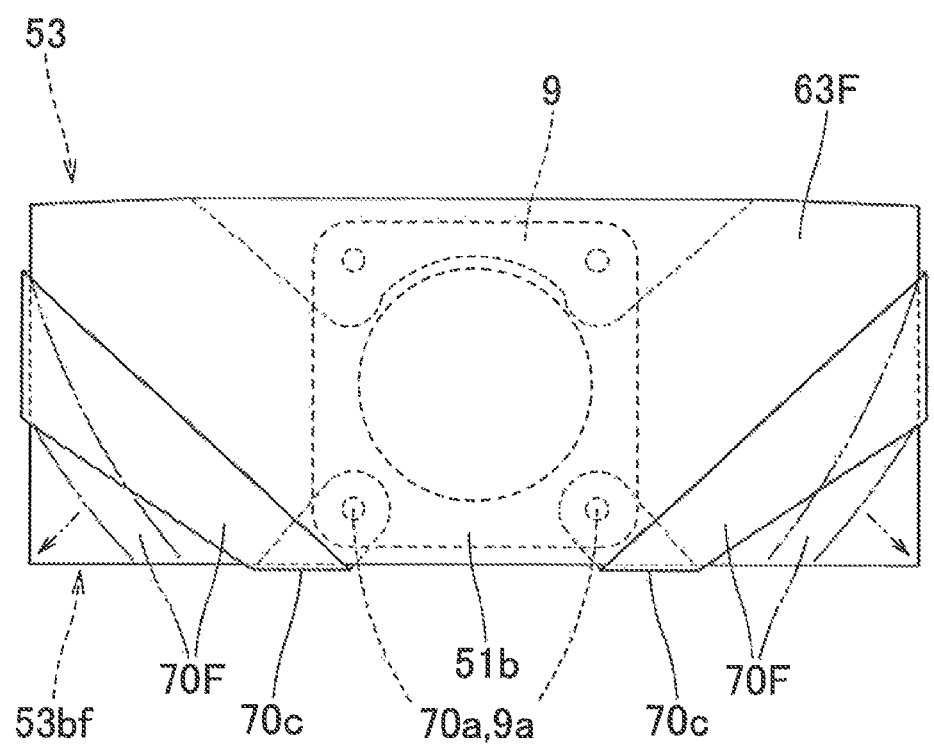
FIG. 35 is a plan view illustrating a state in which the regulating member illustrated in FIG. 28 covers a completely folded body of the modification example.
Figure 36A:
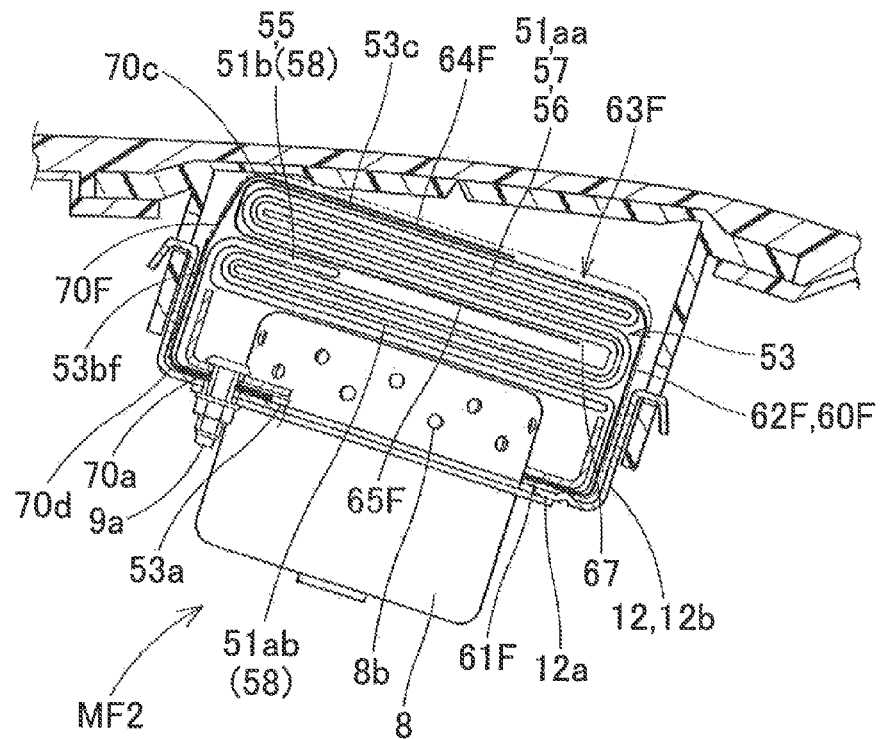
FIGS. 36A and 36B are views sequentially describing inflation states of the airbag during the operation of a front passenger seat airbag apparatus that is provided with the completely folded body in FIG. 35.
Figure 36B:
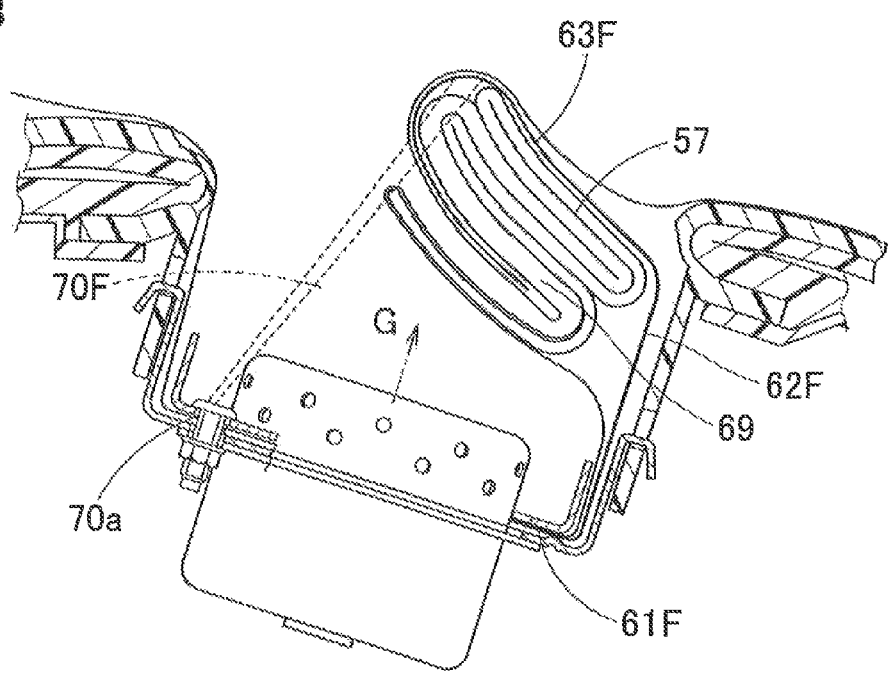

In the airbag apparatus MF1 illustrated in FIGS. 32 to 34, the front portion 51b of the initial deployment and inflation portion 58 is disposed on the upper surface of the temporary holding portion 63F. The suppressing arm portions 70F, 70F are disposed on the upper surface of the front portion 51b and are provided to be bent so as to cover the front surface 53bf of the completely folded body 53. However, in an airbag apparatus MF2 illustrated in FIGS. 35 and 36A, the temporary holding portion 63F accommodating the folded portion 57 is disposed on the upper surface of the front portion 51b. The suppressing arm portion 70F may be caused to extend to the distal end 63a of the temporary holding portion 63F while being disposed on the upper surface of the temporary holding portion 63F, to bend so as to cover the front surface 53bf of the completely folded body 53, and to be locked by the front bolt 9a in the retainer 9 on the bottom surface 53a of the completely folded body 53, thereby being connected to the case 12.

Figure 37A:
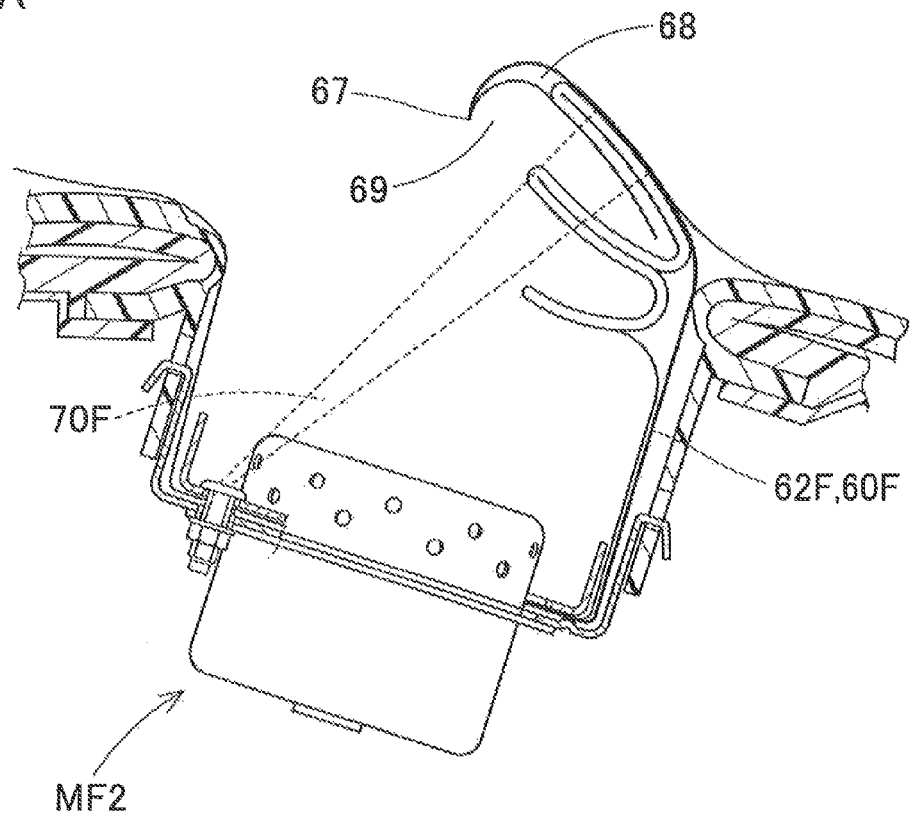
FIGS. 37A and 37B are views sequentially illustrating inflation states of the airbag subsequent to the inflation state in FIG. 36B.
Figure 37B:
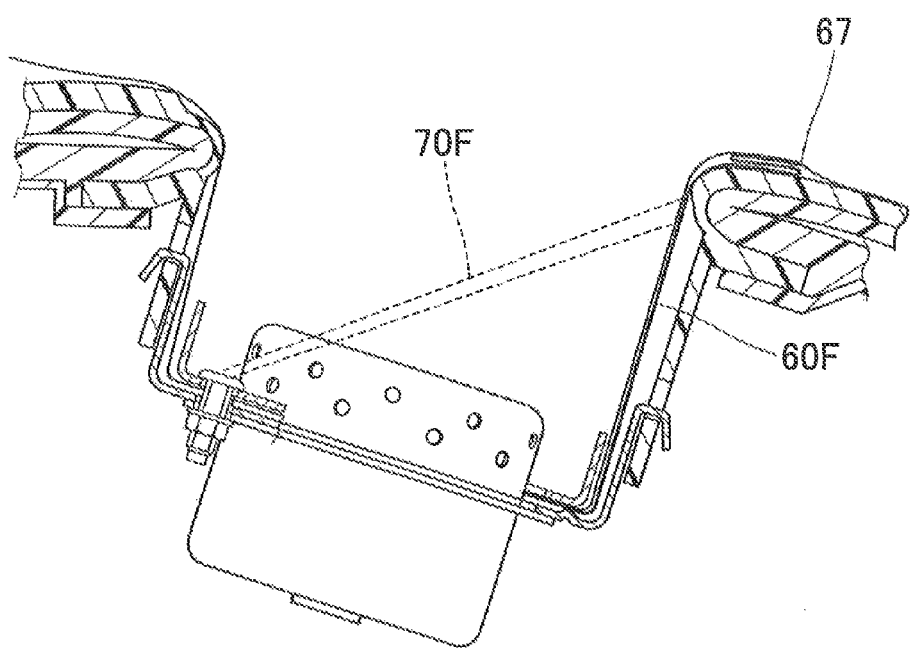
Figure 38:
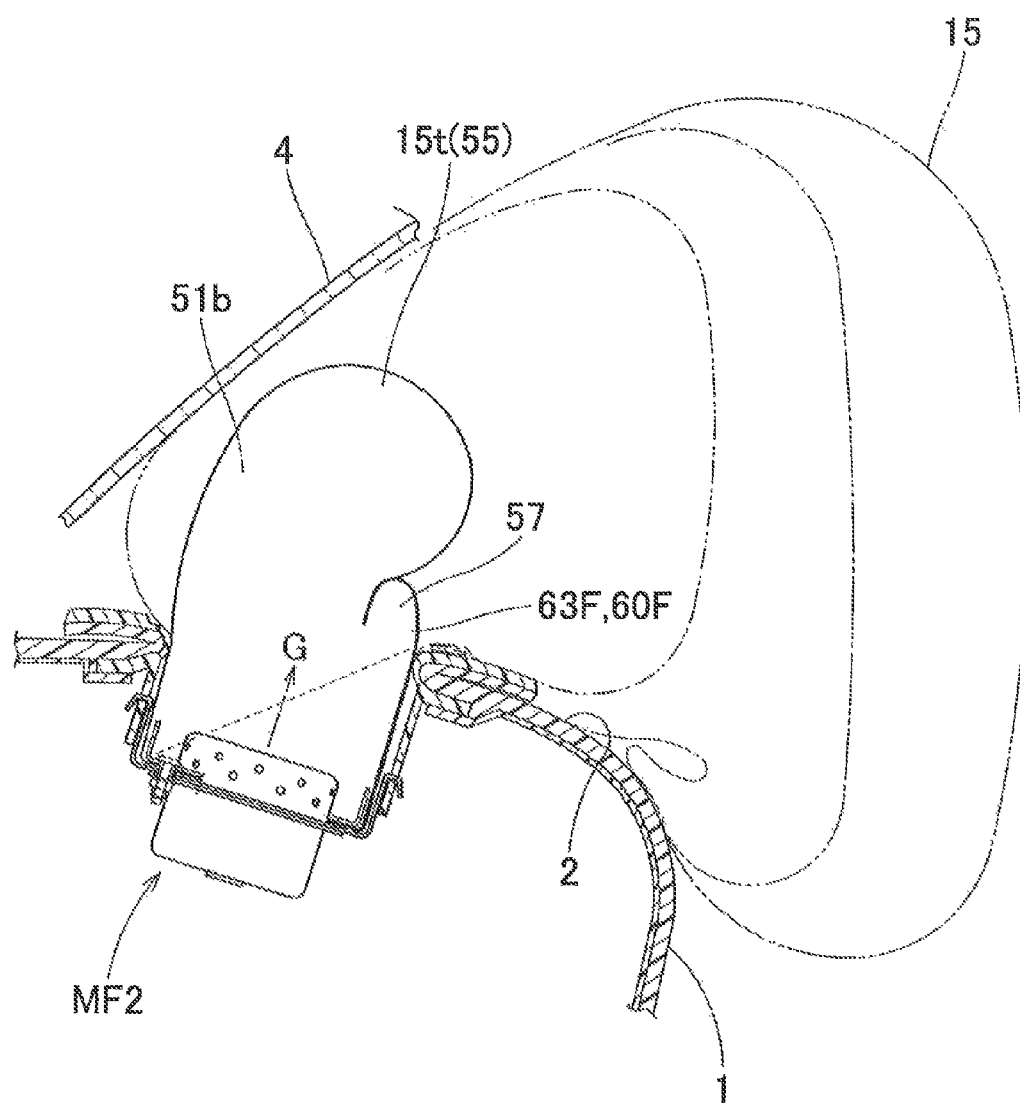
FIG. 38 is a schematic view illustrating an inflation state of the airbag of the front passenger seat airbag apparatus illustrated in FIG. 36A.

Despite such an airbag apparatus MF2, as illustrated by the two-dot chain line in FIGS. 36A, 36B, 37A, and 35, at the initial stage of inflation of the airbag 15, two suppressing arm portions 70F can suppress the deployment and inflation of the initial deployment and inflation portion 58 of the airbag 15 until the two suppressing arm portions 70F are separated from each other so as to be freed from the front surface 53bf of the completely folded body 53. Naturally, in the airbag apparatus MF2 as well, the suppressing arm portions 70F, 70F extend from the opposite edges (connected edges) 66 of the temporary holding portion 63F to the distal end 63a of the temporary holding portion 63F and are bent so as to cover the front surface 53bf of the initial deployment and inflation portion 58. Moreover, the suppressing arm portions 70F, 70F are bent so as to extend to the bottom surface 53a of the completely folded body 53, thereby being connected to the case 12. That is, the suppressing arm portion 70F has at least two bent portions 70c, 70d and has a long length extending from the ceiling surface 53c of the completely folded body 53 to the bottom surface 53a via the front surface 53bf. For this reason, as illustrated in FIGS. 37A, 37B, and 38, although deployment of the initial deployment and inflation portion 58 is suppressed, the suppressing arm portions 70F do not hinder inflation of the initial deployment and inflation portion 58 when freed from the completely folded body 53. Moreover, the suppressing arm portions 70F do not hinder the operation itself of the regulating member 60F, such as bending the connecting piece portion 62F and turning the temporary holding portion 63F when freed from the completely folded body 53.

Accordingly, despite of the airbag 15 of the front passenger seat airbag apparatus MF2 in the illustrated example, deployment (protruding height) of the initial protruding portion 15t is suppressed, and thus, it is possible to suppress strong interference with the windshield 4.

Figure 28:
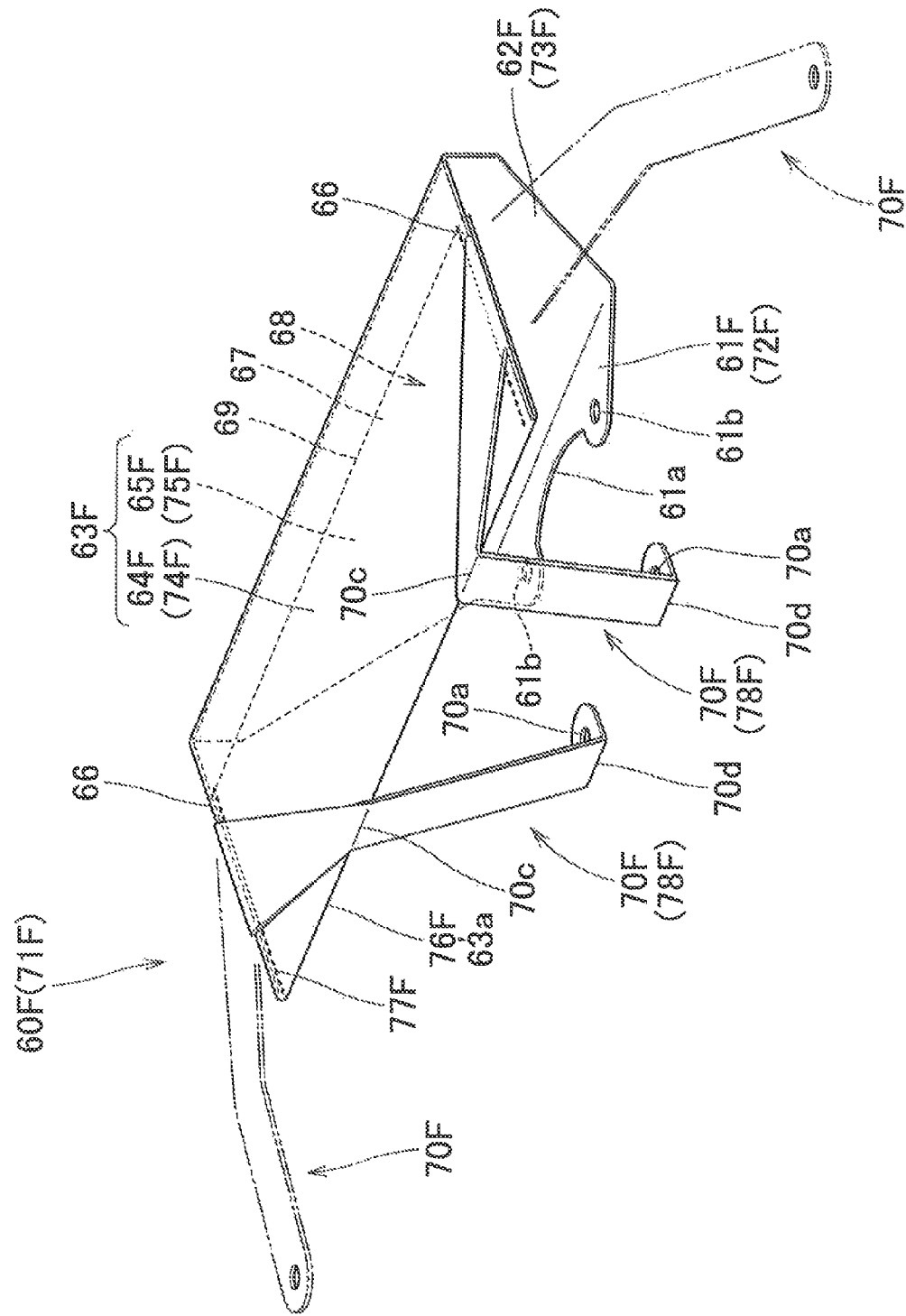
FIG. 28 is a perspective view illustrating a regulating member of a modification example of the embodiment.
Figure 29:
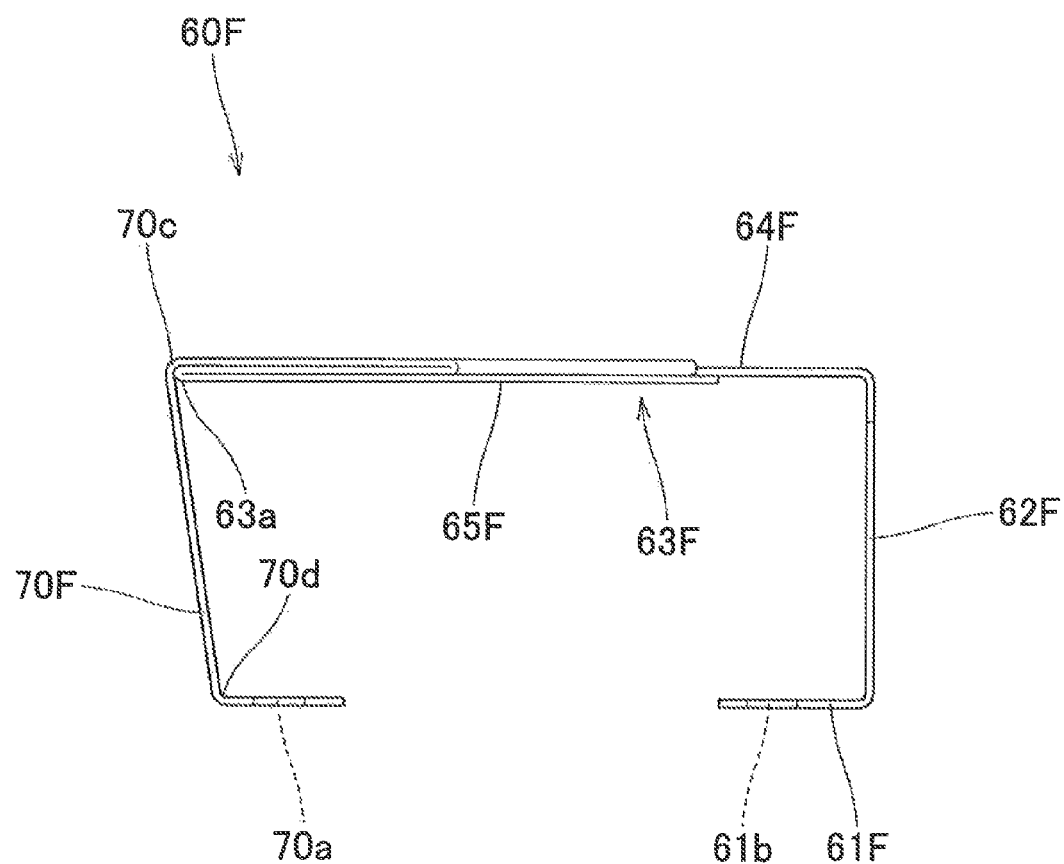
FIG. 29 is a side view of the regulating member illustrated in FIG. 28.
Figure 30:
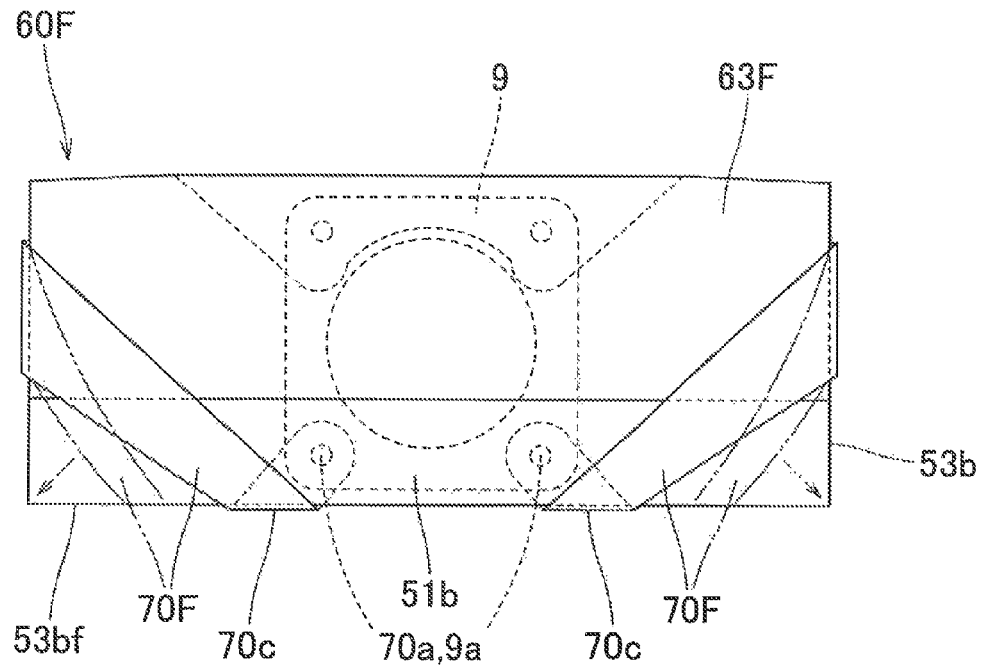
FIG. 30 is a plan view illustrating a state in which the regulating member illustrated in FIG. 28 covers a completely folded body.
Figure 31:
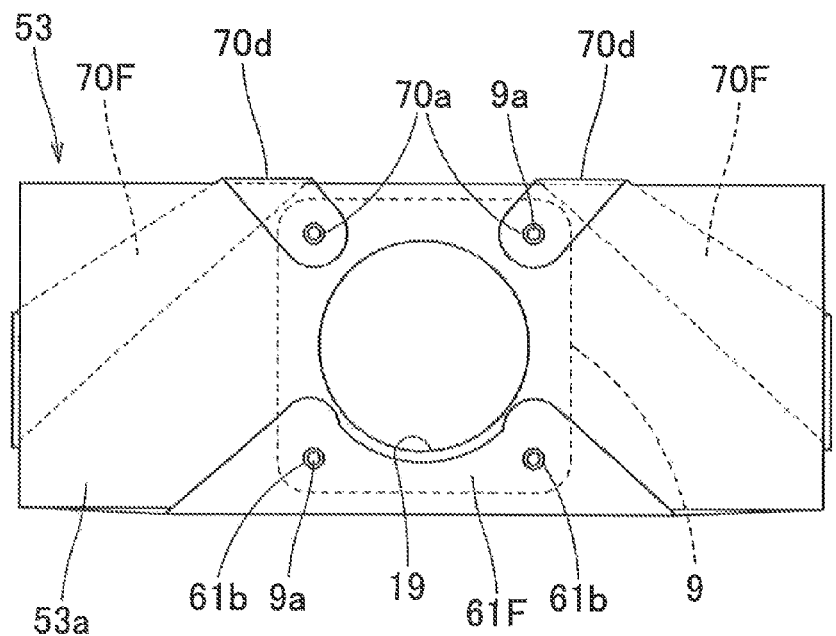
FIG. 31 is a bottom view illustrating a state in which the regulating member illustrated in FIG. 28 covers the completely folded body.

In the regulating member 60F illustrated in FIG. 28, the suppressing arm portion 70F formed to protrude from the base portion 64F of the temporary holding portion 63F on both the right and left. The suppressing arm portion 70F is used to be folded back at a portion of the connected edge 66 so as to be disposed on the outer surface of the base portion 64F.

Figure 39:
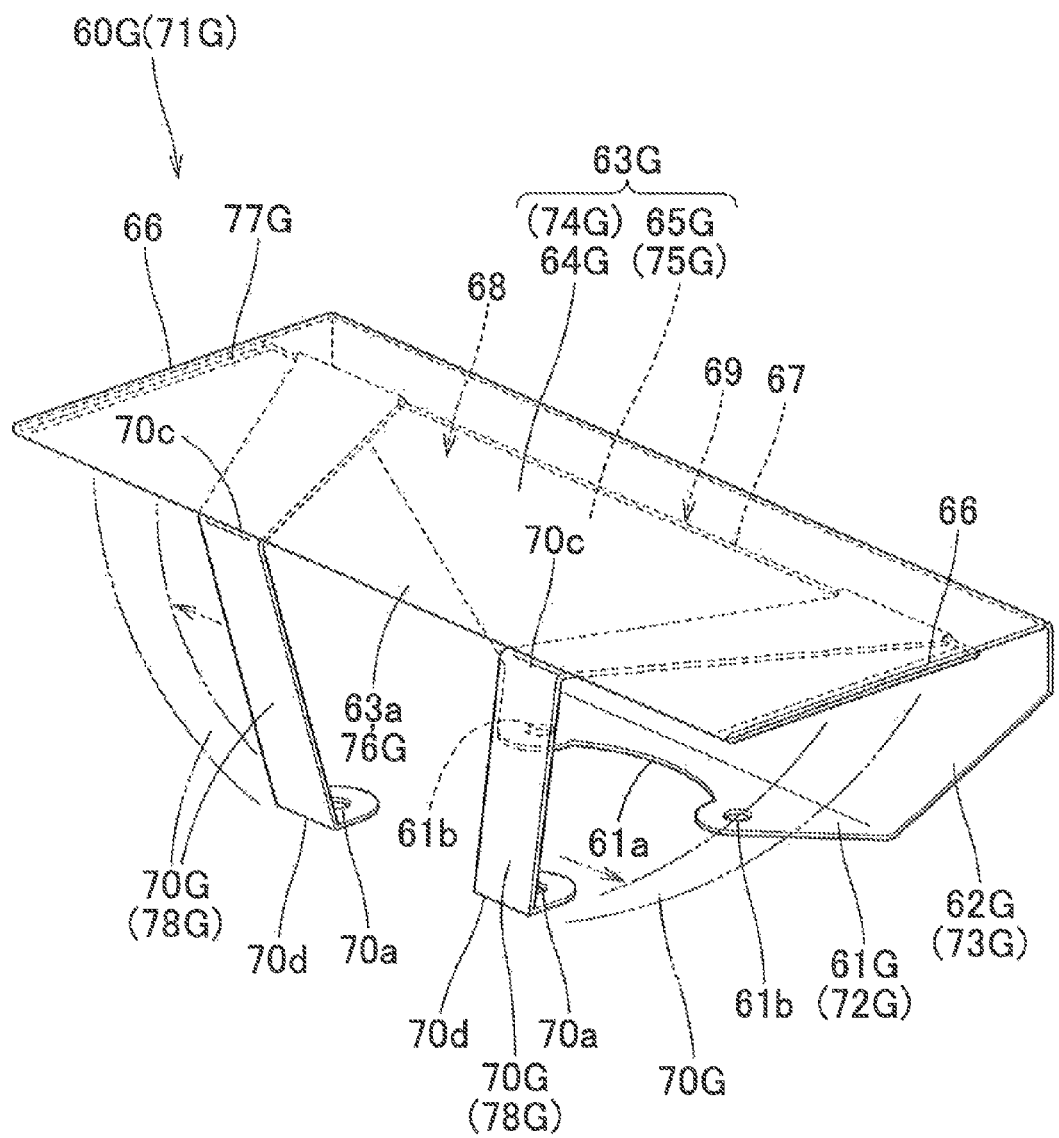
FIG. 39 is a perspective view illustrating a regulating member of a modification example of the embodiment.
Figure 40:
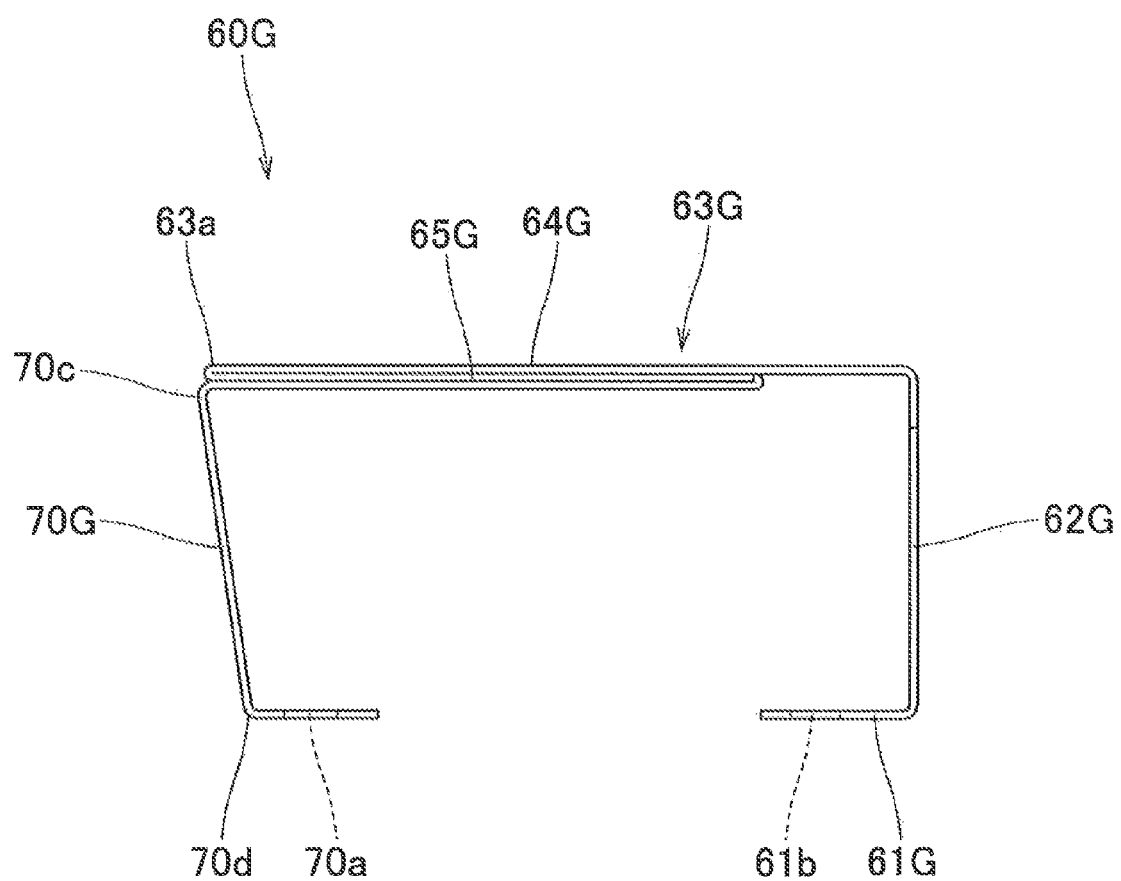
FIG. 40 is a side view of the regulating member illustrated in FIG. 39.
Figure 41A:
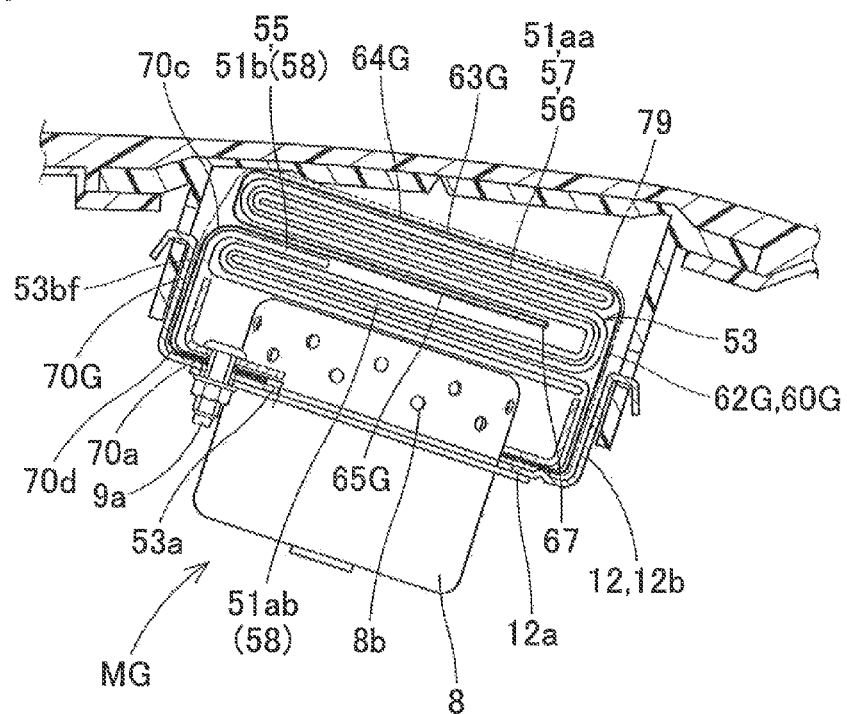
FIGS. 41A and 41B are views sequentially describing inflation states of the airbag during the operation of a front passenger seat airbag apparatus that is provided with the regulating member in FIG. 39.
Figure 41B:
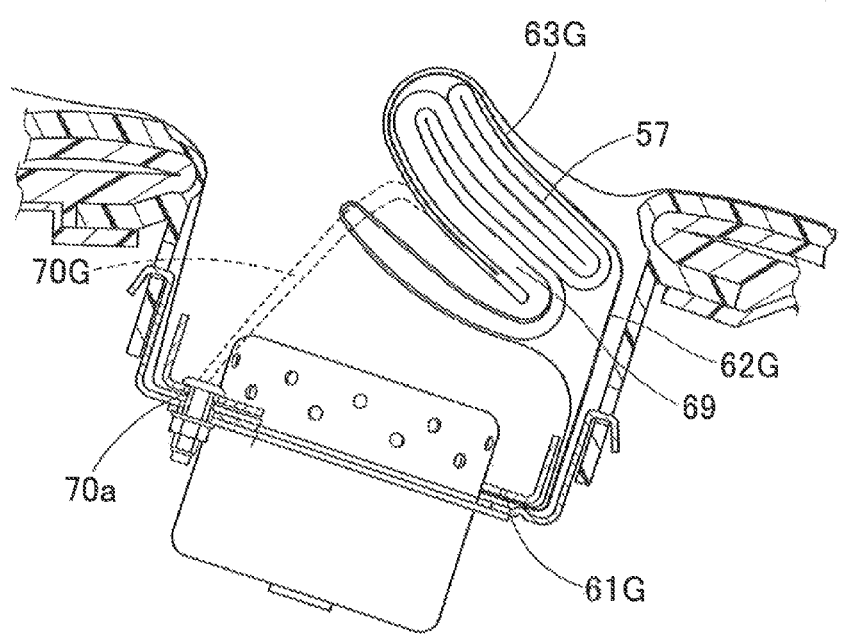

In contrast, as with a regulating member 60G illustrated in FIGS. 39 to 41, suppressing arm portions 70G, 70G may be folded back to extend from the vicinity of the connected edge 66 in a cover portion 65G of a temporary holding portion 63G. The suppressing arm portions 70G, 70G respectively extend from the vicinity of the connected edge 66 over the distal end 63a of the temporary holding portion 63G, and cover the front surface 53bf of the completely folded body 53. Moreover, the suppressing arm portions 70G, 70G extend to the bottom surface 53a of the completely folded body 53, and respectively cause the attachment holes 70a to be locked by the front bolts 9a in the retainer 9, thereby being connected to the bottom wall portion 12 of the case 12. Naturally, in the suppressing arm portions 70G, 70G as well, when the initial deployment and inflation portion 58 of the airbag 15 inflates, the suppressing arm portions 70G, 70G is provided to be able to be freed from the state covering the front surface 53*bf* of the completely folded body 53 so as to be separated from each other.

Figure 42A:
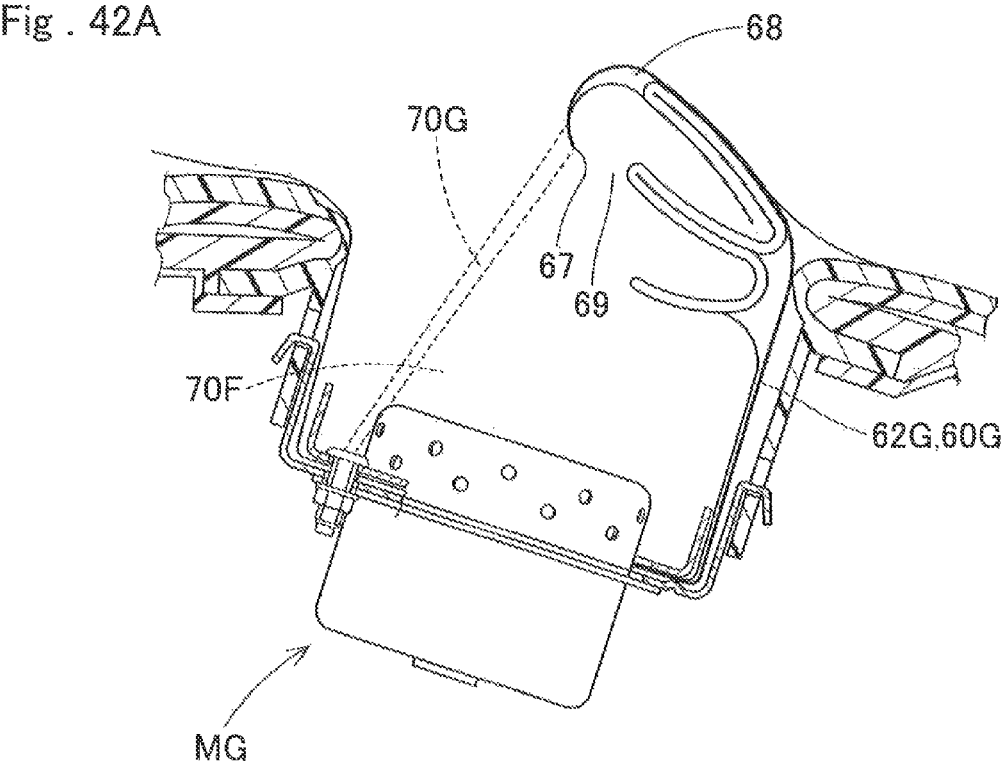
FIGS. 42A and 42B are views sequentially illustrating inflation states of the airbag subsequent to the inflation state in FIG. 41B.
Figure 42B:
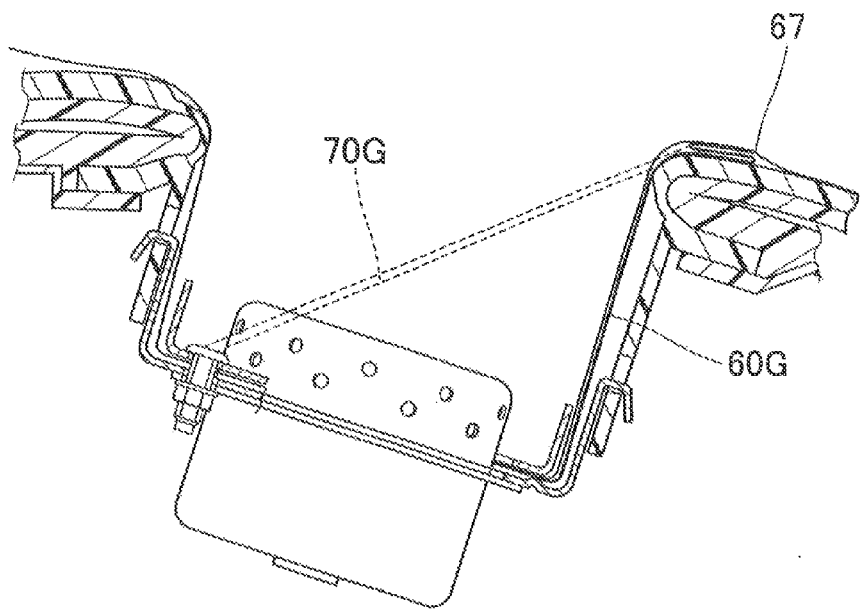
Figure 43:
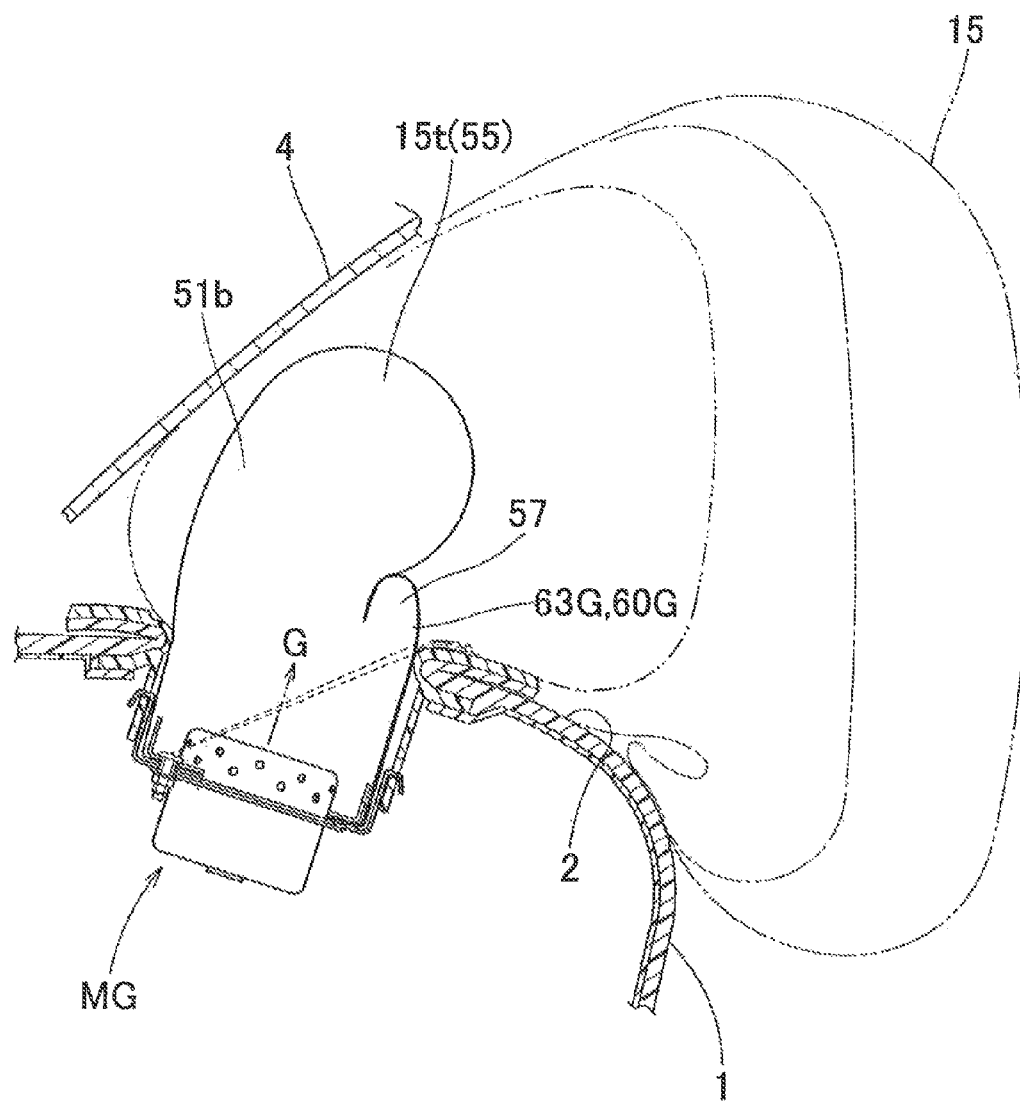
FIG. 43 is a schematic view illustrating an inflation state of the airbag of the front passenger seat airbag apparatus illustrated in FIG. 41A.

For this reason, despite of an airbag apparatus MG using the regulating member 60G, the suppressing arm portions 70G respectively extend to the distal end 63*a* of the temporary holding portion 63G and cover the front surface 53*bf* of the completely folded body 53, that is, cover the front surface 53*bf* from above the initial deployment and inflation portion 58 of the airbag 15, thereby being connected to the bottom wall portion 12*a* of the case 12 utilizing the bolt 9*a*. For this reason, as illustrated by the two-dot chain line in FIGS. 41A, 41B, 42A, and 39, at the initial stage of inflation of the airbag 15, two suppressing arm portions 70G suppress the deployment and inflation of the initial deployment and inflation portion 58 of the airbag 15 until the two suppressing arm portions 70G are separated from each other so as to be freed from the front surface 53*bf* of the completely folded body 53. Naturally, the suppressing arm portions 70G, 70G extend from the opposite edges (connected edges) 66 of the temporary holding portion 63G to the distal end 63*a* of the temporary holding portion 63G and are bent so as to cover the front surface 53*bf* of the initial deployment and inflation portion 58. Moreover, the suppressing arm portions 70G, 70G are bent so as to extend to the bottom surface 53*a* of the completely folded body 53, thereby being connected to the case 12. That is, the suppressing arm portion 70G has at least two bent portions 70*c*, 70*d* and has a long length extending from the ceiling surface 53*c* of the completely folded body 53 to the bottom surface 53*a* via the front surface 53*bf*. For this reason, as illustrated in FIGS. 42A, 42B, and 43, although deployment of the initial deployment and inflation portion 58 is suppressed, the suppressing arm portions 70G do not hinder inflation of the initial deployment and inflation portion 58 when freed from the completely folded body 53. Moreover, the suppressing arm portions 70G do not hinder the operation itself of the regulating member 60G, such as bending the connecting piece portion 62G and turning the temporary holding portion 63G.

Accordingly, despite of the airbag apparatus MG, deployment (protruding height) of the initial protruding portion 15*t* is suppressed, and thus, it is possible to suppress strong interference with the windshield 4.

The regulating member 60F illustrated in FIG. 28 is made of a piece of regulating member formation sheet material 71F made of a flexible woven fabric such as polyester or the like. An attachment formation portion 72F, a connecting piece formation portion 73F, a base formation portion 74F, and a cover formation portion 75F are continuously formed in the sheet material 71F. The attachment formation portion 72F is a portion for forming the attachment portion 61F. The connecting piece formation portion 73F is a portion for forming a connecting piece portion 62F. The base formation portion 74F is a portion for forming the base portion 64F. The cover formation portion 75F is a portion for forming a cover portion 65F. A suppressing arm formation portion 78F for forming the suppressing arm portion 70F is provided so as to laterally extend from the base formation portion 74F. The temporary holding portion 63F is formed to have a folding line 76E so as to fold and stack the base formation portion 74F and the cover formation portion 75F of the flatly deployed regulating member formation sheet material 71F, and to have a stitched portion 77F obtained by stitching the connected edges 66, 66 of the outer circumferential edge. However, when the regulating member 60F is made of a piece of the regulating member formation sheet material 71F, a cutting shape thereof results in an unfavorable yield rate because the suppressing arm formation portion 78F exhibits a laterally widened deployment shape so as to significally protrude obliquely outward from the opposite edge of the base formation portion 74F on the right and left.

In contrast, the regulating member 60G illustrated in FIG. 39 allows a cutting shape having a favorable yield rate. That is, the regulating member 60G is also made of a piece of regulating member formation sheet material 71G made of a flexible woven fabric such as polyester. An attachment formation portion 72G for forming the attachment portion 61G, a connecting piece formation portion 73G for forming a connecting piece portion 62G, a base formation portion 74G for forming the base portion 64G, and a cover formation portion 75G for forming a cover portion 65G are continuously formed in the sheet material 71G. The temporary holding portion 63G is formed to have a folding line 76G so as to fold and stack the base formation portion 74G and the cover formation portion 75G of the flatly deployed regulating member formation sheet material 71G, and to have a stitched portion 77G obtained by stitching the connected edges 66, 66 of the outer circumferential edge. Suppressing arm formation portions 78G for forming the suppressing arm portions 70G are provided so as to approach each other toward the center in the lateral direction from the vicinity of the connected edge 66 of the cover formation portion 75G. That is, the suppressing arm formation portion 78G is continuously formed not to be widened but to be laterally narrowed from the cover formation portion 75G. For this reason, compared to the regulating member formation sheet material 71F for forming the regulating member 60F, the regulating member formation sheet material 71G for forming the regulating member 60G can be cut having a narrower width. Therefore, the regulating member 60G can be manufactured by being cut at a favorable yield rate, compared to the regulating member 60F.

Figure 44:
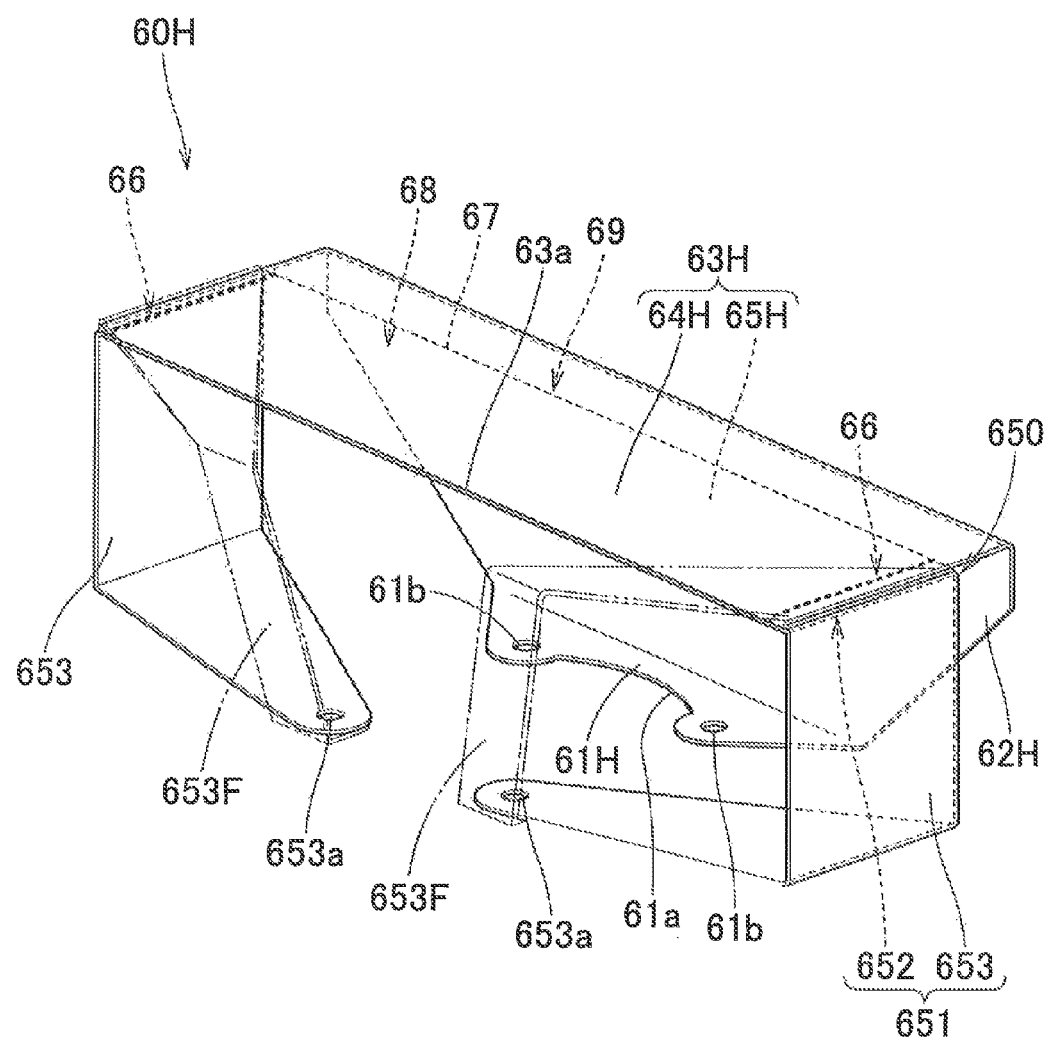
FIG. 44 is a perspective view illustrating a regulating member of a modification example of the embodiment.
Figure 45:
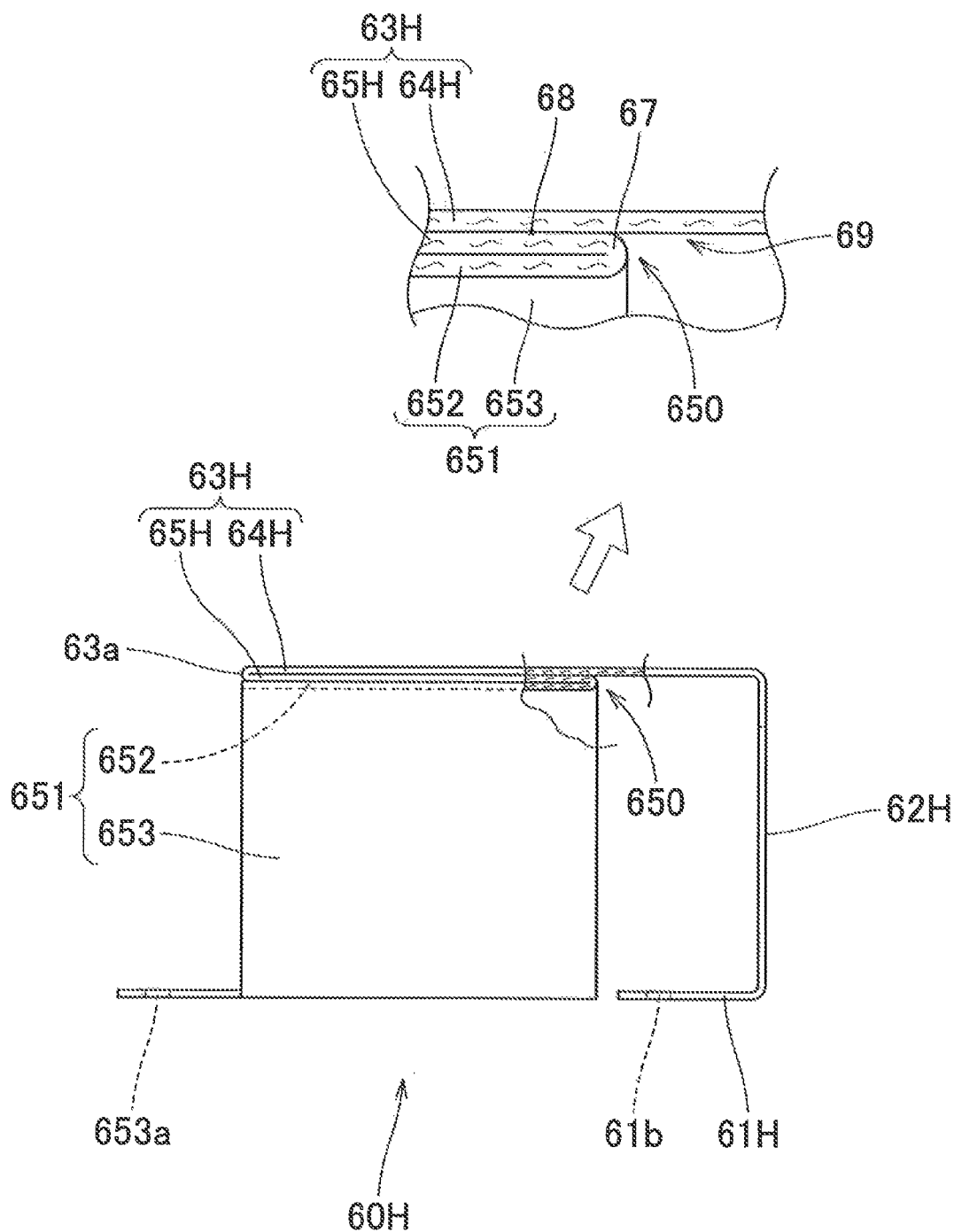
FIG. 45 is a partial broken side view of the regulating member illustrated in FIG. 44.
Figure 46A:
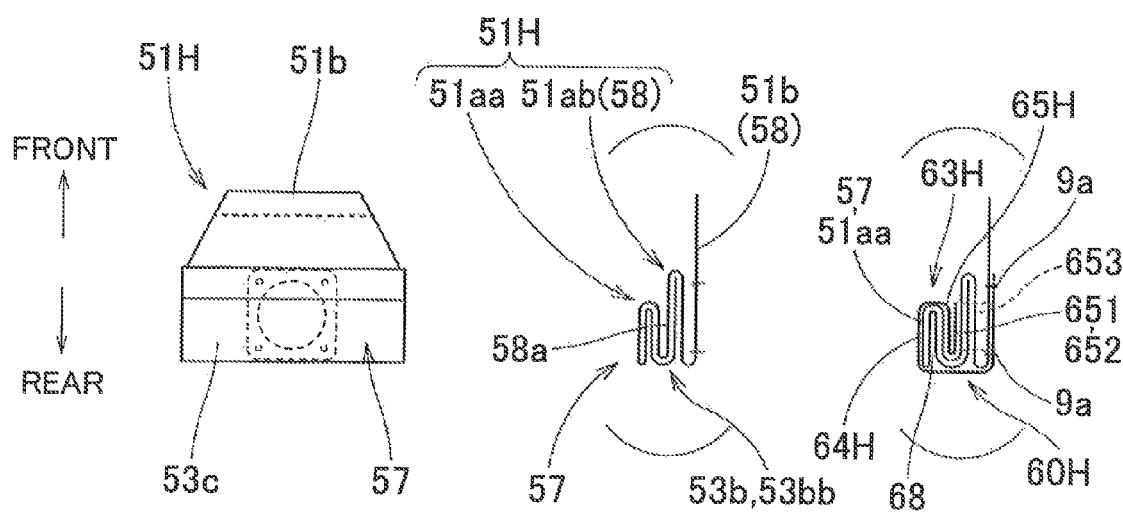
FIGS. 46A and 46B are views sequentially illustrating a state in which the regulating member illustrated in FIG. 44 covers a completely folded body.
Figure 46B:
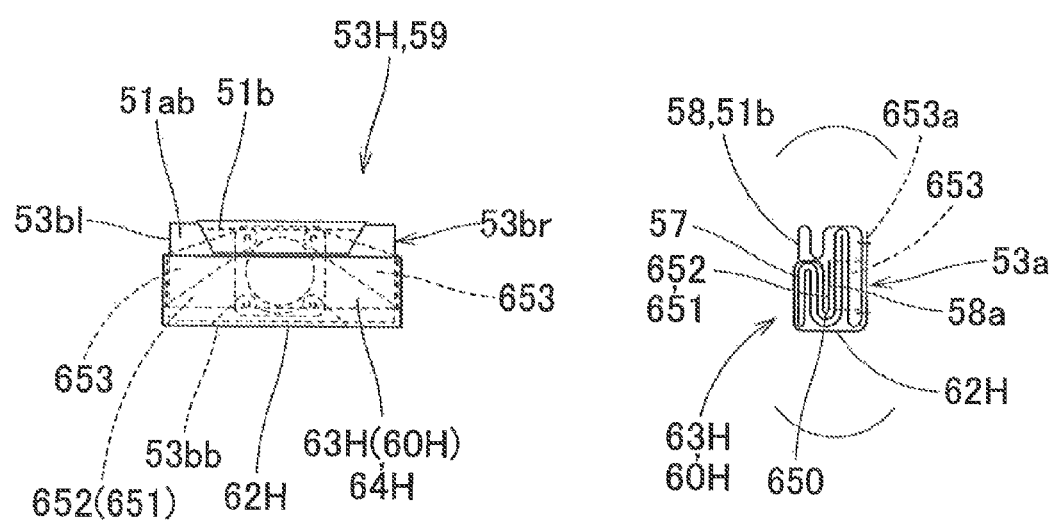

When the deployment and inflation of the folded portion is further regulated, a regulating member 60H illustrated in FIGS. 44 to 46 may be used. The regulating member 60H includes a deployment suppressing portion 651. The deployment suppressing portion 651 extends from a cover portion 65H of a temporary holding portion 63H accommodating the folded portion 57.

The deployment suppressing portion 651 includes a base portion 652 and connection arm portions 653, 653. The base portion 652 has a rectangular parallelepiped sheet shape in substantially the same size as the cover portion 65H. The connection arm portions 653, 653 laterally extend from the base portion 652 on both the right and left. The base portion 652 extends from the non-connected release edge 67 of the cover portion 65H in the temporary holding portion 63H. The base portion 652 is provided to be bent forward to the distal end 63*a* of the temporary holding portion 63H. That is, the base portion 652 is provided between an upper surface 58*a* of a portion 51*ab* of the initial deployment and inflation portion 58 below the folded portion 57, and the cover portion 65H.

The connection arm portions 653, 653 respectively cover both right and left (refer to FIG. 46B) 53*br* and 53*bl* of the surface 53*b* of a completely folded body 53H, extend to the bottom surface 53*a*, and are connected to the case 12 as an accommodating portion. An attachment hole 653*a* is formed at a distal end of each of the connection arm portions 653. The front bolt 9*a* of the retainer 9 is inserted into the attachment hole 653*a* so that each of the connection arm portions 653 is hooked in the front bolt 9*a*, thereby, being connected to the case 12.

As illustrated in FIG. 46, when forming a longitudinal size reduced airbag 51H, the completely folded body 53H of the airbag 15 using the regulating member 60H is formed by slightly narrowing the lateral width of the folded portion 57 in the longitudinal direction and folding the front portion 51b into a bellows shape in the front of the folded portion 57.

When assembling the regulating member 60H with the airbag 15, firstly, a folding line 65C is provided with respect to the air bag 51H subjected to longitudinal size reduction folding. The base portion 652 of the deployment suppressing portion 651 abuts on the upper surface 58a of the portion 51ab below the folded portion 57 in the initial deployment and inflation portion 58, and the folded portion 57 is accommodated inside the temporary holding portion 63H. The temporary holding portion 63H is stacked on the upper surface of the base portion 652, the attachment portion 61H is locked by the rear bolt 9a in the retainer 9, and each of the connection arm portions 653 is locked by the front bolt 9a in the retainer 9, thereby completing the assembling of the regulating member 60H with respect to the completely folded body 53H. Thereafter, the regulating member 60H is covered by the wrapping member 79 together with the front portion 51b folded in a bellows shape.

Figure 47A:
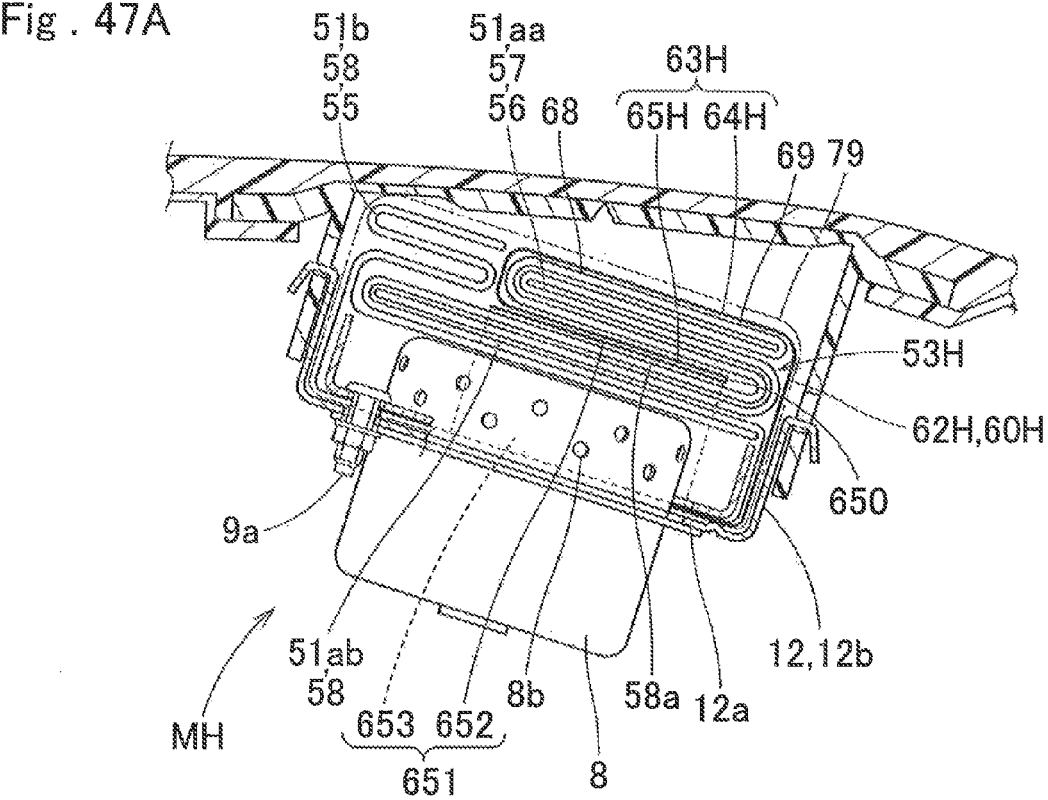
FIGS. 47A and 47B are views sequentially describing inflation states of the airbag during the operation of a front passenger seat airbag apparatus that is provided with the regulating member in FIG. 44.
Figure 47B:
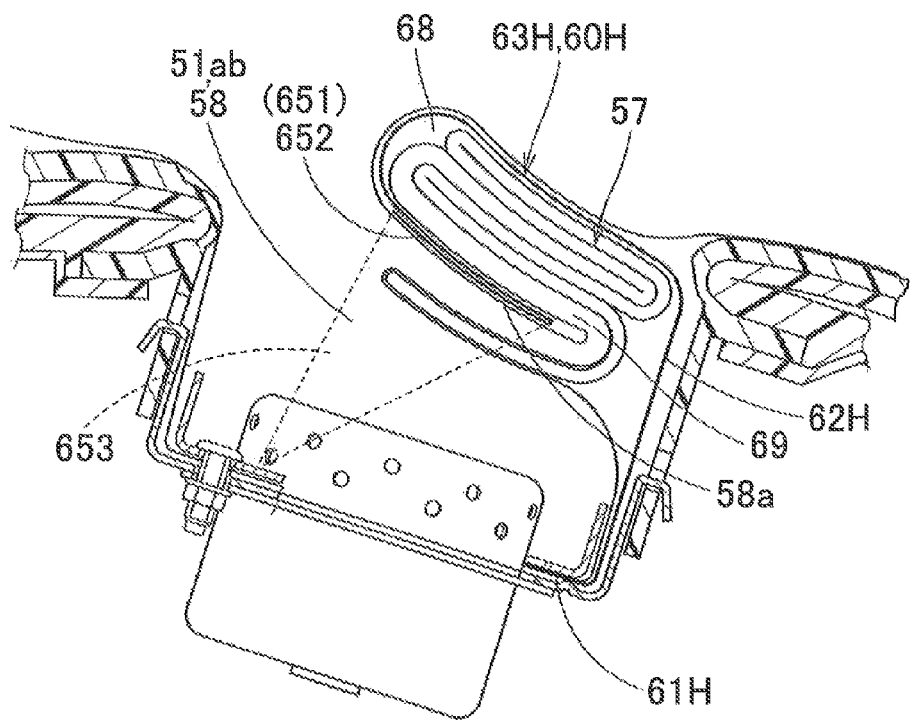
Figure 48A:
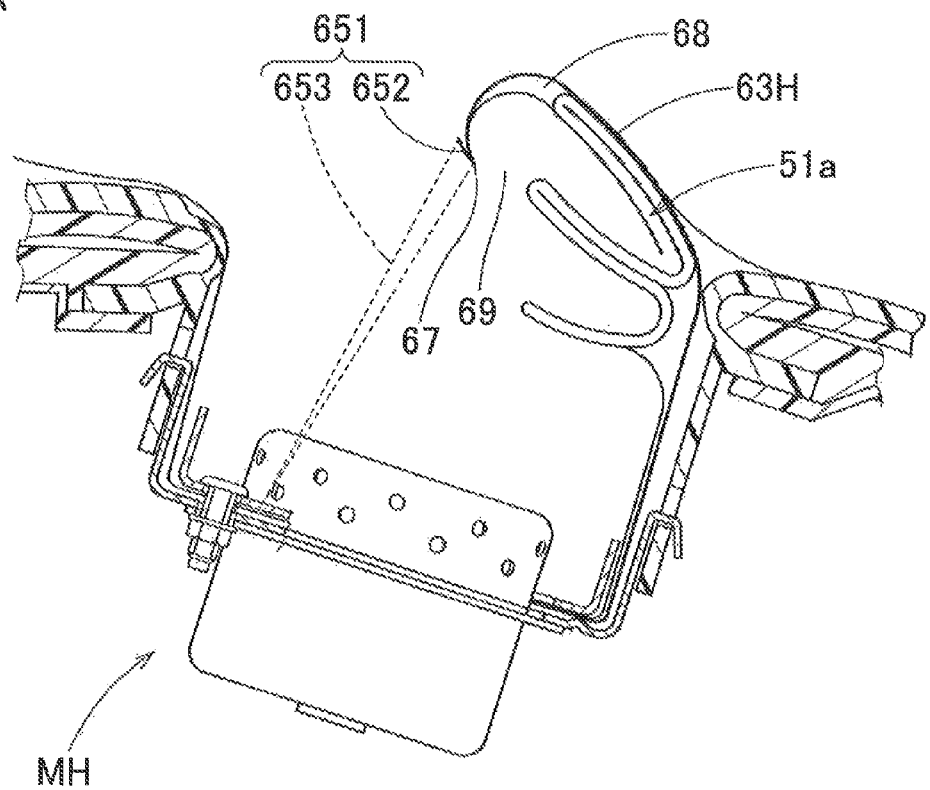
FIGS. 48A and 48B are views sequentially illustrating inflation states of the airbag subsequent to the inflation state in FIG. 47B.
Figure 48B:
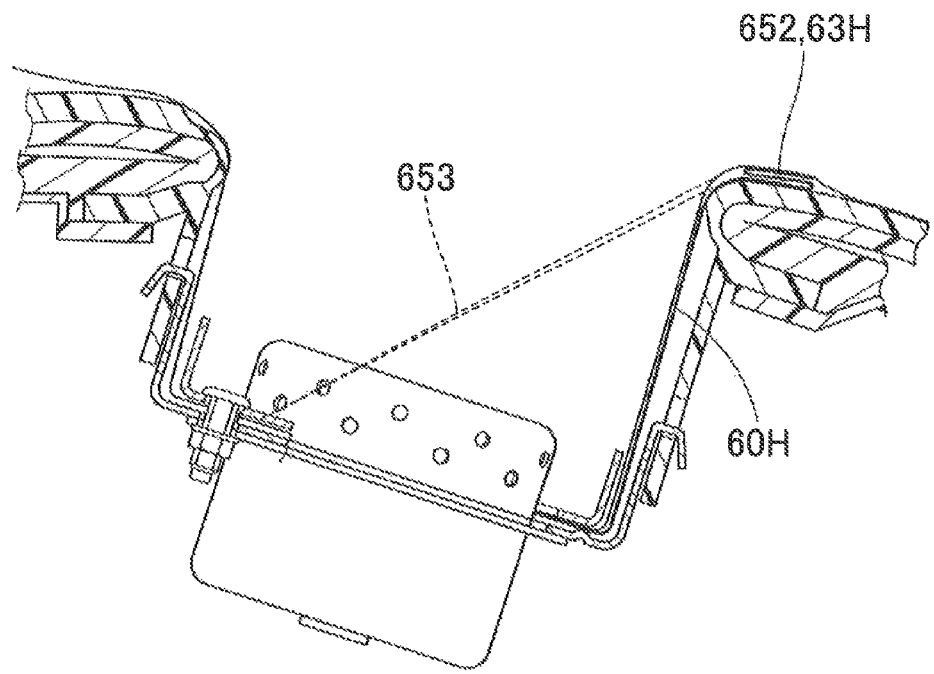
Figure 49:
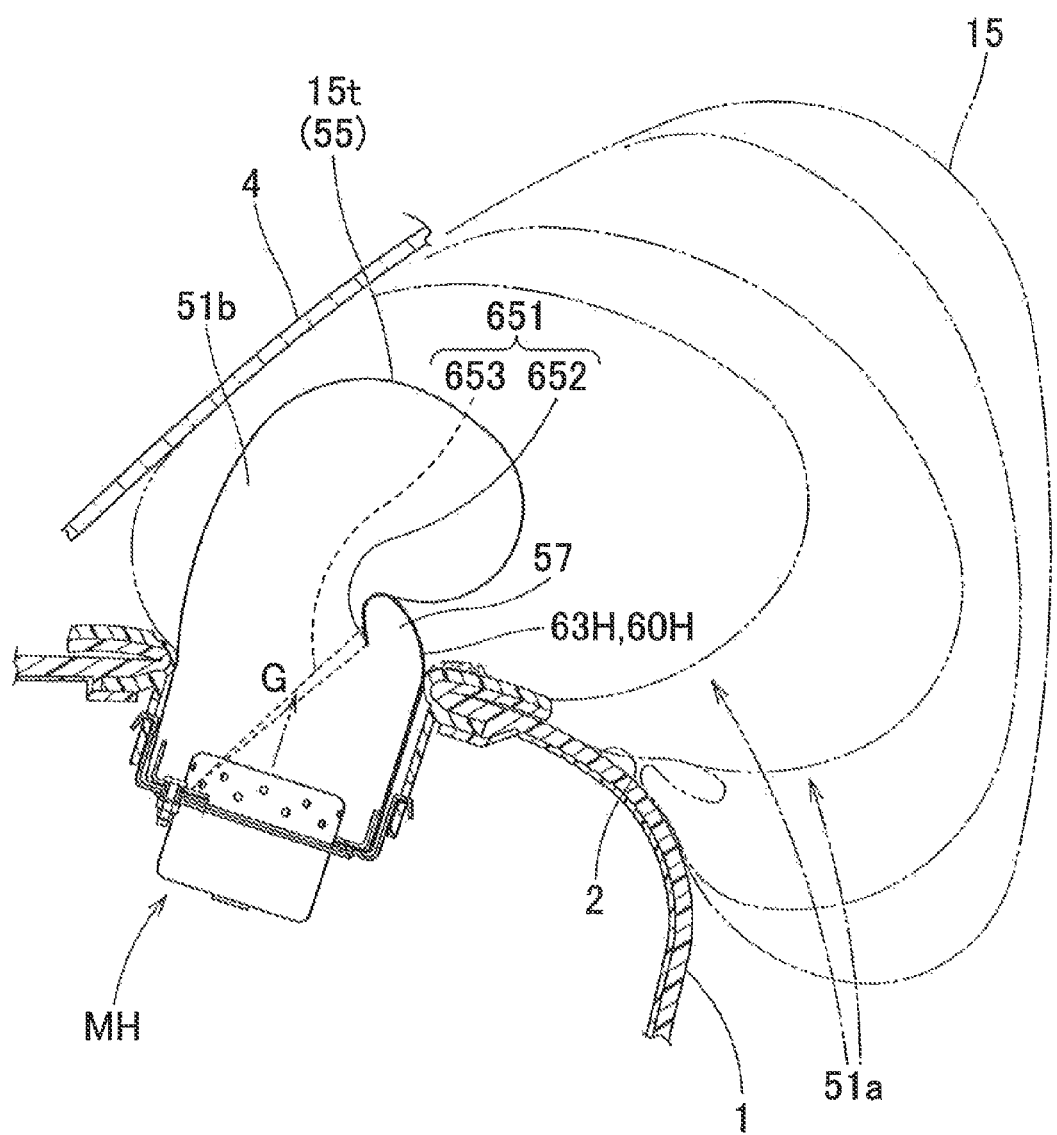
FIG. 49 is a schematic view illustrating an inflation state of the airbag of the front passenger seat airbag apparatus illustrated in FIG. 47A.

In the airbag apparatus MH using the regulating member 60H, the deployment suppressing portion 651 causes both the connection arm portions 563 to be connected to the case 12 on the bottom surface 53a of the completely folded body 53H, and the base portion 652 presses the upper surface 58a of the portion 51ab of the initial deployment and inflation portion 58 immediately below the folded portion 57. For this reason, as illustrated in FIGS. 47A, 47B, and 48A, at the initial stage of inflation of the airbag 15, the deployment and inflation of the portion 51ab of the initial deployment and inflation portion 58 is suppressed until the initial deployment and inflation portion 58 is freed from the base portion 652. When the deployment suppressing portion 651 is freed from the portion 51ab of the initial deployment and inflation portion 58, the base portion 652 of the deployment suppressing portion 651 is turned inside out toward the non-connected release edge 67 of the temporary holding portion 63H, thereby suppressing bendability of the non-connected release edge 67. The folded portion 57 is regulated not to escape from the temporary holding portion 63H for a period until the release opening 69 of the temporary holding portion 63H is significantly open. Subsequently, as illustrated in FIGS. 48A, 48B, and 49, in the airbag 15, the deployment and inflation of the folded portion (rear portion) 51a at the further rear side than the front portion 51b is suppressed, and the airbag 15 inflates along the upper surface 2 of the instrument panel 1, thereby completing the inflation.

For this reason, in the airbag apparatus MH using the regulating member 60H, at the initial stage of inflation of the airbag 15, the deployment suppressing portion 651 suppresses the deployment and inflation of the portion 51ab of the initial deployment and inflation portion 58, and the folded portion 57 can be suppressed from being released from the temporary holding portion 63H. That is, in the airbag apparatus MH using the regulating member 60H, regulating of the deployment and inflation of the airbag 15 at the initial stage of inflation is favorably enhanced.

The deployment suppressing portion 651 extends from the cover portion 65H of the temporary holding portion 63H. However, the deployment suppressing portion 651 is not directly connected to the base portion 64H or the connecting piece portion 62H. For this reason, the temporary holding portion 63H itself of the regulating member 60H can cause the connecting piece portion 62H to bend, and can turn to be apart from the bottom wall portion 12a of the case 12 so as to easily release the folded portion 57. For this reason, the regulating member 60H does not exceedingly hinder a release of the folded portion 57.

The connection arm portion 653 may be provided with an attachment hole which is fastened with the attachment hole 61b of the attachment portion 61H. As with the suppressing arm portion 70E illustrated in FIG. 24, the connection arm portion 653 may be provided with attachment holes at two places in the front and the rear to be able to be locked by the front and rear bolts 9a in the retainer 9. As with a connection arm portion 653F indicated by the two-dot chain line in FIG. 44, similarly to the suppressing arm portion 70F in FIG. 28, the connection arm portion 653 may be formed to extend to the bottom surface 53a by pressing the upper surface of the temporary holding portion 63H and covering the front surface of the front portion 51b of the completely folded body 53H.

In the embodiment, as the temporary holding portions 63, 63C, 63D, 63E, 63F, 63G, and 63H of the regulating members 60, 60A, 60C, 60D, 60E, 60F, 60G, and 60H; flat-shaped configurations in which the sheet-shaped base portions 64, 64C, 64D, 64E, 64F, 64G, and 64H, and the cover portions 65, 65A, 65C, 65D, 65E, 65F, 65G, and 65H are respectively bound together have been exemplified. However, a belt-shaped portion such as a bendable gusset may be provided in the connected edge 66 connected to the base portions 64, 64C, 64D, 64E, 64F, 64G, and 64H of the cover portions 65, 65A, 65C, 65D, 65E, 65F, 65G, and 65H. The temporary holding portion formed in such a manner is three-dimensionally formed like a rectangular parallelepiped shape in which an inner space of the concave holding portion is increased.

In the embodiment, descriptions have been given with reference to the examples of the front passenger seat airbag apparatuses M, MD, ME, MF1, MF2, MG, and MH. However, the airbag apparatus to which the present invention can be applied is not regulated to front passenger seat airbag apparatuses. The present invention can be applied to an airbag apparatus for a steering wheel, a side airbag apparatus which is disposed on a side surface of a vehicle seat, and an airbag apparatus for knee protection.

What is claimed is:

1. An airbag apparatus comprising:
    an accommodating portion;
    an airbag that is accommodated and held in the accommodating portion while being folded, protrudes from the accommodating portion while being unfolded, and deploys and inflates when inflating gas flows into the airbag; and
    a regulating member that is flexible, is accommodated in the accommodating portion together with the folded airbag, and is attached to the accommodating portion so as to be able to regulate deployment and inflation of a folded portion which is a part of the airbag, when the airbag deploys and inflates,
    wherein the regulating member includes
    a temporary holding portion that releasably and temporarily holds the folded portion that is a part of the folded airbag,
    an attachment portion that is attached to the accommodating portion, and
    a connecting piece portion that connects the attachment portion and the temporary holding portion,
    wherein the temporary holding portion includes
    a base portion that is continuous with the connecting piece portion,
    a cover portion that forms a holding concave portion for temporarily holding the folded portion between the base portion and the cover portion, and the cover portion is connected to the base portion, and an opening for releasing the folded portion from the holding concave portion that is provided at an inner circumference of a non-connected release edge of outer circumferential edge of the cover portion, the non-connected release edge not being connected to the base portion, wherein the regulating member is made of a piece of flexible regulating member formation sheet material in which an attachment formation portion for forming the attachment portion, a connecting piece formation portion for forming the connecting piece portion, a base formation portion for forming the base portion and a cover formation portion for forming the cover portion are continuous with each other, and wherein the temporary holding portion is formed by folding the regulating member formation sheet material in order for the cover formation portion to be stacked on the base formation portion, and stitching opposite lateral edges of the cover formation portion to opposite lateral edges of the base formation portion.

2. The airbag apparatus according to claim 1, wherein the cover portion is provided to cause an edge of the outer circumferential edge facing the non-connected release edge to be a non-connected edge which is not connected to the base portion.

3. The airbag apparatus according to claim 1, wherein a completely folded body of the airbag is completely folded in such a manner that the folded portion is disposed close to a ceiling surface of the completely folded body, and a bottom surface is held by the accommodating portion, and wherein the regulating member is accommodated in the accommodating portion together with the airbag in a state where the attachment portion is disposed on the bottom surface of the completely folded body, the connecting piece portion is disposed on a side surface of the completely folded body, and the temporary holding portion is disposed on the ceiling surface of the completely folded body such that the base portion is disposed on the ceiling surface of the completely folded body in an outwardly facing fashion while the cover portion is disposed closer to the bottom surface of the completely folded body than the base portion.

4. The airbag apparatus according to claim 3, wherein the completely folded body is folded while disposing an initial deployment and inflation portion of the airbag to be at a further upstream side of the inflating gas than the folded portion, the initial deployment and inflation portion of the airbag located below the folded portion which is accommodated in the temporary holding portion, and wherein the regulating member includes suppressing arm portions which respectively extend from a vicinity of opposite edges of the temporary holding portion toward the bottom surface of the completely folded body so as to be connected to the accommodating portion, in order to be able to suppress deployment and inflation of the initial deployment and inflation portion when the initial deployment and inflation portion of the airbag inflates.

5. The airbag apparatus according to claim 4, wherein the suppressing arm portions cover an outer surface of the base portion of the temporary holding portion, and are connected to the accommodating portion.

6. The airbag apparatus according to claim 4, wherein the suppressing arm portions extend from the cover portion of the temporary holding portion, and are connected to the accommodating portion.

7. The airbag apparatus according to claim 3, wherein the completely folded body is folded while disposing an initial deployment and inflation portion of the airbag to be at a further upstream side of the inflating gas than the folded portion, the initial deployment and inflation portion of the airbag located below the folded portion which is accommodated in the temporary holding portion, and wherein the regulating member has a deployment suppressing portion that includes a base portion which extends from the non-connected release edge of the cover portion of the temporary holding portion and is provided to be bent from the non-connected release edge between an upper surface of the initial deployment and inflation portion and the cover portion, and a connecting arm portion which extend from opposite sides of the base portion toward the bottom surface of the completely folded body so as to be connected to the accommodating portion, and the deployment suppressing portion suppresses deployment and inflation of the folded portion at an initial stage of airbag inflation.

8. The airbag apparatus according to claim 1, wherein the airbag apparatus is mounted on an inner side of an upper surface of an instrument panel in front of a front passenger seat of a vehicle and below a windshield, and wherein the folded portion of the airbag which is held by the temporary holding portion of the regulating member is a part of a rear portion of the airbag as deployed.

9. An airbag apparatus comprising:
an accommodating portion;
an airbag that is accommodated and held in the accommodating portion while being folded, protrudes from the accommodating portion while being unfolded, and deploys and inflates when inflating gas flows into the airbag; and
a regulating member that is flexible, is accommodated in the accommodating portion together with the folded airbag, and is attached to the accommodating portion so as to be able to regulate deployment and inflation of a folded portion which is a part of the airbag, when the airbag deploys and inflates,
wherein the regulating member includes
a temporary holding portion that releasably and temporarily holds the folded portion that is a part of the folded airbag,
an attachment portion that is attached to the accommodating portion, and
a connecting piece portion that connects the attachment portion and the temporary holding portion,
wherein the temporary holding portion includes
a base portion that is continuous with the connecting piece portion,
a cover portion that forms a holding concave portion for temporarily holding the folded portion between the base portion and the cover portion, and the cover portion is connected to the base portion, and
an opening for releasing the folded portion from the holding concave portion that is provided at an inner circumference of a non-connected release edge of outer circumferential edge of the cover portion, the non-connected release edge not being connected to the base portion, wherein the regulating member includes suppressing arm portions which are formed to extend from opposite lateral edges of the temporary holding portion so as to be connected to the accommodating portion, the suppressing arm portions also interposing the connecting piece portion therebetween, and the suppressing arm portions suppress deployment and inflation of the folded portion at an initial stage of inflation of the airbag.

10. The airbag apparatus according to claim 9, wherein each of the suppressing arm portions includes a plurality of connection places connected to the accommodating portion, and
wherein the connection places are disposed substantially along a direction orthogonal to a facing direction of the suppressing arm portions.

11. The airbag apparatus according to claim 9, wherein the airbag apparatus is mounted on an inner side of an upper surface of an instrument panel in front of a front passenger seat of a vehicle and below a windshield, and
wherein the folded portion of the airbag which is held by the temporary holding portion of the regulating member is a part of a rear portion of the airbag as deployed.

* * * * *